(12) United States Patent
Konishi et al.

(10) Patent No.: US 7,148,895 B2
(45) Date of Patent: Dec. 12, 2006

(54) TIME-SERIES DATA PROCESSING DEVICE AND METHOD

(75) Inventors: Kentaro Konishi, Tokyo (JP); Masaki Usui, Tokyo (JP); Tatsuya Okahara, Tokyo (JP)

(73) Assignee: Scale Inc., Tokyo (JP)

( * ) Notice: Subject to any disclaimer, the term of this patent is extended or adjusted under 35 U.S.C. 154(b) by 806 days.

(21) Appl. No.: 09/919,989

(22) Filed: Jul. 30, 2001

(65) Prior Publication Data

US 2002/0041284 A1  Apr. 11, 2002

(30) Foreign Application Priority Data

Jan. 29, 1999 (JP) ............................ 11-023071

(51) Int. Cl.
*G06T 13/00* (2006.01)

(52) U.S. Cl. ............ 345/473; 345/427; 715/719; 715/763; 348/57; 348/169; 348/171; 348/172; 700/91; 700/92; 463/2; 463/3

(58) Field of Classification Search ............... 345/473, 345/719, 763, 427; 348/157, 169, 171, 172, 348/578–579, 584, 589, 600, 57; 382/103; 700/90–92; 273/317.6; 463/2–3; 725/86, 725/116, 131; 715/719, 763
See application file for complete search history.

(56) References Cited

U.S. PATENT DOCUMENTS 5,729,471 A * 3/1998 Jain et al. ............... 725/131
5,769,713 A * 6/1998 Katayama ............... 463/3
5,923,365 A * 7/1999 Tamir et al. ............ 348/169
6,292,706 B1 * 9/2001 Birch et al. ............. 700/91
6,545,689 B1 * 4/2003 Tunli ...................... 345/719
6,750,919 B1 * 6/2004 Rosser ................... 348/584

FOREIGN PATENT DOCUMENTS

| EP | A 0 817 105 | 1/1998 |
| GB | 2 313 553 | 12/1997 |
| JP | A 5-253324 | 10/1993 |
| JP | A 6-319843 | 11/1994 |
| JP | A9-98345 | 4/1997 |
| JP | 09-313660 A | 12/1997 |
| JP | 10-013811 A | 1/1998 |
| JP | A 10-171836 | 6/1998 |
| JP | A10-314357 | 12/1998 |
| JP | A 11-339009 | 12/1999 |

* cited by examiner

*Primary Examiner*—Kimbinh T. Nguyen
(74) *Attorney, Agent, or Firm*—Sughrue Mion, PLLC

(57) ABSTRACT

The present inventions provide a system and a method for facilitating various visual analyses of individual players and team data that is most appropriate for the purpose, while also allowing analyzed data and results to be saved. A time-series data processing device according to the present inventions includes an image-pick up unit for image-picking up a specific object, a data processing unit for generating a data list indicating, in time series, a temporal transition of a position and a state of the object image-picked up by the image-picking unit, with respect to a time, an animating unit for animating the transition of the position and the state of the object in accordance with the data list, and a display unit for displaying at least one of the data list generated by the data processing unit and the image animated by the animating unit.

38 Claims, 73 Drawing Sheets

| Nakata | | | | | Kojima | | | | |
|---|---|---|---|---|---|---|---|---|---|
| 8 | | | | | 1 | | | | |
| 21 | | | | | 32 | | | | |
| MF | | | | | GK | | | | |
| 0 | | | | | 0 | | | | |
| x | y | z | Play | Official Record | x | y | z | Play | Official Record |
| 698 | 343 | 0 | d | | 35 | 150 | 0 | | |
| 698 | 343 | 0 | | | 35 | 150 | 0 | | |
| 698 | 343 | 0 | | | 35 | 150 | 0 | | |
| 698 | 343 | 0 | | | 35 | 150 | 0 | | |
| 698 | 343 | 0 | | | 35 | 150 | 0 | | |
| 698 | 343 | 0 | | | 35 | 150 | 0 | | |
| 699 | 343 | 0 | | | 35 | 150 | 0 | | |
| 699 | 344 | 0 | | | 35 | 150 | 0 | | |
| 699 | 345 | 0 | | | 35 | 150 | 0 | | |
| 699 | 346 | 0 | | | 35 | 150 | 0 | | |
| 699 | 347 | 0 | | | 35 | 150 | 0 | | |
| 699 | 348 | 0 | p | | 35 | 150 | 0 | | |
| 700 | 349 | 0 | | | 35 | 150 | 0 | | |
| 700 | 350 | 0 | | | 35 | 150 | 0 | | |
| 700 | 350 | 0 | | | 35 | 150 | 0 | | |
| 700 | 350 | 0 | | | 35 | 150 | 0 | | |
| 700 | 350 | 0 | | | 35 | 150 | 0 | | |
| 700 | 350 | 0 | | | 35 | 150 | 0 | | |
| 700 | 350 | 0 | | | 35 | 150 | 0 | | |
| 701 | 350 | 0 | | | 35 | 150 | 0 | | |
| 701 | 351 | 0 | | | 35 | 150 | 0 | | |
| 701 | 352 | 0 | | | 35 | 150 | 0 | | |
| 701 | 353 | 0 | | | 35 | 150 | 0 | | |
| 701 | 354 | 0 | | | 35 | 150 | 0 | | |
| 701 | 355 | 0 | | | 36 | 150 | 0 | | |
| 701 | 355 | 0 | | | 37 | 150 | 0 | | |
| 701 | 356 | 0 | | | 38 | 150 | 0 | | |
| 701 | 356 | 0 | | | 39 | 150 | 0 | | |
| 701 | 356 | 0 | | | 40 | 150 | 0 | | |
| 701 | 356 | 0 | | | 40 | 150 | 0 | | |
| 701 | 356 | 0 | | | 40 | 150 | 0 | | |

FIG. 21

| Japan National Team | vs | Croatian National Team |
|---|---|---|
| 0 | <Goals> | 1 |
| 0% | Goal Completion Rate | 7% |
| 75 | <Passes> | 85 |
| 40 | Pass Completion | 45 |
| 53% |  | 53% |
| 35 | <Dribble> | 42 |
| 25 | <Shoots> | 15 |
| 10 | Inside Goal | 10 |
| 15 | Outside Goal | 5 |
| 3 | <Corner Kick> | 4 |
| 2 | Connected to Shoot | 3 |
| 1 | Disconnected by Opponent | 1 |
| 10 | <Free Kick> | 15 |
| 3 | Connected to Shoot | 10 |
| 7 | Disconnected by Opponent | 5 |
| 6 | <Penalty> | 4 |
| 0 | Yellow Card | 1 |
| 0 | Red Card | 0 |
| 3 | <Off Sides> | 4 |
| 15 | <Loose Ball> | 20 |
| 34% | <Opponent's Area Invasion> | 66% |
| 37% | <Ball Control Rate> | 63% |
| 50% | Area A | 50% |
| 20% | Area B | 80% |
| 30% | Area C | 70% |
| 15km | <Total Movement> | 18.5km |
| 15.2km/h | <Average Speed> | 16.1km/h |

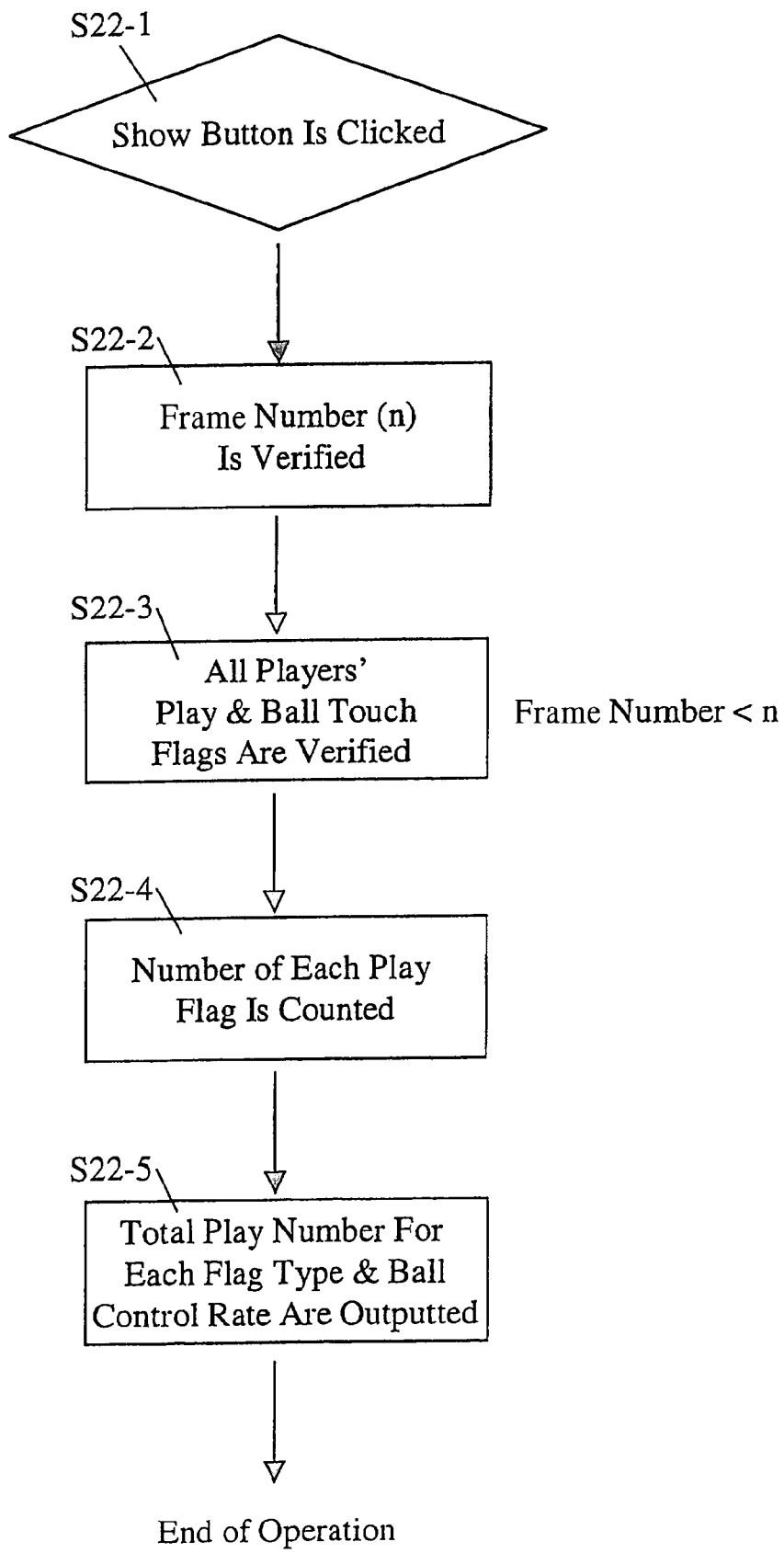

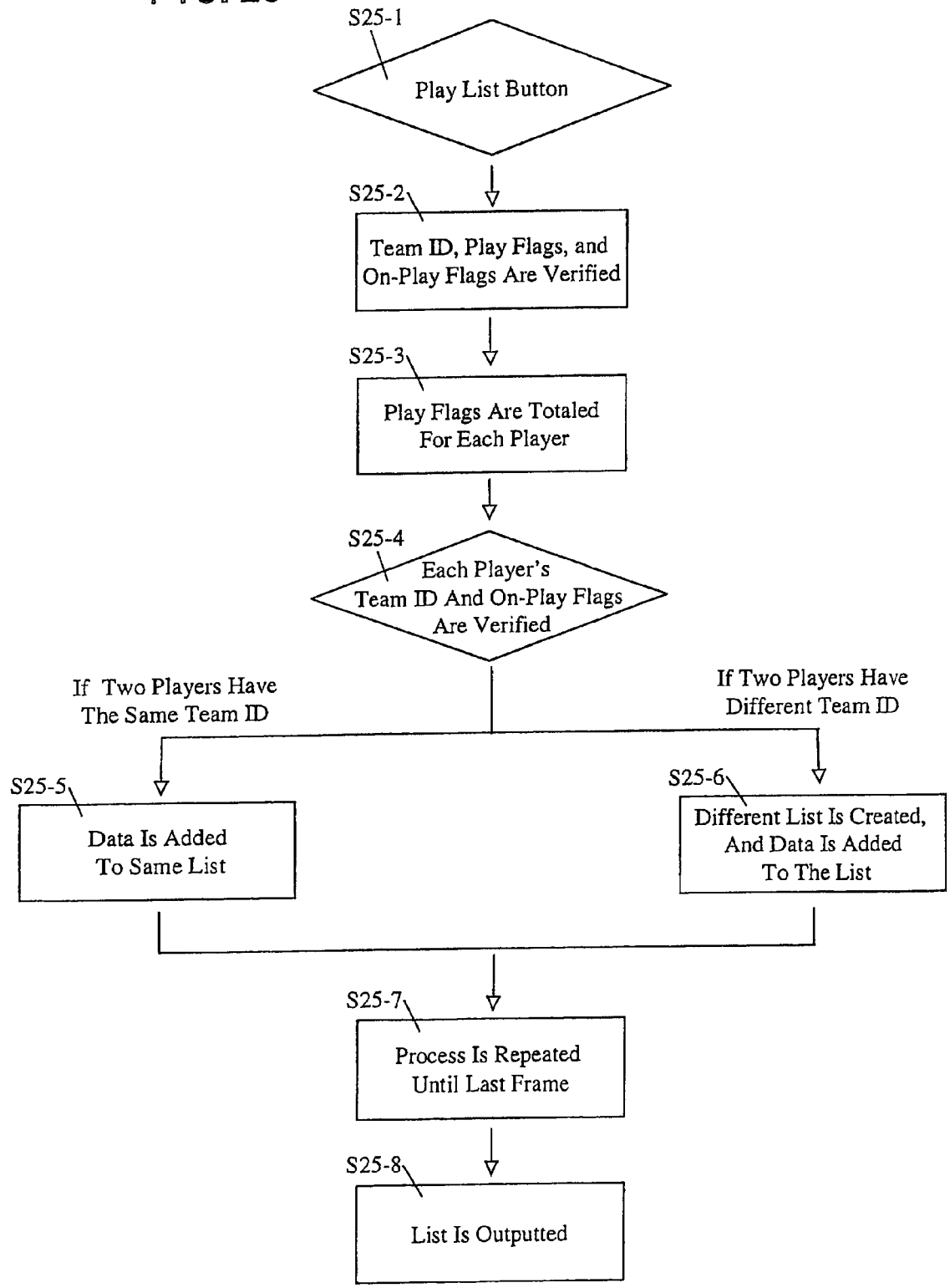

FIG. 26

| # | | | | | | | | | | | | |
|---|---|---|---|---|---|---|---|---|---|---|---|---|
| ① | Nakata | →P | Jo | →DP | Nakayama | →S | Boban | | | | | |
| ② | Boban | →P | Suker | →D·P | Kawaguchi | | | | | | | |
| ③ | Kawaguchi | →T | Akita | →P | Soma | →D | Bilic | | | | | |
| ④ | Bilic | →D | Jarni | →P | Nakata | | | | | | | |
| ⑤ | Nakata | →D·P | Yamaguchi | →P | Miura | →S | Ladic | | | | | |
| ⑥ | Ladic | →GK | Simic | →P | Nakata | | | | | | | |
| ⑦ | Nakata | →P | Nakayama | →D·P | × | | | | | | | |
| ⑧ | Ladic | →GK | Jarni | →P | Boban | →D·P | × | | | | | |
| ⑨ | Kawaguchi | →GK | Akita | →P | Boban | | | | | | | |
| ⑩ | Boban | →D·P | Jarni | →P | Suker | →D·S | G | | | | | |
| ⑪ | Jo | →P | Nakata | →D·P | Nakayama | →P | Jo | →S | Ladic | →PC | × | |
| ⑫ | Nakata | →CK | Yamaguchi | →HS | Ladic | | | | | | | |
| ⑬ | Ladic | →T | Simic | →D·P | Jarni | →D | Nakata | | | | | |
| ⑭ | Nakata | →P | Jo | →S | Ladic | | | | | | | |
| ⑮ | Ladic | →T | Simic | →S | × | | | | | | | |
| ⑯ | Kawaguchi | →GK | Akita | →D | Nakata | →P | Bilic | | | | | |
| ⑰ | Bilic | →T | Jarni | →P | Nakata | | | | | | | |
| ⑱ | Nakata | →P | Yamaguchi | →P | Nakata | →P | Ladic | | | | | |
| ⑲ | Ladic | →GK | Simic | →D | Nakata | | | | | | | |
| ⑳ | Nakata | →D·P | Nakayama | →S | × | | | | | | | |

FIG. 27

| | | | | | | | | | | |
|---|---|---|---|---|---|---|---|---|---|---|
| ① | Nakata | P → | Jo | DP → | Nakayama | S → | Boban | | | |
| ② | Nakata | D·P → | Yamaguchi | P → | Miura | S → | Ladic | | | |
| ③ | Nakata | P → | Nakayama | D·S → | × | | | | | |
| ④ | Jo | P → | Nakata | D·P → | Nakayama | P → | Jo | S → | Ladic | PC → × |
| ⑤ | Nakata | CK → | Yamaguchi | HS → | Ladic | | | | | |
| ⑥ | Nakata | P → | Jo | S → | Ladic | | | | | |
| ⑦ | Kawaguchi | GK → | Akita | D → | Nakata | P → | Bilic | | | |
| ⑧ | Nakata | P → | Yamaguchi | P → | Nakata | P → | Ladic | | | |
| ⑨ | Nakata | D·P → | Nakayama | S → | × | | | | | |
| ⑩ | Kawaguchi | GK → | Nakata | P → | Boban | | | | | |
| ⑪ | Jo | P → | Nakata | D·P → | Nakayama | S → | Ladic | PC → | × | × |
| ⑫ | Nakata | CK → | Nakayama | S → | Ladic | | | | | |
| ⑬ | Nakata | P → | Jo | S → | Ladic | | | | | |

Individual Data <Nakata>

Jo/ Nakata/ Japan National Team/ Clear Search Result

Nakata's Individual Data Chart

| | Pass | | | Shoot | | Foul | | Card | | Card Obtained | | Athletic Ability | |
|---|---|---|---|---|---|---|---|---|---|---|---|---|---|
| | Att | Comp | Distance | Att | Goal | Made | Obtain | Yellow | Red | Yellow | Red | Distance | Speed |
| Croatia | 15 | 5 | 20 | 5 | 0 | 8 | 2 | 1 | 0 | 2 | 0 | 1985 | 15 |
| Korea | 22 | 9 | 13 | 1 | 1 | 2 | 4 | 1 | 0 | 0 | 1 | 1210 | 15 |
| Brazil | 13 | 11 | 19 | 0 | 0 | 4 | 1 | 0 | 0 | 0 | 0 | 1541 | 19 |
| Total | 50 | 25 | 17.3 | 6 | 1 | 14 | 7 | 2 | 0 | 2 | 1 | 1578.7 | 16.3 |

6001 Detailed Data
6002 Detailed Data
6003 Detailed Data

Return To Analysis Subject Search Sub-Menu

Return

FIG. 67

Individual Play Data

Japan National Team vs Croatia National Team/ National Stadium/ March 8th

Nakata's Individual Play Data Chart <Pass>

| Pass List | Time | Pass To | Kicking Foot | Speed | Distance | Direction |
|---|---|---|---|---|---|---|
| 1 | 1:04 | J6 | R-Inside | 36 | × | × |
| 2 | 2:15 | J5 | L-Outside | 14 | 15 | Left |
| 3 | 5:11 | J6 | R-Inside | 44 | 42 | Left |
| 4 | 5:15 | J7 | R-Inside | 57 | × | × |
| 5 | 6:17 | J11 | R-Inside | 14 | 8 | Left |
| 6 | 12:44 | J1 | R-Inside | 66 | × | × |
| 7 | 19:24 | J7 | R-Inside | 11 | × | × |
| 8 | 31:00 | J7 | R-Inside | 14 | 5 | Left |
| 9 | 33:47 | J7 | R-Inside | 72 | × | × |
| 10 | 36:19 | J6 | L-Inside | 19 | 3 | Left |

Return To Analysis Subject Search Sub-Menu

Play List — 7001

Return

FIG. 68

Data <J Team>

Japan National Team Data Chart

[Data table with columns: Pass (Att, Comp, Dist), Shoot (Att, Comp, OB, Goal), Foul (Made, Obtai), Card (Yellow, Red), Card (Yellow, Red), Obtain Athletic Abil (stan, Spee), Ball T (Total, trol Rate), Bumble Di (Offside), Offside, FK (Total, ct S), CK (Total, Right, Left), Top&Bot (Shoot)]

| | | Att | Comp | Dist | Att | Comp | OB | Goal | Made | Obtai | ellow | Red | ellow | Red | stan | Spee | Total | trol Rate | Offside | ide | Total | ct S | Total | Right | Left | Shoot |
|---|---|---|---|---|---|---|---|---|---|---|---|---|---|---|---|---|---|---|---|---|---|---|---|---|---|---|
| VS CRO | JPN | 319 | 161 | 20.6 | 5 | 1 | 4 | 0 | 19 | 12 | 3 | 0 | 2 | 0 | 15.9 | 15.1 | 588 | 37.8 | 0.3 | 8 | 3 | 17 | 7 | 5 | 2 | 3 | 4 | 35 |
| | CRO | 488 | 360 | 24.3 | 16 | 11 | 5 | 2 | 12 | 19 | 2 | 0 | 3 | 0 | 16.8 | 17.7 | 986 | 62.2 | 1.1 | 5 | 8 | 27 | 14 | 8 | 6 | 2 | 2 | 22 |
| VS ARG | JPN | 254 | 151 | 19.8 | 8 | 1 | 6 | 0 | 26 | 11 | 5 | 1 | 3 | 0 | 16.1 | 14.2 | 502 | 33.2 | 0.2 | 7 | 4 | 22 | 3 | 2 | 1 | 1 | 0 | 35 |
| | ARG | 511 | 306 | 12.1 | 23 | 11 | 12 | 1 | 11 | 26 | 3 | 0 | 5 | 1 | 20.1 | 19.1 | 1011 | 66.8 | 1.9 | 11 | 8 | 33 | 19 | 14 | 12 | 2 | 5 | 28 |
| VS JAM | JPN | 499 | 298 | 14.2 | 22 | 5 | 17 | 3 | 9 | 7 | 0 | 0 | 0 | 0 | 16.1 | 16.2 | 751 | 64.5 | 0.8 | 2 | 9 | 16 | 5 | 12 | 3 | 9 | 7 | 28 |
| | JAM | 212 | 107 | 26.3 | 7 | 2 | 5 | 2 | 7 | 9 | 0 | 0 | 0 | 0 | 14.3 | 11.6 | 413 | 35.5 | 0.1 | 8 | 0 | 11 | 1 | 3 | 1 | 2 | 0 | 41 |

| | Att | Comp | Dist | Att | Comp | OB | Goal | Made | Obtai | ellow | Red | ellow | Red | stan | Spee | Total | trol Rate | Offside | ide | Total | ct S | Total | Right | Left | Shoot |
|---|---|---|---|---|---|---|---|---|---|---|---|---|---|---|---|---|---|---|---|---|---|---|---|---|---|
| JPN | 1072 | 610 | 20.6 | 35 | 7 | 27 | 3 | 54 | 30 | 8 | 1 | 5 | 0 | 50.1 | 15.2 | 1841 | - | 1.3 | 17 | 16 | 55 | 15 | 19 | 6 | 13 | 11 | 33 |

8001 Detailed Data
8002 Detailed Data
8003 Detailed Data

Return To Analysis Subject Search Sub-Menu

Return

FIG. 69

Team Play Data <Pass>

Japan National Team vs Croatia National Team/ National Stadium/ March 8th

Japan National Team Play Data Chart <Pass>

| Pass List | Time | Pass To | Pass By | Kicking Foot | Speed | Distance | Direction |
|---|---|---|---|---|---|---|---|
| 1 | 1:04 | Yamaguchi | × | R-Inside | 36 | × | × |
| 2 | 2:15 | Nanami | Nakayama | L-Outside | 14 | 15 | Left |
| 3 | 5:11 | Yamaguchi | Nakata | R-Inside | 44 | 42 | Left |
| 4 | 5:15 | Nakata | × | R-Inside | 57 | × | × |
| 5 | 6:17 | Nakayama | Soma | R-Inside | 14 | 8 | Left |
| 6 | 12:44 | Kawaguchi | × | R-Inside | 66 | × | × |
| 7 | 19:24 | Nakata | × | R-Inside | 11 | × | × |
| 8 | 31:00 | Jo | Nakayama | R-Inside | 14 | 5 | Left |
| 9 | 33:47 | Nakata | × | R-Inside | 72 | × | × |
| 10 | 36:19 | Yamaguchi | Nanami | L-Inside | 19 | 3 | Left |

Return To Analysis Subject Search Sub-Menu

Play List — 7001

Return

Detailed Team Data Menu

S93-1: Top And Bottom Lines

S93-2: x Coordinates Of All Players Of Selected Team Are Verified

S93-3: Maximum And Minimum Values Of x Coordinates Are Chosen

S93-4: Maximum And Minimum Values Of x Coordinates Are Calculated For Each Frame To Draw Graph S93-5: Press "Return" Button Detailed Team Data Menu

- S99-1: Ball Control By Zone
- S99-2: x And y Coordinates When Ball Touch Flags For All Players Are Verified
- S99-3: Flags Are Divided Into Ball Coordinates (x, y) = A Zone (Under 60, Under 40), B Zone (Over 60, Under 40), C Zone (Under 60, Over 40), D Zone (Over 60, Over 40)
- S99-4: Ball Touch Flag Ratios Per Zone For Both Teams Are Calculated And Reflected In Chart
- S99-5: Press "Return" Button Detailed Team Data Menu 111c  111b  111a 112a

TIME-SERIES DATA PROCESSING DEVICE AND METHOD

TECHNICAL FIELD

The present invention relates to the analyzing process and system for games of sport that involve a number of players like soccer, ice hockey, rugby, American football, and basketball, and more particularly related to the analyses of individual players and movements of the team.

BACKGROUND ART

In currently existing game analysis system, video recorded images of the game appears on the screen, and a specific player is marked by using an electric pen for games like soccer, American football, and basketball. The player's expected movement in the next sequence is drawn as a line by using the electric pen, and then it is overlapped onto the actual images of the next sequence to explain the positioning and player movement.

The actual movement of a player who receives the ball in the offense of an American football game would be explained as an example. First, the initial position of the objective player (OP) is marked with the electric pen. At this point, the player (OP) has not yet received the ball. Next, the position of player (BP) currently in possession of the ball will be marked. Then, the track of player OP can be traced until just before BP passes him the ball. Finally, the points where BP releases and OP receives the ball will be marked on the field screen to analyze how the ball was passed from BP to OP.

Likewise, the player movements on the defensive player also can be analyzed simultaneously on the same image. In other words, the defensive player who is covering OP man on man can be analyzed by tracing the track of OP.

However, although the above-mentioned system enables a simple analysis for positioning or movement of individual players, it does not allow a statistical analysis for positioning or movement of players in related to team formations.

DISCLOSURE OF INVENTION

Accordingly, it is an object of the present invention to provide a system that facilitates various visual analyses of individual players and team data that is most appropriate for the purpose, while also allowing The objective of the present invention can be achieved by a time-series data processing device, which includes an image-pick up unit for image-picking up a specific object, a data processing unit for generating a data list indicating, in time series, a temporal transition of a position and a state of the object image-picked up by the image-picking unit, with respect to a time, an animating unit for animating the transition of the position and the state of the object in accordance with the data list, and a display unit for displaying at least one of the data list generated by the data processing unit and the image animated by the animating unit.

Preferably, in the time-series data processing device according to the present invention, the data processing unit is configured to display synchronously on the display unit each corresponding image by linking an image of the object, which is image-picked up by the image-pick up unit, if necessary, in accordance with the data list generated, when the display unit displays the image of the object animated by animating unit.

More preferably, in the time-series data processing device according to the present invention, the data processing unit is configured to perform at least one kind of data analysis, by linking an image animated by the animating unit, in accordance with the data list generated.

Further preferably, in the time-series data processing device according to the present invention, the specific object includes a tool that is used for players in a sports game and for a determination of a winner or a loser of the sports game.

In the time-series data processing device according to the present invention, the sports game is a soccer, and the tool is a soccer ball, preferably.

The above-mentioned objective of the present invention can be achieved by a time-series data processing device, which includes a data processing unit for generating an image data by image-picking up a sports game, for processing the image data generated in accordance with a predetermined format, and for storing the data processed in the predetermined format, an interface unit connected to the data processing unit, and having an instruction entering unit capable of entering a plurality of instructions; for inputting the data processed in the predetermined format that is stored in the data processing unit and for converting the data inputted into a predetermined form, and for outputting the data converted, in accordance with the instruction entered by the instruction entering unit, and an image displaying unit connected to the interface unit for inputting the data outputted from the interface unit and for displaying the data inputted on a screen.

Preferably, in the time-series data processing device according to the present invention, the interface unit is configured to enable the image displaying unit to display a play list or a graph that is indicative of a desired analytical result in response to a kind of the instruction.

More preferably, in the time-series data processing device according to the present invention, the instruction entering unit includes a main instruction entering level for performing a plurality of different kinds of analyses, and a common instruction entering level to be utilized commonly for the plurality of different kinds of analyses.

Further preferably, in the time-series data processing device according to the present invention, the common instruction entering level is configured to enter at least one or more related item(s) with respect to a sports game subject to an analysis.

In the time-series data processing device according to present invention, the main instruction entering level is configured to select an analysis of data or an analysis of formation regarding to a sports game subject to an analysis, as one of the plurality of different kinds of analyses, preferably.

It is preferably in the time-series data processing device according to the present invention that the related item includes at least one of a player, a team, a weather a stadium of a game, a date of a game, a starting time of a game, and a number of spectators of a game.

In the time-series data processing device according to present invention, it is preferably that the interface unit includes functions of displaying all plays of an opponent teams at the sports game as a list in accordance with the play list, and of retrieving a desirable play seen at the sports game by designating an optional item of the play list.

In the time-series data processing device according to the present invention, preferably, the interface unit further includes a function of linking one analysis to other analysis in accordance with the play list.

In the time-series data processing device according to the present invention, it is preferably that the interface unit is capable of enabling the display unit to display simultaneously an animation based on the data converted into the predetermined form in accordance with the play list, and an image of a sports game based on the image data corresponding to the animation, and of editing a video of the sports game while analyzing data of the sports game.

It is another object of the present invention to provide a method that facilitates various visual analyses of individual players and team data that is most appropriate for the purpose, while also allowing analyzed data and results to be saved.

The object of the present invention can be achieved by a method of processing data in time-series, which includes the steps of image-picking up a specific object, generating a data list indicating, in time series, a temporal transition of a position and a state of the object image-picked up, with respect to a time, animating the transition of the position and the state of the object in accordance with the data list, and displaying at least one of the data list generated and the image animated.

Preferably, the method of processing data in time-series according to the present invention further includes the step of displaying synchronously each corresponding image by linking an image of the object, which is image-picked up, if necessary, in accordance with the data list generated, when displaying the image of the object animated.

More preferably, the method of processing data in time-series according to the present invention further includes the step of performing at least one kind of data analysis, by linking an image animated, in accordance with the data list generated.

Further preferably, in the method of processing data in time series according to the present invention, the specific object includes a tool that is used for players in a sports game and for a determination of a winner or a loser of the sports game.

In the method of processing data in time-series according to the present invention, the sports game is a soccer, and the tool is a soccer ball, preferably.

The above-mentioned object of the present invention can also be achieved by a method of processing data in time-series, which includes the steps of generating an image data by image-picking up a sports game, processing the image data generated in accordance with a predetermined format, storing the data processed in the predetermined format, entering a plurality of instructions, converting the data processed in the predetermined format into a predetermined form in accordance with the instruction entered, and displaying the data converted into thed predetermined form.

Preferably, the method of processing data in time-series according to the present invention further includes the step of displaying a play list or a graph that is indicative of a desired analytical result in response to a kind of the instruction.

More preferably, in the method of processing data in time-series according to the present invention, the step of converting the data processed in the predetermined format into a predetermined form in accordance with the instruction includes the step of entering at least one or more related item(s) with respect to a sports game subject to an analysis, which is utilized commonly in the plurality of different kinds of analyses by a common instruction entering.

Further preferably, in the method of processing data in time-series according to the present invention, the related item includes at least one of a player, a team, a weather, a stadium of a game, a date of a game, a starting time of a game, and a number of spectators of a game.

In the method of processing data in time-series according to the present invention, the step of converting the data processed in the predetermined format into a predetermined form in accordance with the instruction preferably includes the step of selecting an analysis of data or an analysis of formation regarding to a sports game subject to an analysis by a main instruction entering.

The method of processing data in time-series according to the present invention further includes the steps of displaying all plays of an opponent teams at the sports game as a list in accordance with the play list, and retrieving a desirable play seen at the sports game by designating an optional item of the play list, preferably.

The method of processing data in time-series according to the present invention further includes the step of linking one analysis to other analysis in accordance with the play list, preferably.

It is preferably that the method of processing data in time-series according to the present invention further includes the steps of displaying simultaneously an animation based on the data converted into the predetermined form in accordance with the play list, and an image of a sports game based on the image data corresponding to the animation, and editing a video of the sports game while analyzing data of the sports game.

BRIEF DESCRIPTION OF DRAWINGS

FIG. 21 is a schematic view showing an enlargement of the data chart shown in FIG. 20;

FIG. 22 is a flow chart explaining an operation of a detailed data of the subject match shown in FIG. 20;

FIG. 25 is a flow chart explaining an operation of the play list output button shown in FIG. 23;

FIG. 26 is a schematic view showing an example of an overall play list of the game;

FIG. 27 is a schematic view showing an example of a play list of an individual player;

FIG. 66 is a schematic view showing a sample of the individual data screen that appears after the field player has been selected in the Individual Data Analysis Subject Player Selection Menu shown in FIG. 64;

FIG. 67 is a schematic view showing a sample of the individual play data (pass number) screen that appears when the pass number is clicked under individual data on the individual data screen shown in FIG. 66;

FIG. 68 is a schematic view showing a sample of the team data screen displaying the list of team data, such as the total number of shoots made by the team, that is selected as the subject of analysis from the team data analysis subject selection menu;

FIG. 69 is a schematic view showing a sample screen of the team play data<passes>that appears when the number under passes is clicked under the team play data on the team data screen shown in FIG. 68;

BEST MODE FOR CARRYING OUT THE INVENTION

In the followings, with reference to the accompanying drawings, the preferred embodiments of a time-series data processing system and a time-series data processing method according to the present invention will be described in details.

Figure 1:
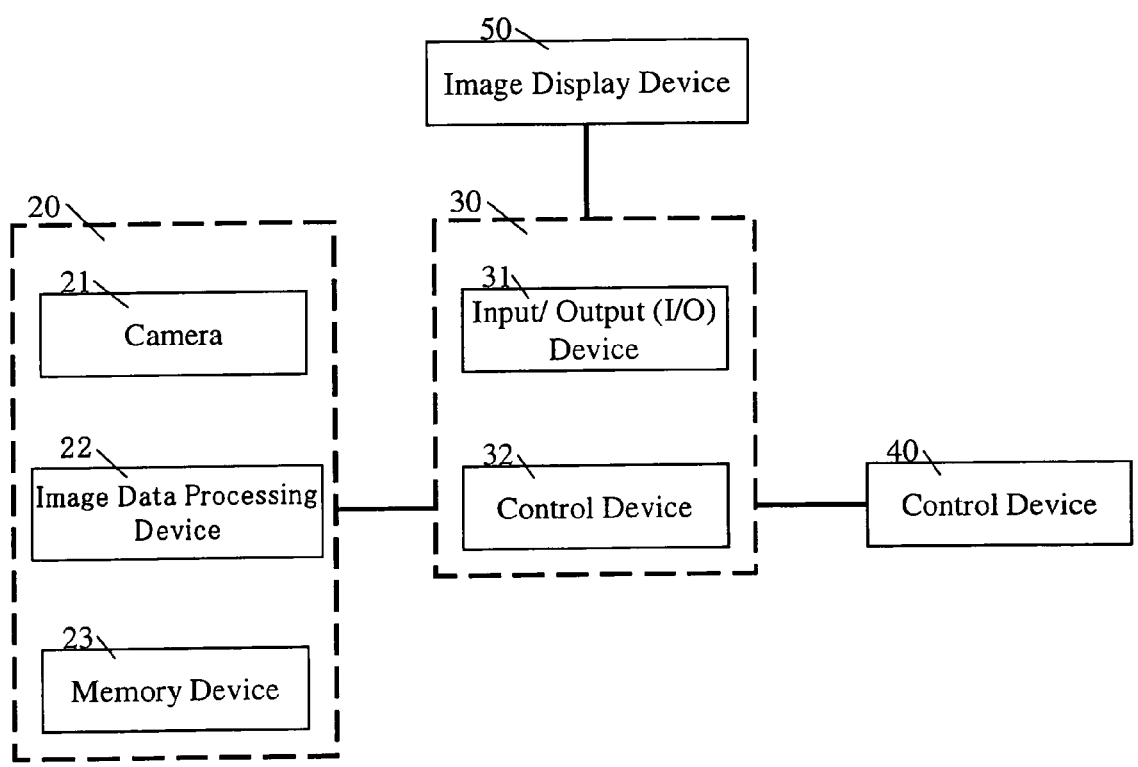
FIG. 1 is a block diagram showing a structure of the sports game analysis system according to the present invention.

FIG. 1 is a schematic block diagram showing a structure of a game analysis system, which is one embodiment of the time-series data processing system of the present invention.

As shown in FIG. 1, the game analysis device 10 is constituted of an automatic tracking device 20, an interface 30 connected to an automatic tracking device 20 (to be described below), a memory device 40 connected to the interface 30, and an image display device 50 connected to the interface 30.

The automatic tracking device 20 is constituted of a camera 21 to visually record the game, an image data processing device 22 connected to the camera 21 that processes the image data recorded, and a memory device 23 connected to the data processing device 22 that saves the processed data.

The interface 30 is constituted of an input/output device 31, and a control device 32 connected to the input/output device 31. The input/output device 31 inputs processed data from the automatic tracking device 20 to provide controlled data through the control device 32 for the image display device 50.

The memory device 40 is structured to save data used by the interface 30 as necessary.

The image display device 50 displays the data provided from the interface 30, and also performs the function of enabling to communicate with the interface 30 through the icons displayed on the screen.

In the following, the operation of the game analysis system 10 will be described with the reference to FIGS. 2 and 3, with emphasis on the operations of the interface 30 and image display device 50.

When the game analysis system 10 is activated, the 'Top Menu' 100 appears on the image display device 50 (hereafter referred to as display) where either of the two options 'Import New Data' 101 and 'Analysis' 102 can be selected. The 'Top Menu' is derived from results of the input/output device 31 of the interface 30, and is necessary in order to narrow down of the match list for the analysis subject.

The system is arranged to give the user the choice of selecting the 'Obtain New Data' 101 to proceed to the 'Automatic Following Analysis Engine' if the data has not yet been obtained from the automatic tracking device 20. As shown in the diagram, the 'Automatic Following Analysis Engine' 103 includes 'Initial Setting,' 'Additional Input,' and 'Basic Data Sampling'. However, for the purpose of this example, it will be assumed that the automatic tracking device 20 has already obtained data. Therefore, the 'Analysis' 102 option is selected from the 'Top Menu' 100.

Next, the interface 30 shows the three options on the display 50: 'Search key input area for the game to be analyzed' 200, 'Formation Analysis' 201 and 'Data analysis' 202. At the same time, the user will be asked to select either 203 'Formation Analysis' 201 or 'Data Analysis' 202.

As the 'Formation Analysis' 201 is clicked, the search is begun, and the 'Formation Analysis Top Menu: Game selection (single selection only)' 301 will appear on the screen of the display 50.

On the other hand, as the 'Data analysis' 202 is clicked, the interface 30 starts a search and the 'Data analysis Top Menu: Game selection (multiple selection)' 302 will appear on the display 50.

As the 'Formation Analysis Top Menu: Game selection (single selection only)' 301 screen appears after the 'Formation Analysis' 201 is clicked, the 'Formation Analysis Screen' 400 is shown. An interaction with the 'Overall Game Play List' 500 will be occurred whenever necessary.

Likewise, as the 'Data Analysis' 202 option is clicked, the 'Data Analysis Top Menu: Game Selection (multiple selection)' 302 will appear on the screen. If individual player analysis is selected, 'Player selection (single selection only)' 601 will appear, and if individual team analysis is selected, 'Team selection (single selection only)' 602 will appear.

The individual player analysis will be explained first. 'Player selection (single selection only)' 601 will appear on the screen, and a player will be chosen from the available lists. Consequently, the screen will show the 'Individual Player Data (single game/multiple games)' 701. From this screen, the user can access to the 'Individual Player Data (play details within a given game) 702 and 'Graph of Related Data' 703 through the automatic tracking device 20 via the interface 30. Further, when 'Player Selection (single selection only) 601 appears on the screen, the analysis selection sub-menu can be accessed. The user can go back to the 'Data Analysis Top Menu' 302 from the 'Individual Player Data (single game/multiple games)' 701, 'Individual Player Data (play details within a given game)' 702, and 'Graph of Related Data' 703 screens.

Next, the team analysis will be explained. The 'Team Selection (single selection only)' 602 will appear on the screen, and a team will be chosen from the available lists. Consequently, the screen will show the 'Team Data (single game/multiple games)' 801. From this screen, the 'Team Data (play details within a given game)' 802 and 'Graph of Related Data' 803 can be accessed through the memory device 23 of the automatic tracking device 20 via the interface 30. Further, when 'Team Selection (single selection only)' 602 appears on the screen, the analysis selection sub-menu can be accessed. Also, the user can go back to the 'Data Analysis Top Menu' 302 from the 'Team Data (single game/multiple games)' 801, 'Team Data (play details within a given game)' 802 and 'Graph of Related Data' 803 screens.

Furthermore, formation analysis can be interacted with 'Individual Player Data (play details within a given game)' 702 and/or 'Team Data (details of play within a given game)' 802 through the 'Overall Game Play List' 500. Additionally, in formation analysis, the 'Player's Overall Play List' 900 can be accessed through 'Player Data (play details within a given game)' 702.

Figure 62:
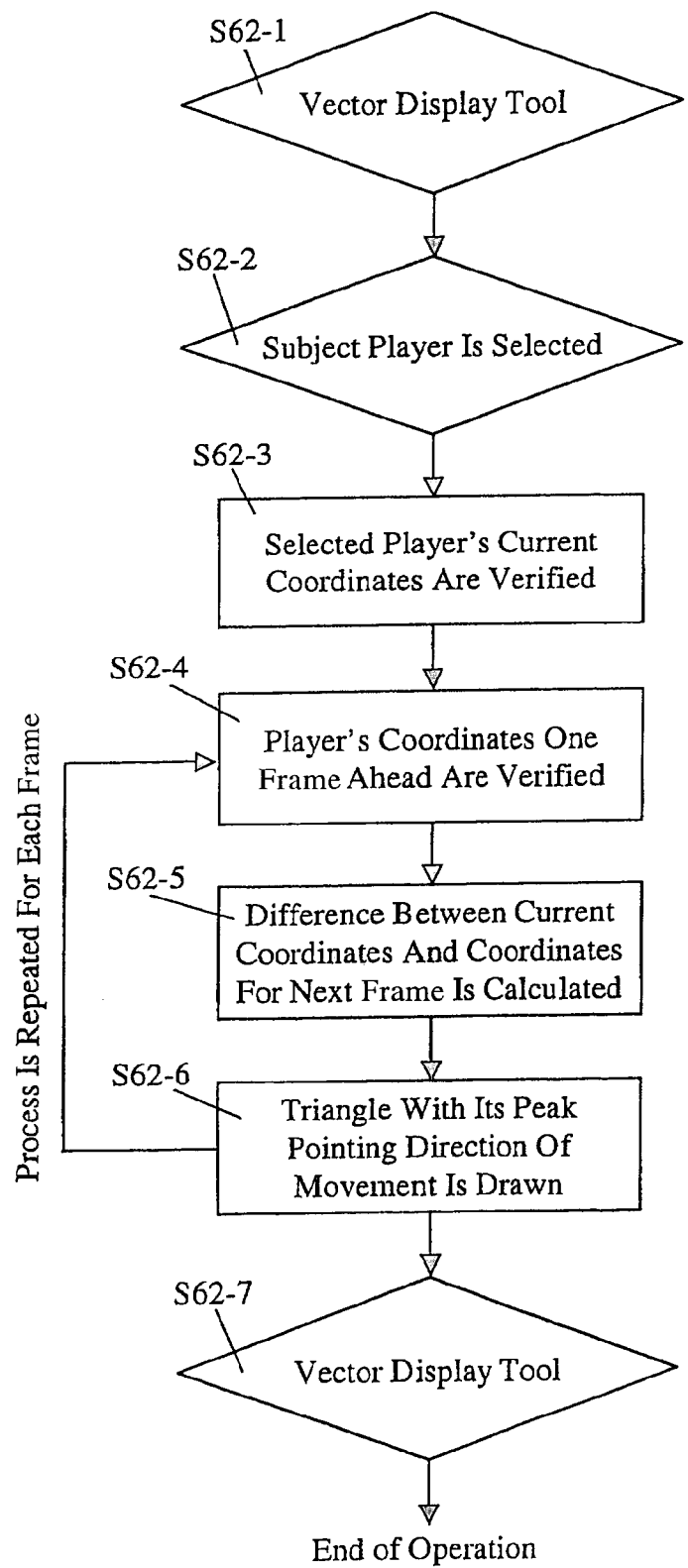
FIG. 62 is a flow chart illustrating the advancement vector display tool shown in FIG. 61.

The further details of the above-mentioned 'Formation Analysis' will be explained with reference to FIGS. 4 to 62.

Figure 2:
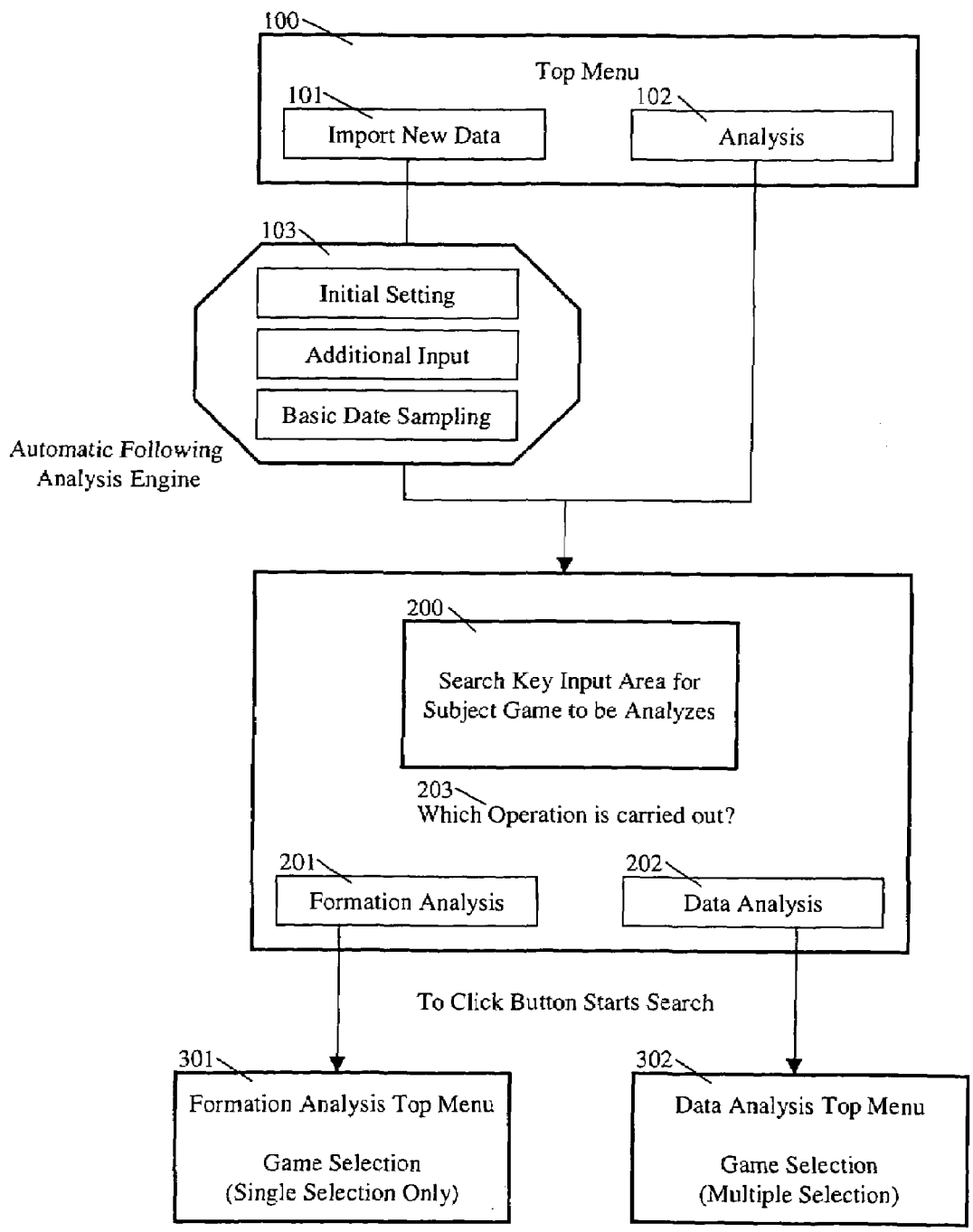
FIG. 2 is a flow chart explaining an operation of the system shown in FIG. 1.
Figure 3:
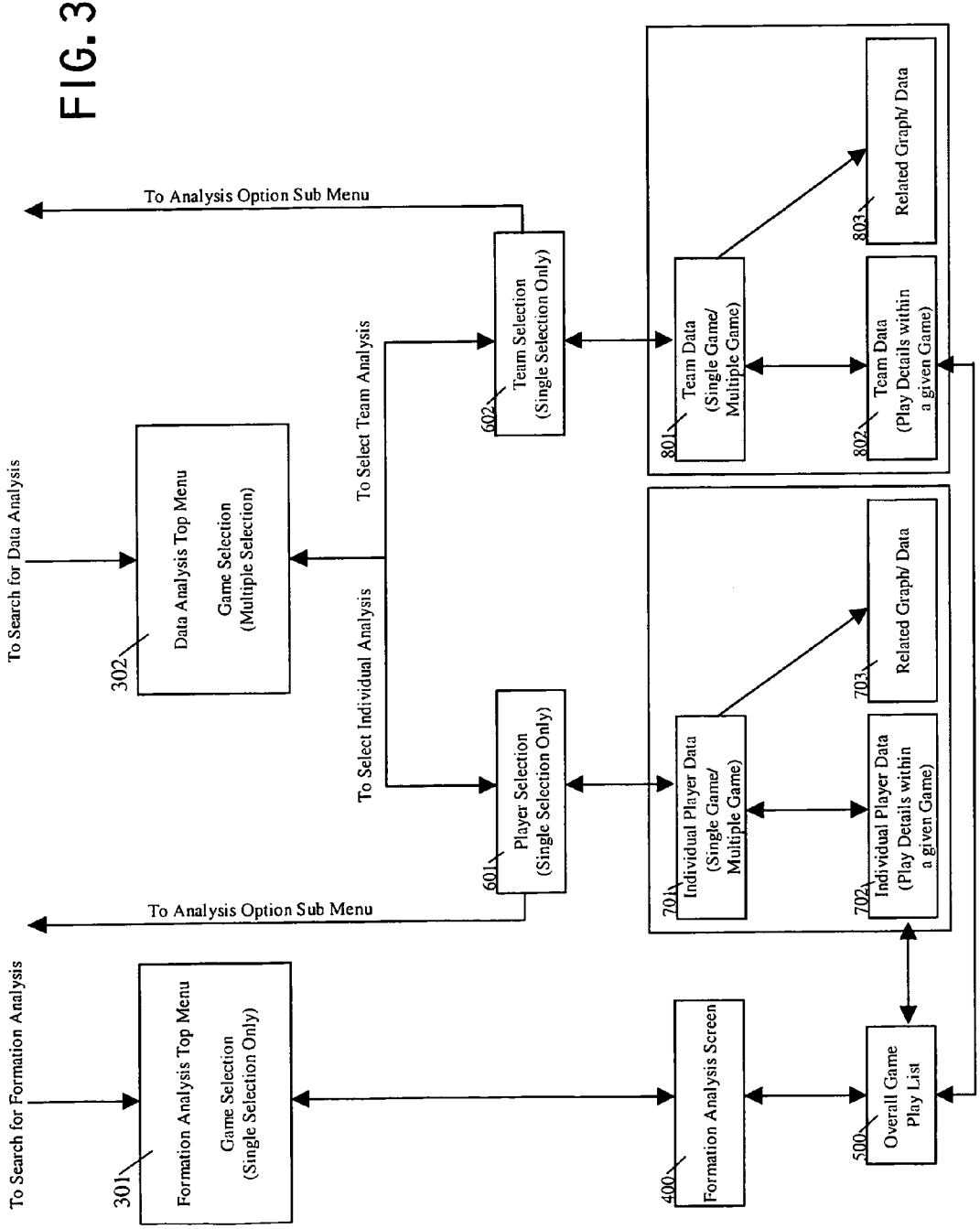
FIG. 3 is a flow chart explaining a different operation of the system shown in FIG. 1.
Figure 4:
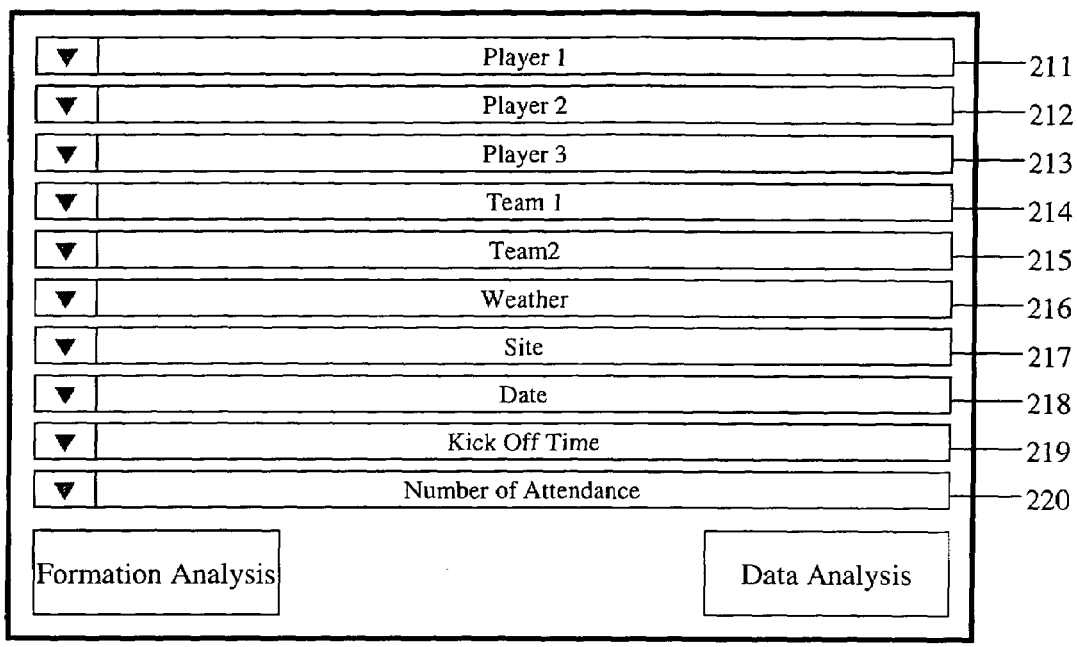
FIG. 4 is a schematic view showing a match list input screen of the system shown in FIG. 1.

The 'Search key input area for the selected team for analyzed' 200 shown in FIG. 2 is constituted as shown in FIG. 4. The 'Search key input area for the selected game to be analyzed' 200 contains 'Player 1' 211, 'Player 2' 212, 'Player 3' 213, 'Team 1' 214, 'Team 2' 215, 'Weather' 216, 'Site' 217, 'Date' 218, 'Kick off time' 219 and 'Number of attendance' 220.

The game analysis system of the present invention is arranged to search the match data (game list) first in both data and formation analyses from the 'Search key input area of the selected game to be analyzed' 200. Here, the user is able to select the desired search key. In other words, the user is allowed to select at least one game to a maximum of all games from the search keys.

Figure 5:
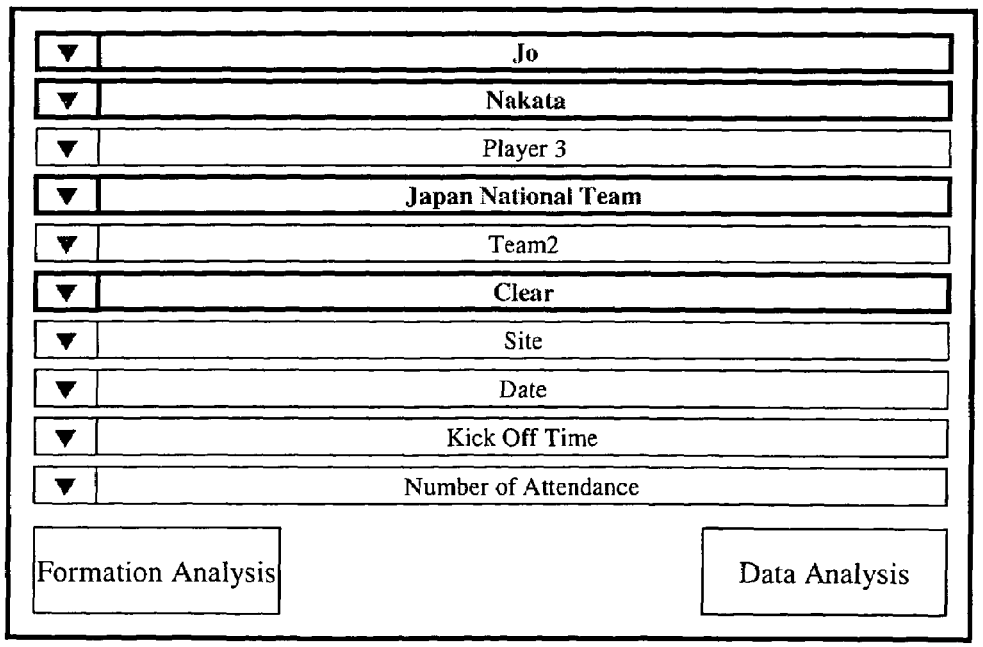
FIG. 5 is a schematic view showing an example of the match list input screen shown in FIG. 4 after the data has been inputted.

For example, as shown in FIG. 5, if 'players Jo and Nakata both played as a member of the Japan National Team on a clear day' is searched, the 'Player 1' 211 option is clicked, and 'Jo' is selected from the pull-down menu, and the 'Player 2' 212 option is clicked and 'Nakata' is selected from the pull-down menu. The 'Team 1' 214 option is clicked and 'Japan National Team' is selected. The 'Weather' 216 option is clicked and 'Clear' is selected from the pull-down menu to create the search key.

When the search is started with this sub-menu, the user would select either the 'Formation Analysis' 201 or 'Data analysis' 202.

The explanation will be continued assuming that 'Formation Analysis' 201 is selected.

Figure 6:
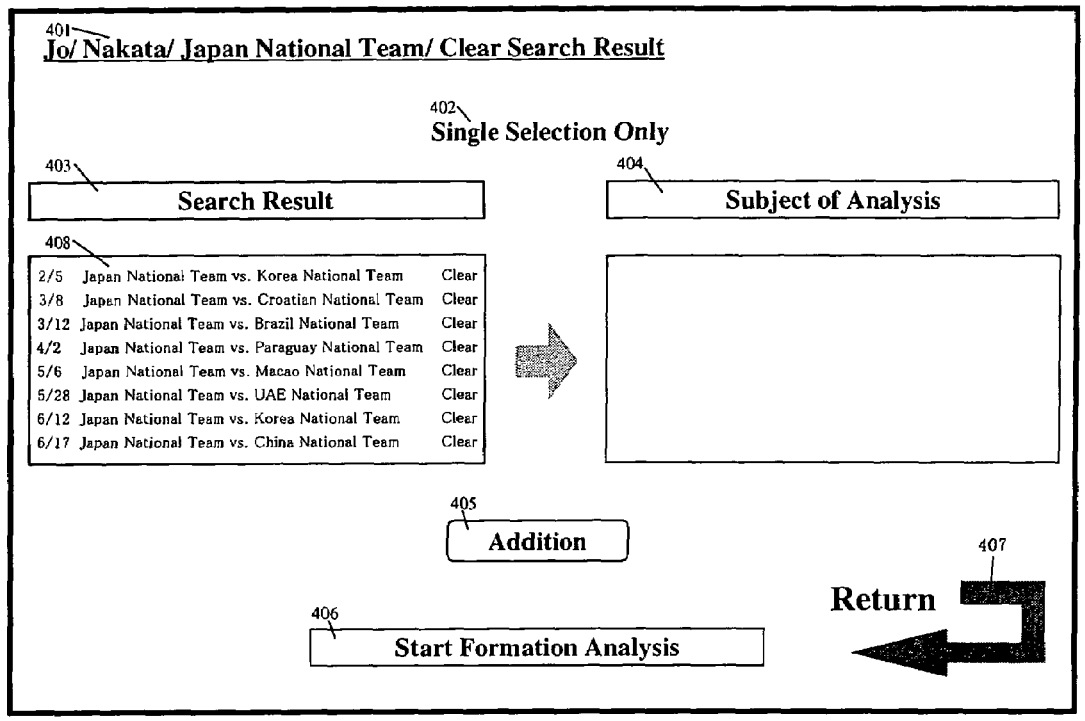
FIG. 6 is a schematic view showing a sample screen as a result of the match list search shown in FIG. 5.

In the example mentioned above, the heading 'Jo/Nakata/Japan National Team/Clear search results' 401 will appear as shown in FIG. 6. Underneath, there will also be the headings 'single selection only' 402, 'Search Results' 403, 'Subject of Analysis' 404, 'Addition' 405, 'Start Formation Analysis' 406, and 'Return' 407.

In this example, list 408 of 'Search results' 403 show the followings:

| | | |
|---|---|---|
| 2/5 | Japan National Team vs. Korea National Team | Clear |
| 3/8 | Japan National Team vs. Croatian National Team | Clear |
| 3/12 | Japan National Team vs. Brazil National Team | Clear |
| 4/2 | Japan National Team vs. Paraguay National Team | Clear |
| 5/6 | Japan National Team vs. Macau National Team | Clear |
| 5/28 | Japan National Team vs. UAE National Team | Clear |
| 6/12 | Japan National Team vs. Korea National Team | Clear |
| 6/17 | Japan National Team vs. China National Team | Clear |
| 6/29 | Japan National Team vs. Argentina National Team | Clear |
| 7/12 | Japan National Team vs. Saudi Arabia National Team | Clear |

Here, as explained before, the start analysis button on the bottom of the screen and the destination of the link will differ depending on whether the games were searched for 'Formation Analysis' 201 or 'Data analysis' 202.

In the following, 'Formation Analysis' 201 will be described.

Figure 7:
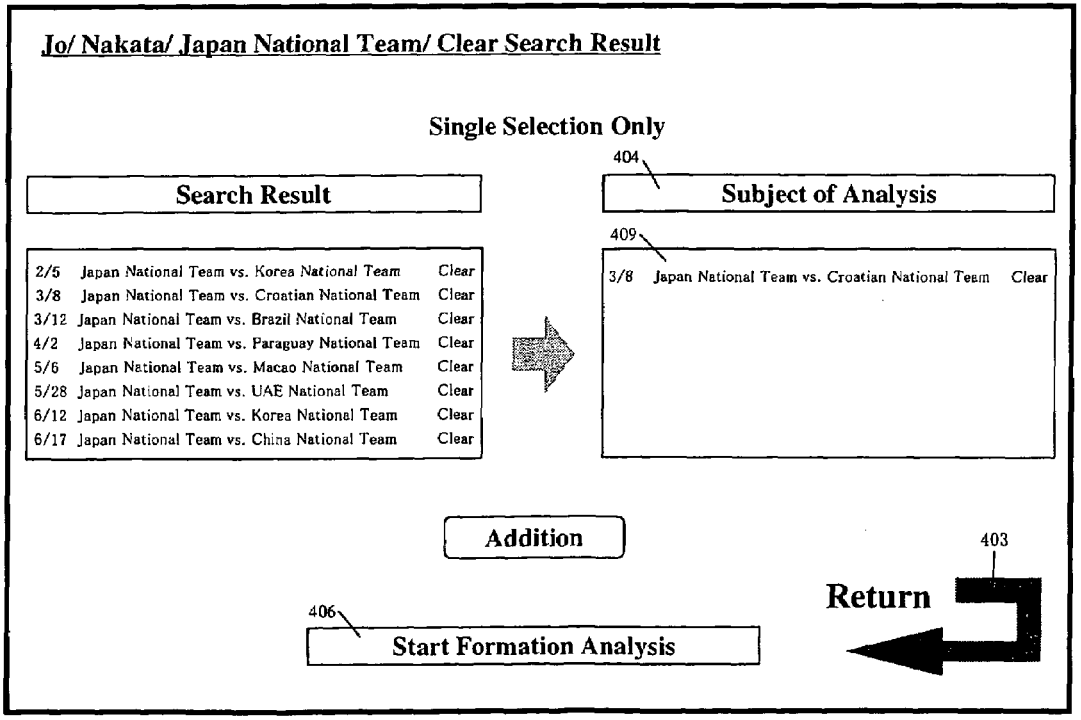
FIG. 7 is a schematic view showing a formation analysis screen resulting from the match list search shown in FIG. 6.

FIG. 7 shows the 'Formation Analysis-Contents set-up screen headings'. One game is selected (single selection only) from the match list. In this example, the '3/8 Japan National Team vs. Croatia National Team Clear' is clicked. The corresponding subject heading 409 under 'Subject of Analysis' 404 appears as:

3/8 Japan National Team vs. Croatia National Team Clear.

Figures 8, 9:
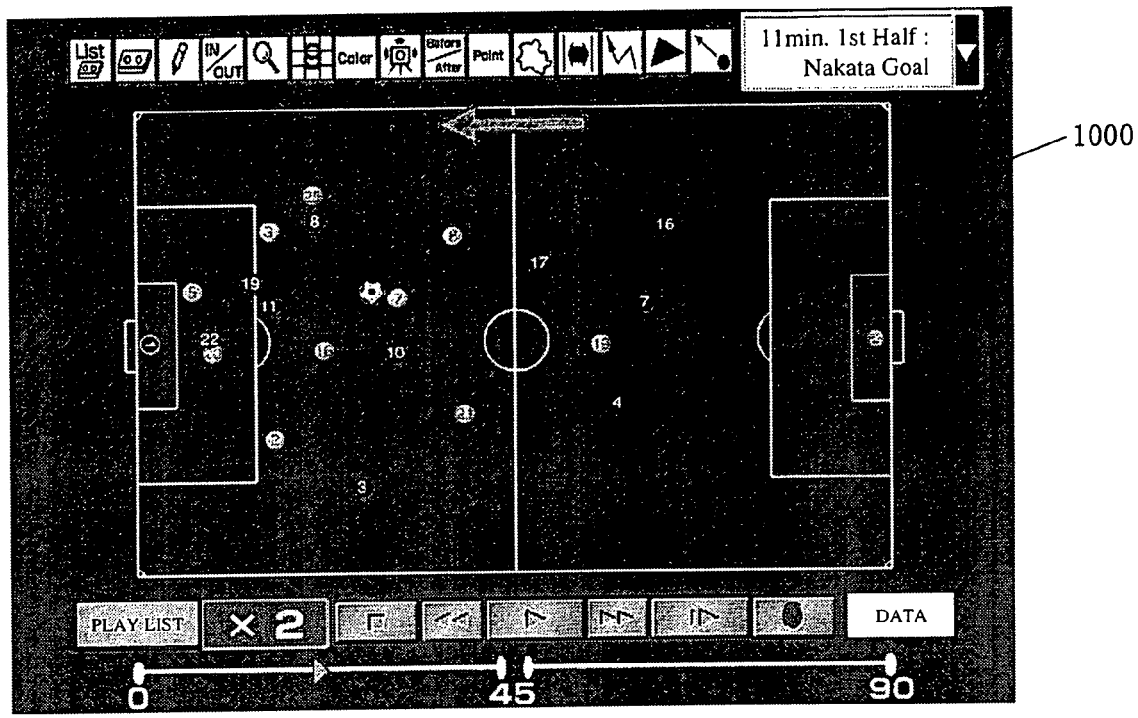
FIG. 8 is a schematic view showing a sample formation analysis interface screen of the system shown in FIG. 1.
FIG. 9 is a schematic diagram showing a sample database obtained from the automatic tracking device shown in FIG. 1.

By clicking the heading 'Start Formation Analysis' (406), the user will proceed to the 'Formation Analysis Interface' (1000) screen, as shown in FIG. 8.

The 'Formation Analysis Interface' 1000 screen shown in FIG. 8 is performed by the interface section 30 shown in FIG. 1, and visually displays data of the database obtained through the automatic tracking device 20 on the image display device 50 using computer graphics (hereafter referred to as CG).

The movement of the player and/or the ball appears on the CG screen as shown in FIG. 9 derived from the translation of the changes in the x, y and z data coordination (translation of numeric value) of the database.

As the automatic tracking device 20 enables to acquire the coordination of the image by frame, the user is able to obtain more concrete data for matters that could only be understood intuitively until now, such as the actual running speed of the players (speed and direction), and ball speed (speed and direction) derived from the changes in speed of the coordinates (speed and direction).

In this example, all the values for the z coordinate are set to be '0' as shown in FIG. 9, in order to simplify the explanation of the Formation Analysis Interface 1000 in FIG. 8. This shows the CG in two dimensions (flat), but it is also possible to utilize three dimension (3D) graphics to create a more realistic interface. Additionally, viewing points can be changed as an option, and enlargements and reductions of 3D graphics can also be done to facilitate users' comprehension.

Figure 10:
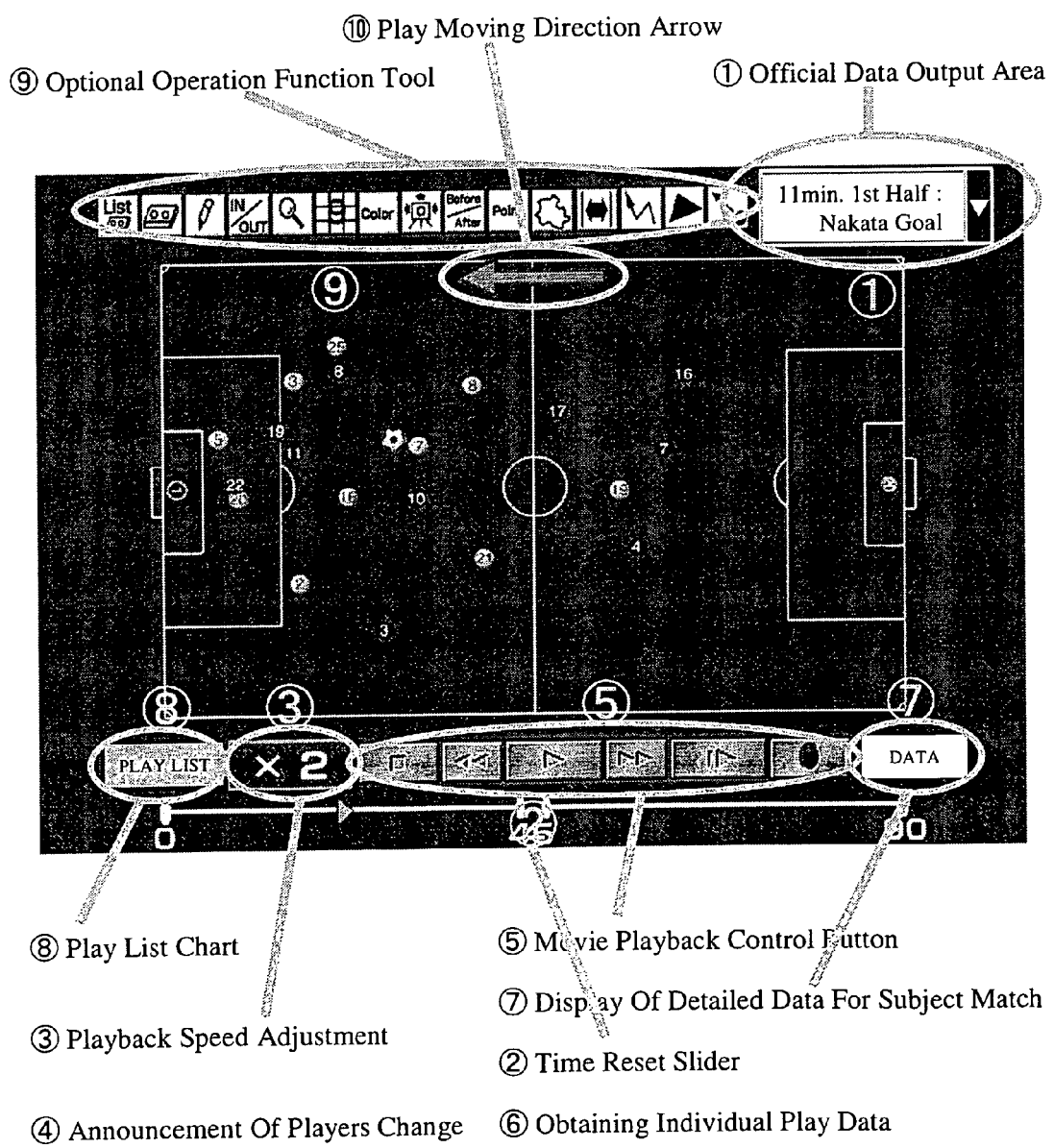
FIG. 10 is a schematic view showing a structure and a function of a formation analysis interface screen.

The structure and function of the formation analysis interface of the game analysis system will be explained with references to FIGS. 10 to 62.

Figure 11:
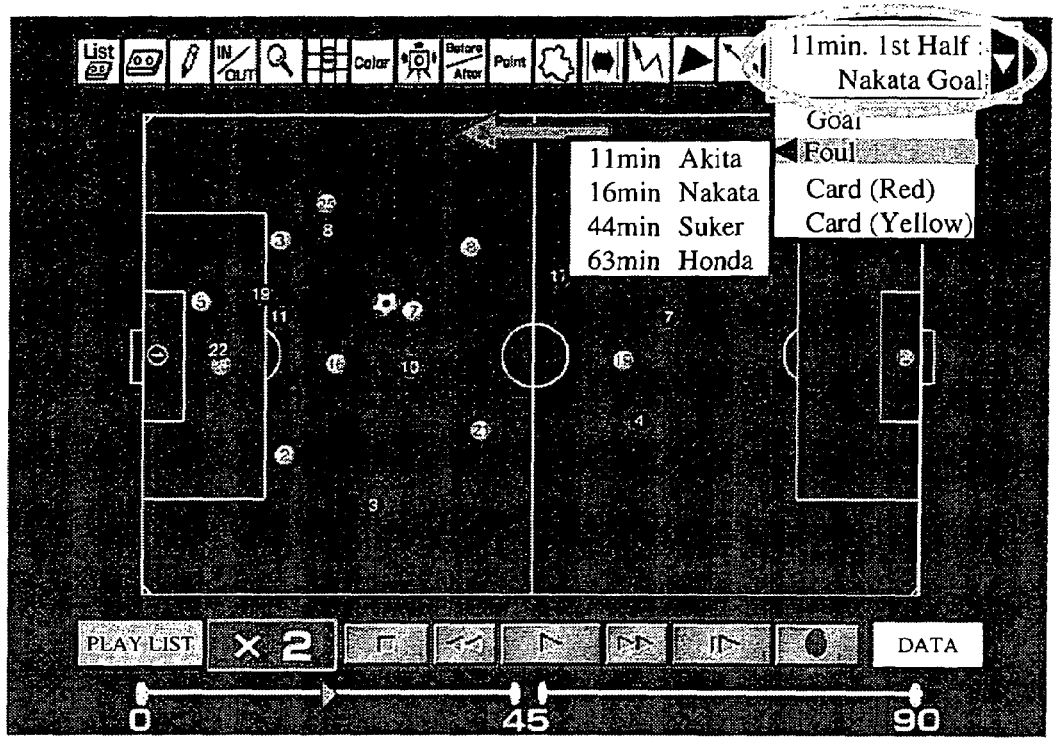
FIG. 11 is a schematic view showing an official data output area of the formation analysis interface screen shown in FIG. 10.

1. Official Data Output Area (FIGS. 10, 11 and 12)

The official records in the initial setting are displayed on progress of time. Although nothing other than the inputted information appears, information that need subtle judgments such as goals and own goals (suicide points) will be correctly provided. As shown in FIG. 11, the pull-down menu of the official data will appear by clicking the down arrow to the right of the output area, and the user can switch to another time in the official data in order to analyze its contents. Consequently, exact information can be obtained through the linkage to the official data.

Figure 12:
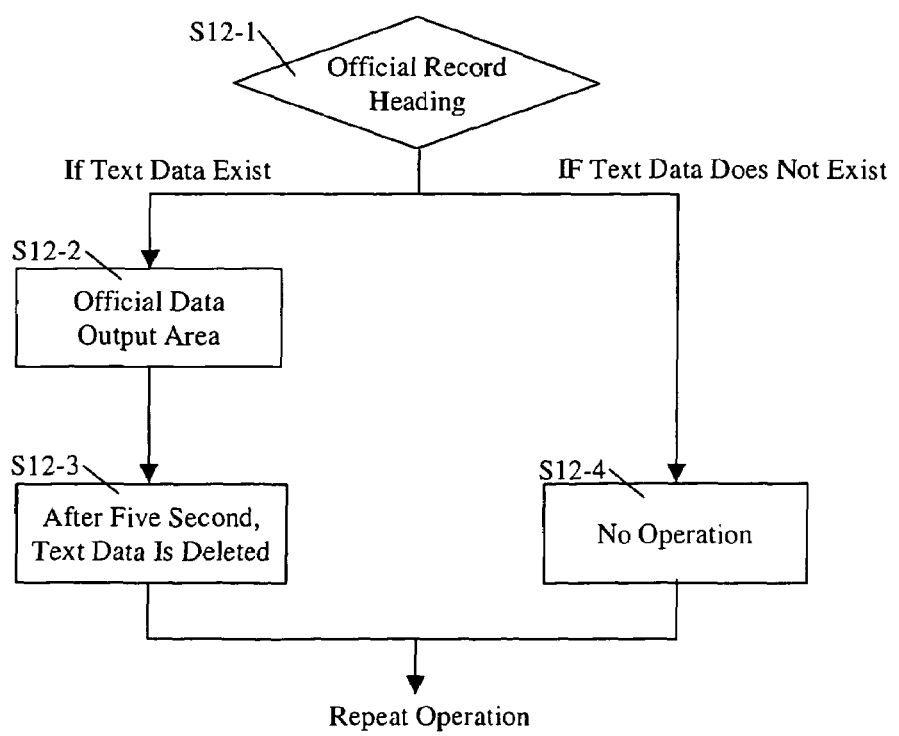
FIG. 12 is a flow chart explaining an operation of an official data output area tool.

FIG. 12 illustrates the operation flow of the official data output area. First, the 'Official Record Heading' will be verified (Step S12-1) for each frame. If text data exists as a result of the verification, it will appear in the official data output area (Step S12-2) for five seconds, regardless of the play back speed. After five seconds, the text data is deleted (Step S12-3). On the other side, it will not operate if text data does not exist (Step S12-4).

Figure 13:
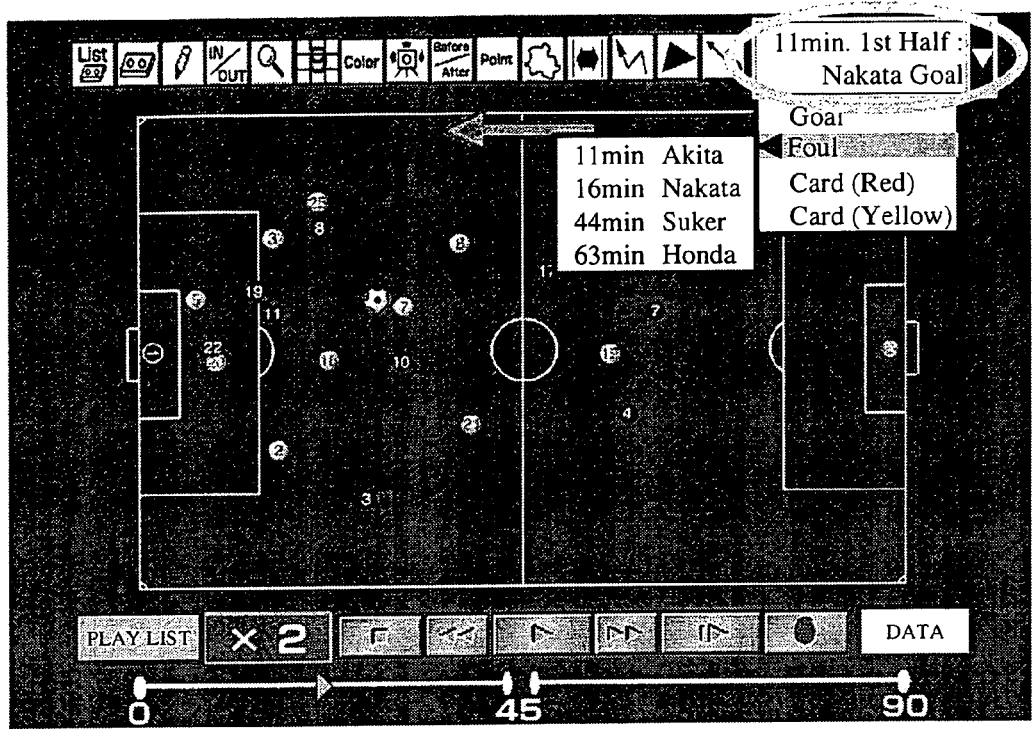
FIG. 13 is a schematic view showing a time reset slider of the formation analysis interface screen shown in FIG. 10.
Figure 14:
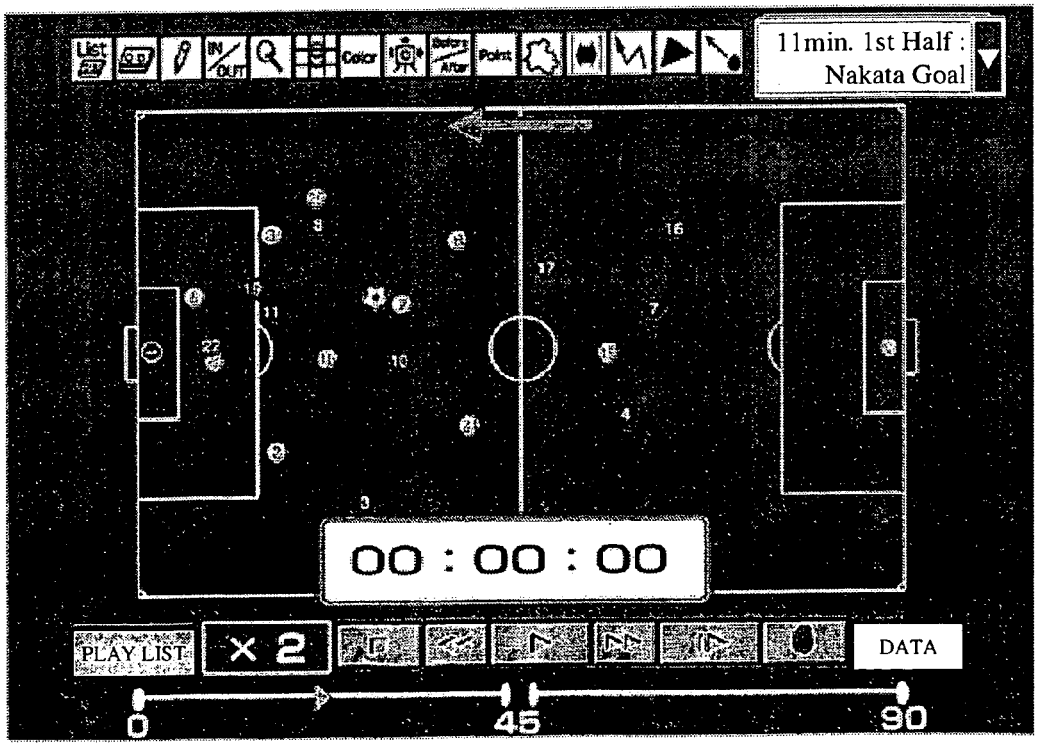
FIG. 14 is a schematic view showing a direct time input window of the time reset-slider of the formation analysis interface screen shown in FIG. 10.

2. Time Reset Slider (FIGS. 10, 13 and 14)

The desired time period to be played back can be selected from the main interface by using the time reset slider. The time display is arranged to change automatically according to the number of frames in the data. For example, if the game runs into overtime, the scale will be longer than 90 minutes. In addition, by double clicking on the 'knob' of the time reset slider (the triangle shape seen in FIGS. 13 and 14), the window appears through which time can be directly inputted as an optional method for setting time. Consequently, the user is able to input the desired time length in order to analyze data efficiently.

Figure 15:
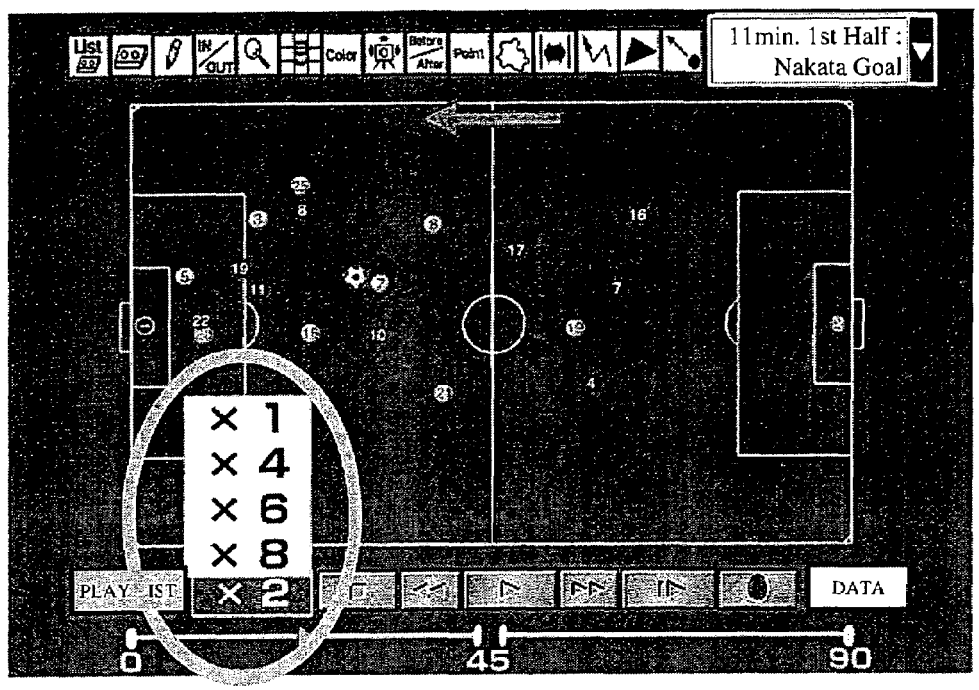
FIG. 15 is a schematic view showing a playback speed adjustment pull-down menu of the formation analysis interface screen shown in FIG. 10.

3. Play Back Speed Adjustment Pull-down Menu (FIGS. 10 and 15)

The playback speed of the play analysis CG can be adjusted from the normal speed of 90 minutes to eight times the normal speed of 7.5 minutes. The adjustment of playback speed increases the efficiency of the analysis.

Figure 16:
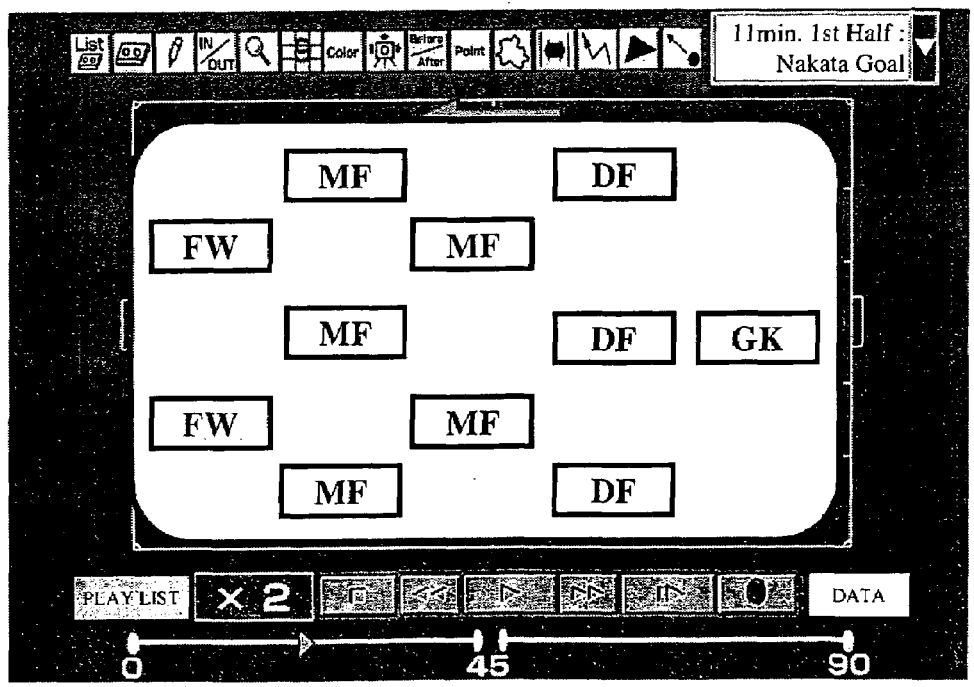
FIG. 16 is a schematic view showing a formation (position) set up at a time of a player change of the formation analysis interface screen shown in FIG. 10.

4. Announcement at Player Change (FIG. 16)

Player changes will always appear on the screen in big letters as 'Change' whenever it takes place since it is possible that the viewers will continue to watch the screen without noticing it. If a player change occurs, the initial setting of the formation (position) set up screen will appear, and the formation will be reset on this screen after the change (FIG. 16). This provides the user an easy interface.

Figure 17:
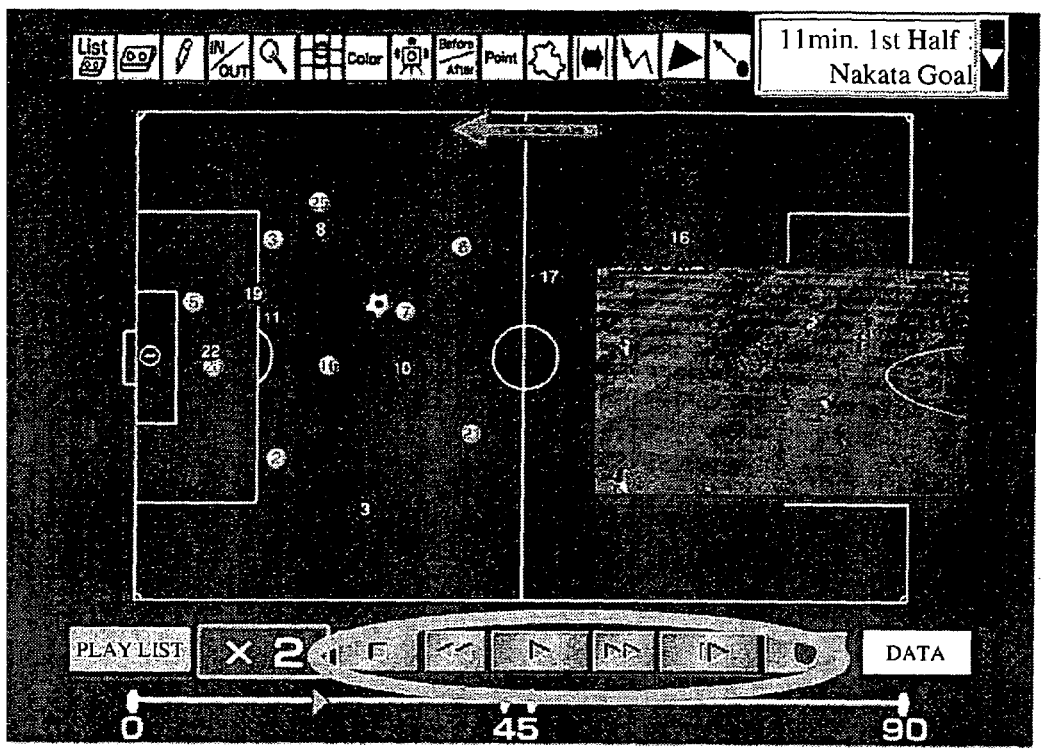
FIG. 17 is a schematic view showing the movie playback control buttons of the formation analysis interface screen shown in FIG. 10.

5. Movie Playback Control Button (FIGS. 10 and 17)

This button enables to set up stop play, fast forward, rewind, stop, slow playback, and video edit recording. It can be used as the control interface during the playbacks of analysis CG movies and videos. A complete correlation between CG movies and videos is made possible through a time coding, like if the user fast forwards the video, CG movie will be fast forwards as correlated. Further, by joining the two video machines each for input and output to the computer and pressing the far right (red circle), video can be edited during data analysis. This enables the efficient control of the analysis image and video materials.

6. Obtaining the Individual Play Data (FIGS. 10, 18 and 19)

Figure 18:
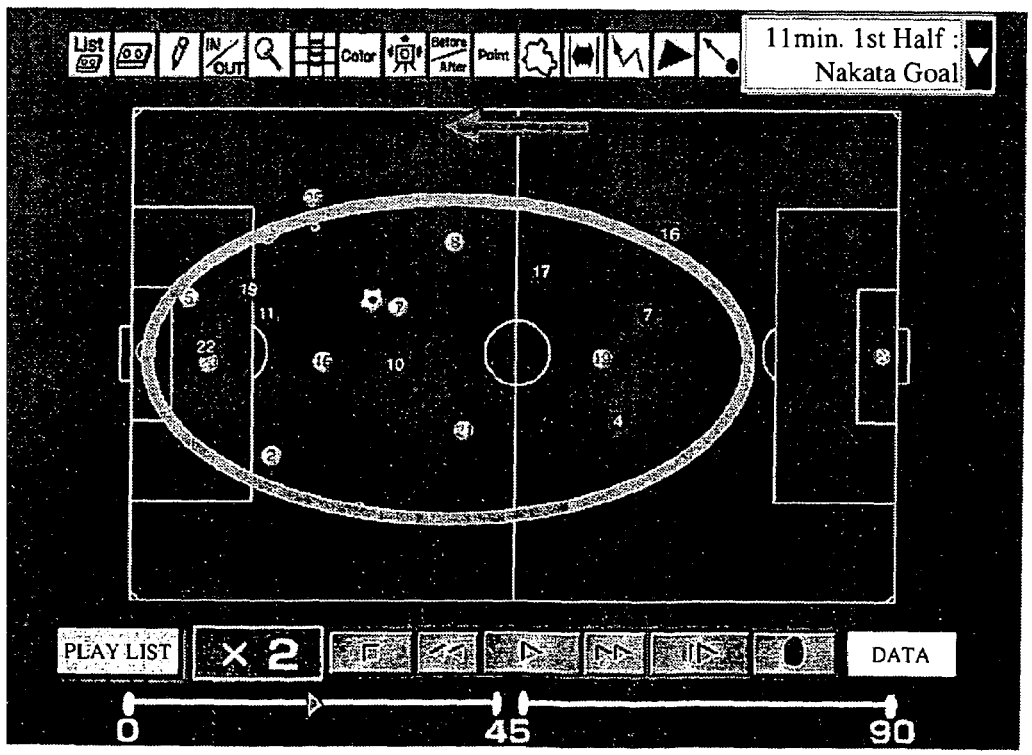
FIG. 18 is a schematic view showing an acquisition of individual play data of the formation analysis interface screen shown in FIG. 10.

The individual player data menu screen will appear when the player icon is double clicked on the screen shown in FIG. 18. By selecting the conditions, the data on various individual plays can be searched and displayed. A seamless correlation with individual play data enables a more detailed data analysis.

Figure 19:
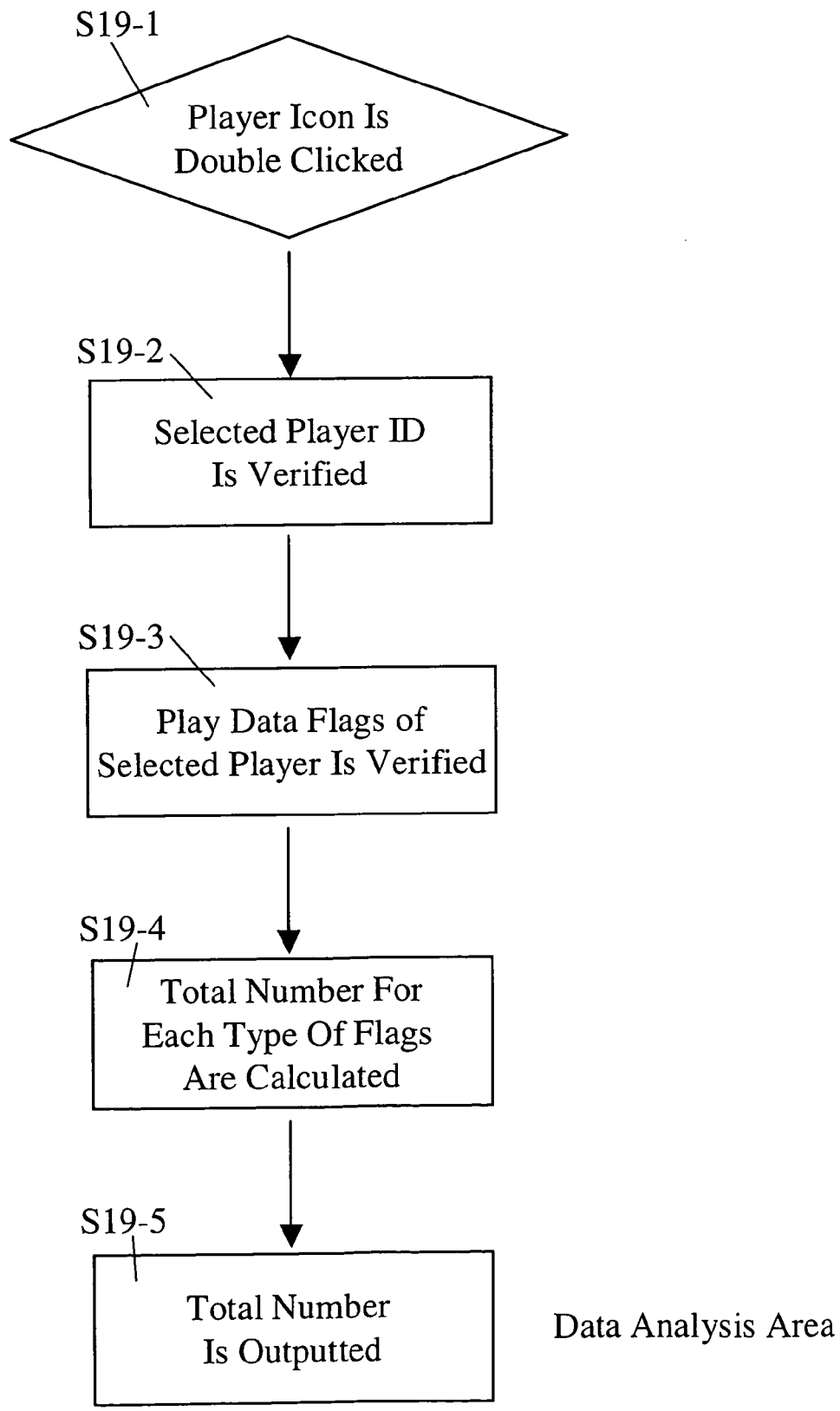
FIG. 19 is a flow chart explaining an operation of the acquisition process of individual play data shown in FIG. 18.
Figure 20:
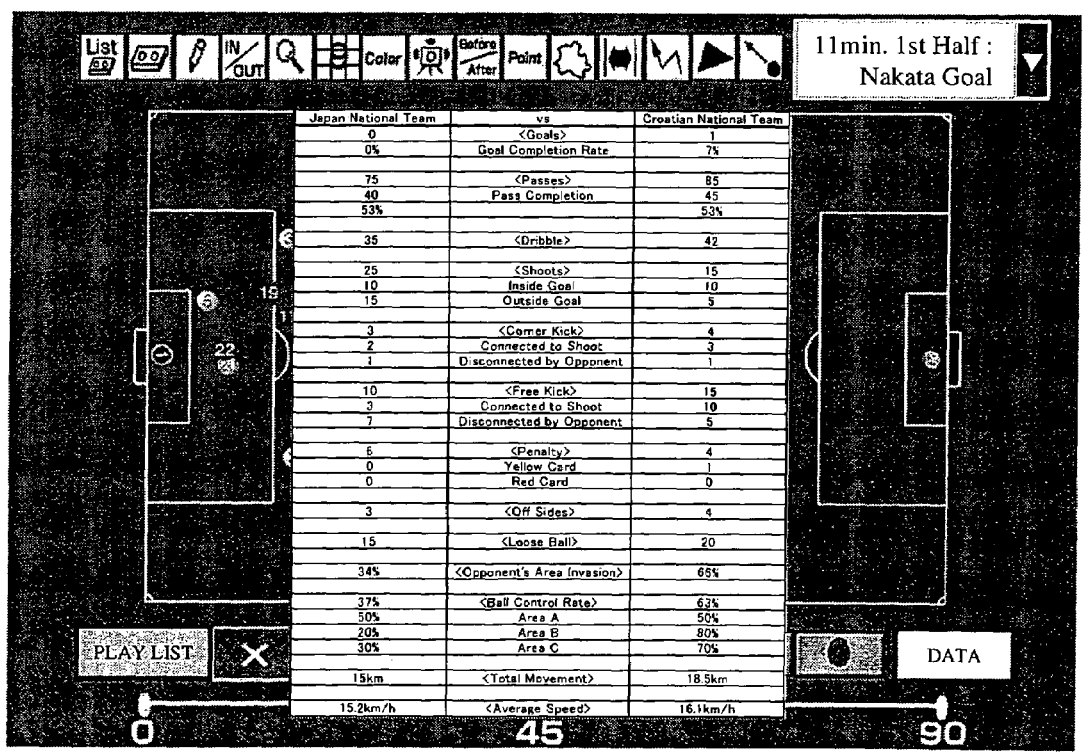
FIG. 20 is a detailed data chart showing a subject match of the formation analysis interface screen shown in FIG. 10.

FIG. 19 shows the flow after the player icon is, double clicked. First, as the player icon is double clicked (Step S19-1), the ID of the selected player is verified (Step S19-2) as well as the play data flags of the player (Step S19-3). After total number for the each type of flags P, D, S, and F, etc. are calculated (Step S19-4), the total number is outputted to the data analysis area in order to display (data analysis chart) (Step S19-5).

7. Display of Detailed Data for the Subject match (FIGS. 10, 20, 21, and 22)

As the detailed data for the subject match tool is activated during formation analysis, the 'number of passes', 'number of shots', and 'ball control rate' as a team will appear up to a given time. For example as shown in FIG. 21, the team comparison data chart will be displayed. This enables an instant numerical analysis of the formation in the subject match.

FIG. 22 shows the operation flow of the detailed match data display. First, the show button is clicked (Step S22-1). At this time, the frame number (n) is verified (Step S22-2), and the play of all players and ball touch flags 'play flag' before the flame are also verified (Step S22-3). The number of each play flag is counted (Step S22-4), and a comparison of the total play number for each flag type and ball control rate are shown. This ends the operation.

Figure 23:
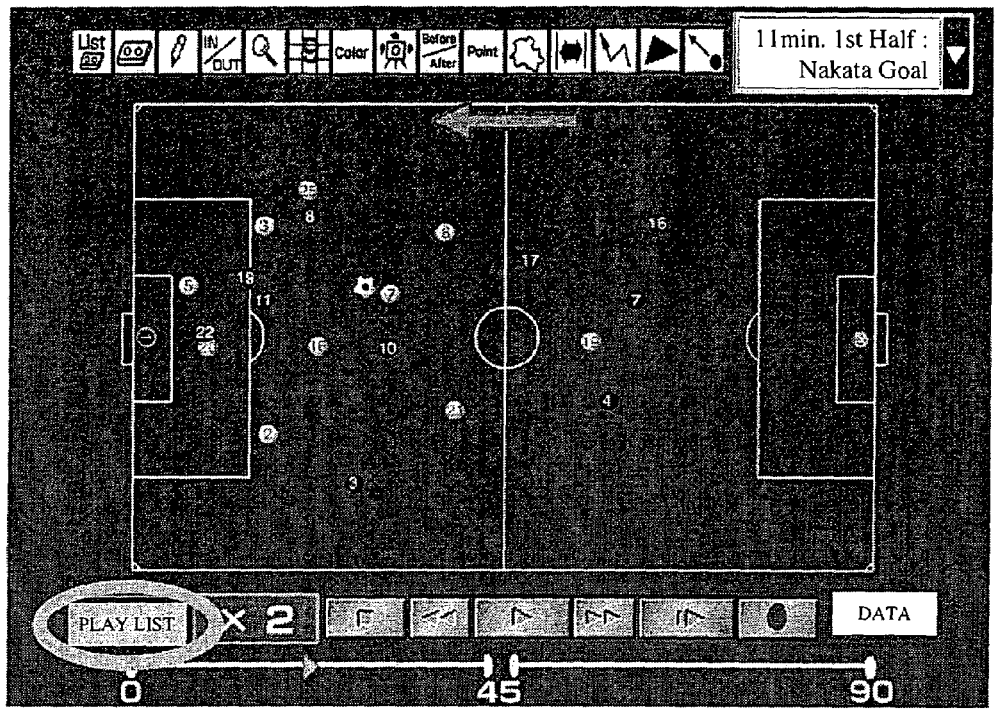
FIG. 23 is a schematic view showing a play list<play package management>of the formation analysis interface screen shown in FIG. 10.

8. Play List Chart (Package Management of Plays) (FIG. 23)

Plays in a soccer game can be managed by dividing them into units with the dividing lines set at the times when the ball dies or is turned over. For example, as shown in FIG. 21, one play will consist of Jo (P: pass) to Soma (DP: dribble/pass) to Nakayama (S: shoot) to Boban. Like above, if the play is managed as one package until the shoot is blocked or the offensive side changes, it is possible to recall the play list and select specific plays even during formation search. This facilitates the search of a desired scene and play within the flow of the game.

9. Types of Play Lists (FIGS. 24, 25, 26 and 27)

(a) Function and Operation of the Play List

Figure 24:
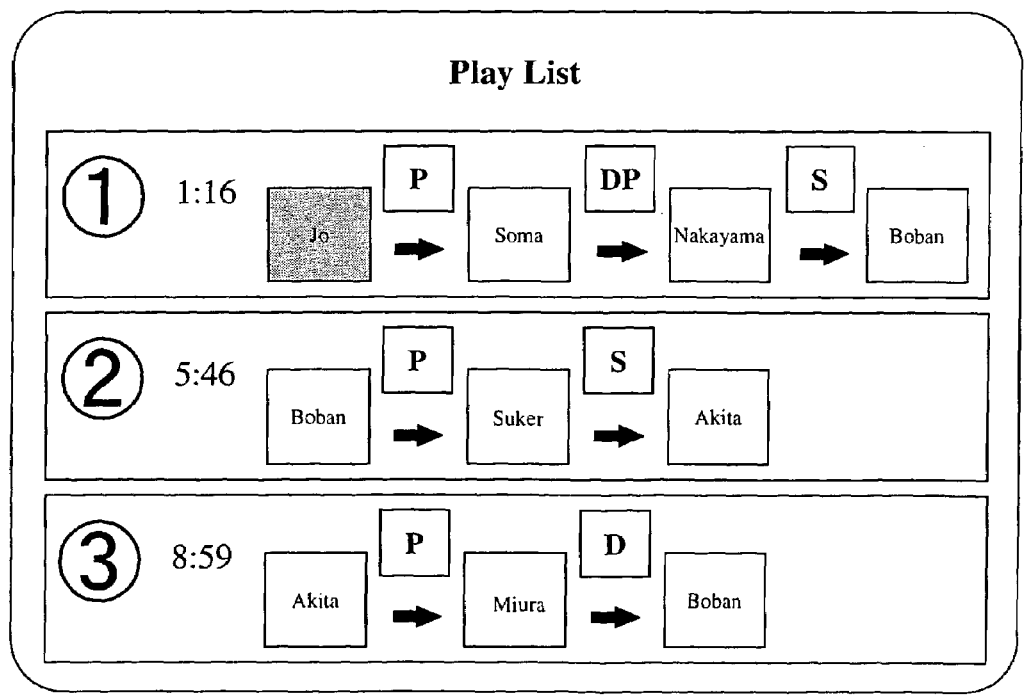
FIG. 24 is a schematic view showing an example of the play list of the formation analysis interface screen shown in FIG. 10.

The play list shows all plays in a game regardless of the sides where plays belong to, and by double clicking on the number in the list, the desired scene can be searched. This list can be used as a link function independent of formation analysis in order to proceed to 'Data Analysis (Individual)'. To give a concrete example, if 'Jo', who is currently turning, is double clicked on a screen as shown in FIG. 24, the screen will change to show a detailed list where all of Jo's passes (P) to in a given game can be verified. The play data at this time is linked to the play flag just after the player's name (see individual play data).

FIG. 25 shows the operational flow of the play list output button. First, when the play list button is pressed (Step S25-1), all the play flag ID in the game will be verified (Step S25-2), and the play flags are totaled for each player (Step S25-3). Next, the totaled play flags are thoroughly verified in order to figure out whom the play belongs (Step S25-4). As the result, if both the player, who now has the ball, and the another player, who had the ball just until now, have the same team ID, this data is added to the same list (Step S25-5). On the other hand if the two players have different team IDs, or if there are no on-play flags, they will be managed under different lists (Step S25-6). The above-mentioned process is repeated until the last frame (Step S25-7) to create an appropriate list (Step S25-8).

(b) Types of Play Lists (b1) Overall game play list (FIG. 26)

The screen will change when the play list button is pressed during 'Formation Analysis'. The screen will also change in if one of the team play data headings is selected and the play list button is pressed in 'Data Analysis'. The screen will show all plays, regardless of the sides to which plays belong.

(b2) Overall Individual Play List (FIG. 27)

As one heading from the individual play data in 'Data Analysis' is selected and the play list button is pressed, the screen will change. All plays, which the specified player took a part, will be listed.

As previously mentioned, 'Formation Analysis' allows a graphic visualization of player movement, but it also contains other various functions to analyze the game from a tactical point of view. These tactical functions are contained in the 'Optional Operational Function Tools' located at the top of the screen. The 'Optional Operational Function Tools' will be explained below 9. Optional Operational Function Tools 9a. Video Playback Tool<Playback by List Search> (FIGS. 28–36)

While watching the formation analysis screen (animation), if the user wishes to watch an actual movement of the play, he can watch the actual image by pressing the 'Video playback tool' (FIG. 28) button. By specifying a time, the videotape will be synchronized with the time code of the animation the to the designated time in order to display the actual game image (FIG. 29) on the computer screen in a different window.

Figure 30:
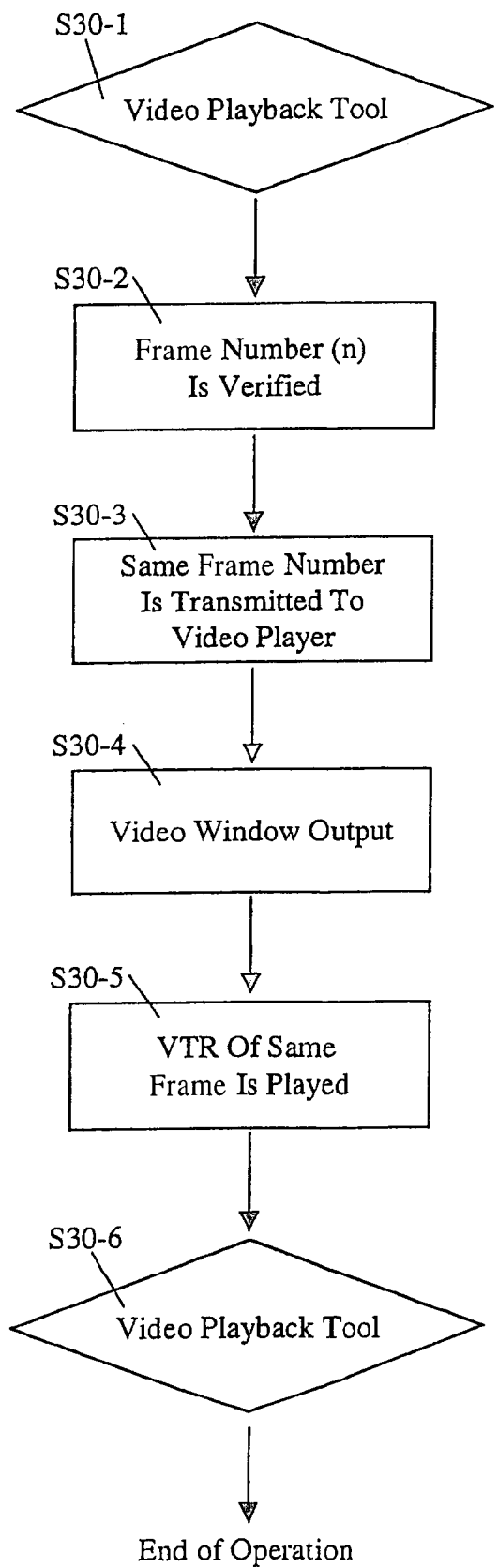
FIG. 30 is a flow chart explaining the video playback tool shown in FIG. 28.

FIG. 30 is a flow chart of the operation of the video playback tool. First, by pressing the video playback button (Step S30-1), the actual frame number is verified (Step S30-2), and the same frame number is transmitted to the video player (Step S30-3). The appropriate image is displayed on the video window (Step S30-4) and the VTR of the same frame is played (Step S30-5). Pressing the 'Video Playback Tool' button ends the operation (Step S30-6).

Figure 28:
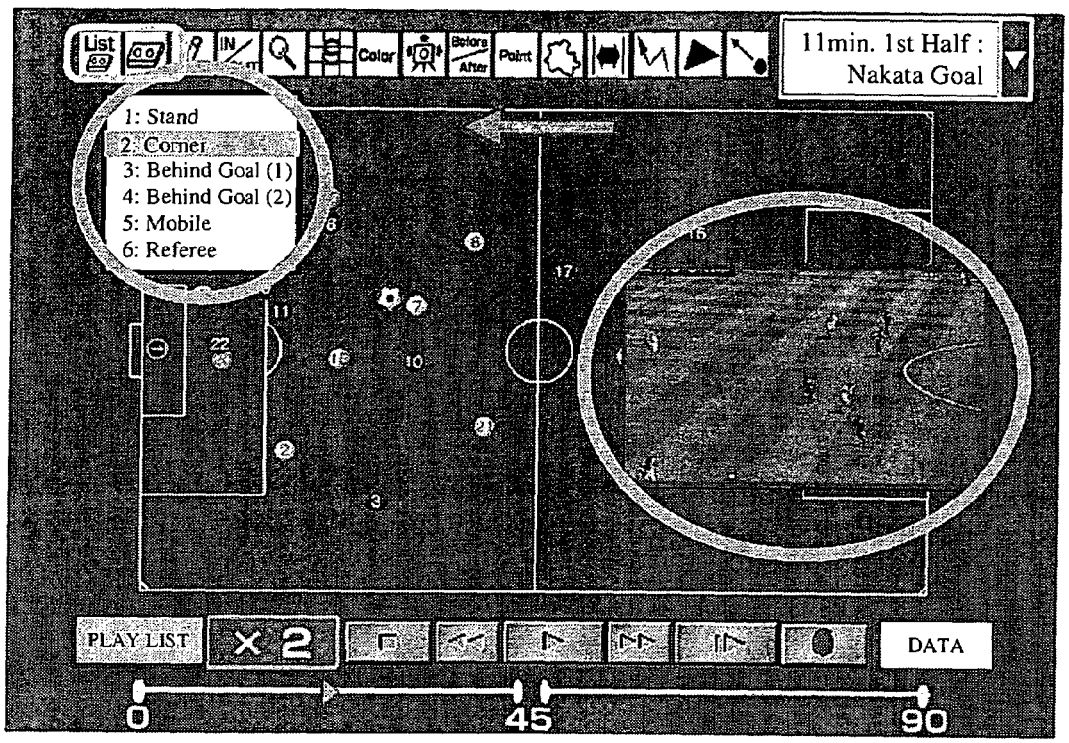
FIG. 28 is a schematic view showing an example of the video playback tool<playback from list search>of the formation analysis interface screen shown in FIG. 10.

While the video playback tool is activated, clicking again on the video playback tool while pressing the 'option' key, the camera angle list included in the initial setting will appear in the pull-down menu. The desired camera angle can be chosen from the pull-down menu (FIG. 28). This function will accommodate when multi-angle sports broadcasting begins, and when video materials recorded from multi dimensions become available. The coordination with the video enables an objective analysis and effective control of multi-angles.

Figure 29:
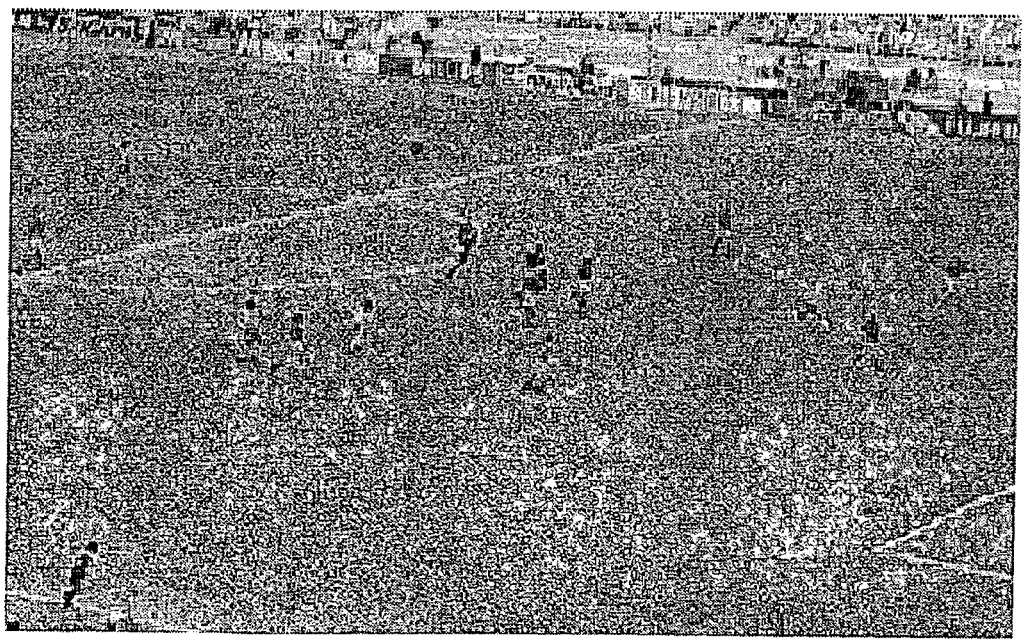
FIG. 29 is a schematic view showing an example of the general camera angle (main analysis image) shown in FIG. 28.
Figure 31:
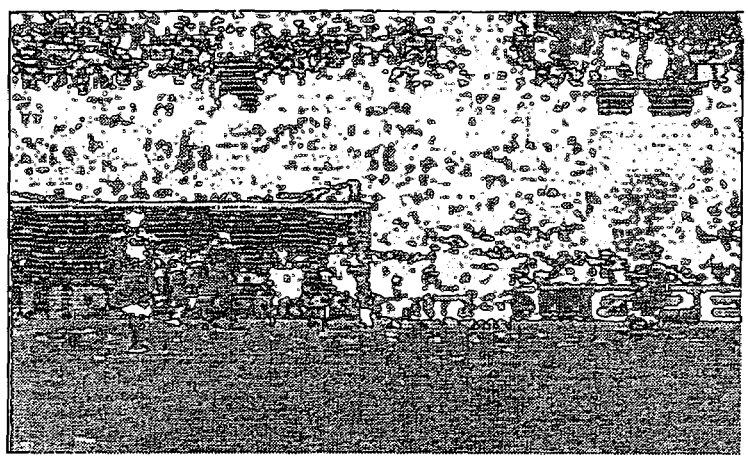
FIG. 31 is a schematic view showing an image taken from the stand opposite the goal shown in FIG. 28.
Figure 32:
FIG. 32 is a schematic view showing an image taken from the front of the goal shown in FIG. 28.
Figure 33:
FIG. 33 is a schematic view showing an image taken from the left main stand shown in FIG. 28.
Figure 34:
FIG. 34 is a schematic view showing an image taken from the ground (mobile camera) shown in FIG. 28.
Figure 35:
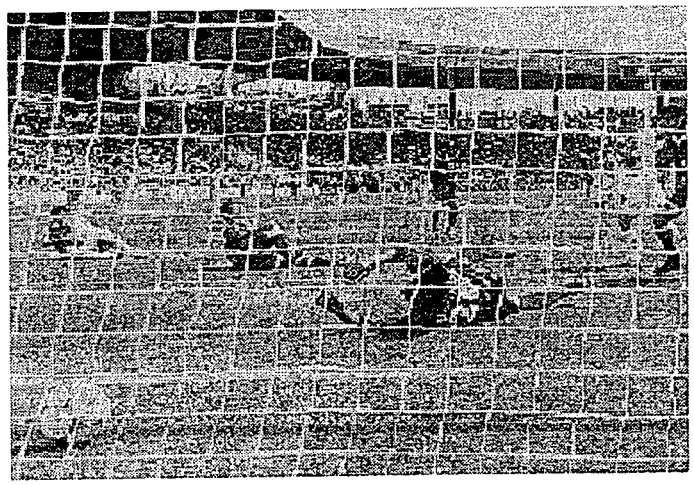
FIG. 35 is a schematic view showing an image taken from behind the goal net shown in FIG. 28.
Figure 36:
FIG. 36 is a schematic view showing an image taken from the corner shown in FIG. 28.

FIGS. 29–36 show examples of angle specifications. FIG. 29 shows the 'Bird's eye view (main analysis image)' angle taken by camera 1. FIG. 31 shows the 'stand opposite the goal' angle taken by camera 2. FIG. 32 shows the 'goal front' angle taken by camera 3. FIG. 33 shows the 'left main stand' angle taken by camera 4. FIG. 34 shows the 'ground <mobile camera>' angle taken by camera 5. FIG. 35 shows the 'behind the goal net' angle taken by camera 6. FIG. 36 shows the 'corner' angle taken by camera 7.

The present invention is also constructed in order to accommodate for the prevalence of digital technology in the future, where sport games will be recorded from over 20 cameras to create a multi-angle recording. In addition to the overall bird-eye view, images simultaneously recorded from various angles will be used and synchronized with the game analysis by time code.

Figure 37:
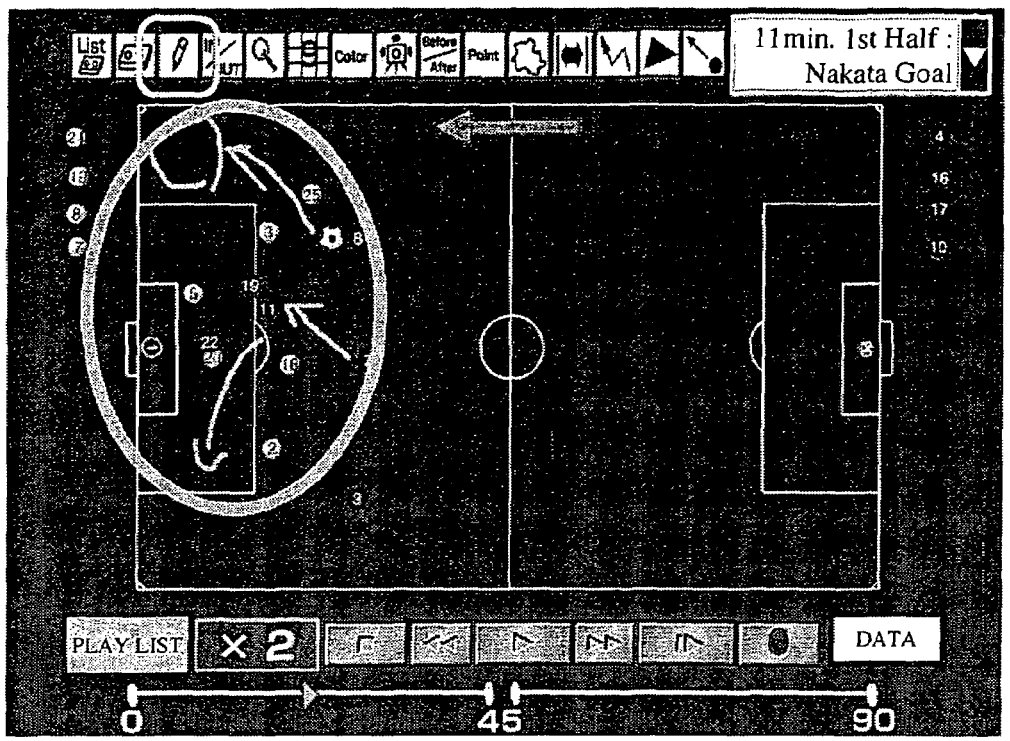
FIG. 37 is a schematic view showing the chalking tool of the formation analysis interface shown in FIG. 10.

9b. Chalking Tool (FIGS. 10, 37, and 38)

The chalking tool provides an effective tool at meetings where lectures on formations are given. By pressing the chalking tool button that looks like a pencil, the formation CG image will pause, the cursor will become a pencil shape, and can be used to freely make marks on the screen. This enables a detailed lecture on each situation.

Figure 38:
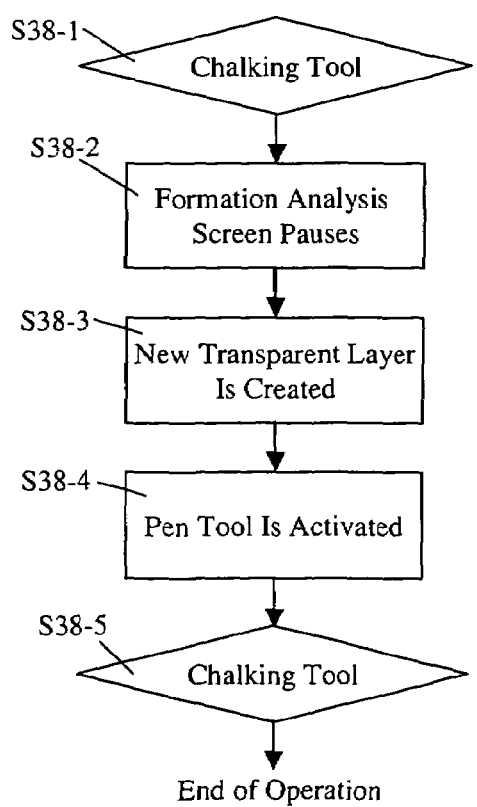
FIG. 38 is a flow chart illustrating the operation of the chalking tool.

FIG. 38 shows the operation of the chalking tool. First, when the chalking tool button is pressed (Step S38-1), the formation analysis screen (animation) pauses (Step S38-2). A new transparent layer is created (Step S38-3), and the pen tool is activated (Step S38-4). Pressing the chalking tool button again ends the operation (Step S38-5).

Figure 39:
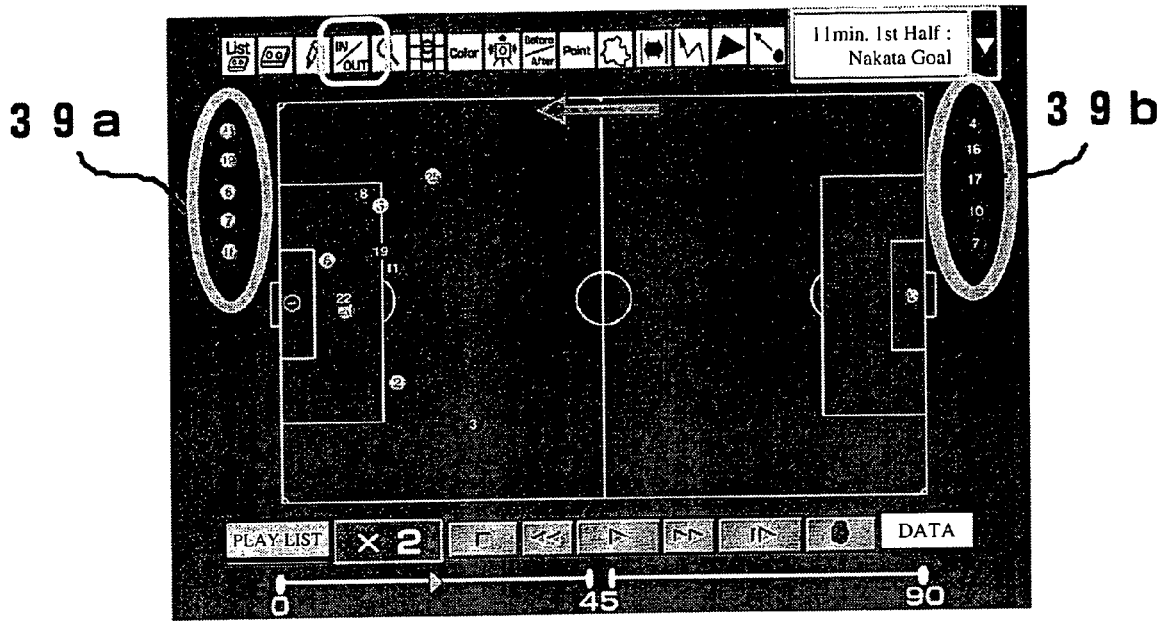
FIG. 39 is a schematic view showing the change of subject player tool of the formation analysis interface shown in FIG. 10.

9c. Subject Player Change Tool (FIGS. 10, 39 and 40)

Formation analysis will be based on over all players' movement. However, for example, if the user likes to analyze the offensive (forward) movement of the user's own team intensively, the subject player change tool can be used. The players who are currently not the subject of analysis are located inside the yellow circles 39a and 39b in FIG. 39. To change the players and activate them, they can be dragged onto the field. On the other hand, to deactivate currently active players, they can be dragged out from the field. This enables a more focused analysis.

Figure 40:
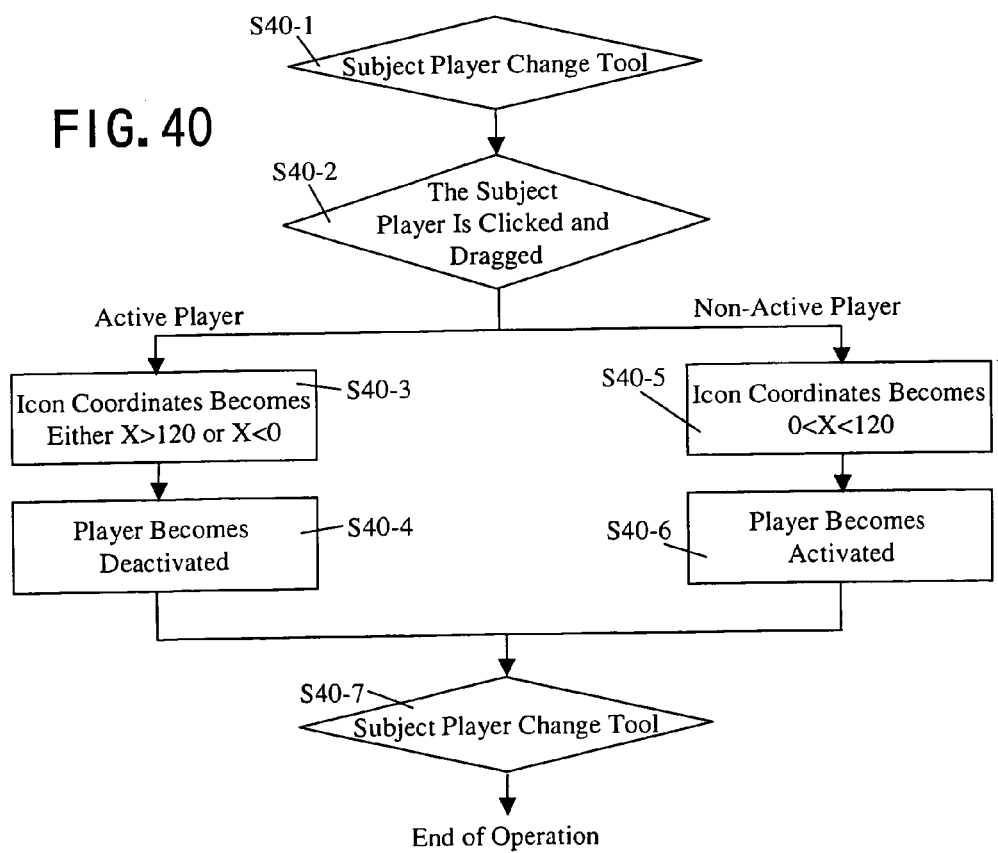
FIG. 40 is a flow chart illustrating the operation of the change of subject player tool shown in FIG. 39.

FIG. 40 shows the operation of the subject player change tool. First, the subject player change tool button is pressed (Step S40-1), and the subject players are clicked and dragged (Step S40-2) If the player to be changed is now active, the icon coordinates become either x>120 or x<0 (Step S40-3) by dragging the player, and he becomes deactivated (Step S40-4). On the contrary, if the player to be changed is now deactivated, the icon coordinates becomes 0<x<120 (Step S40-5) by dragging the player, and he becomes activated (Step S40-6). Pressing the subject player change button is again ends the operation (Step S40-7).

9d. Magnifying Glass Tool for Enlargements and Reductions (FIGS. 10, 41, and 42)

Figure 41:
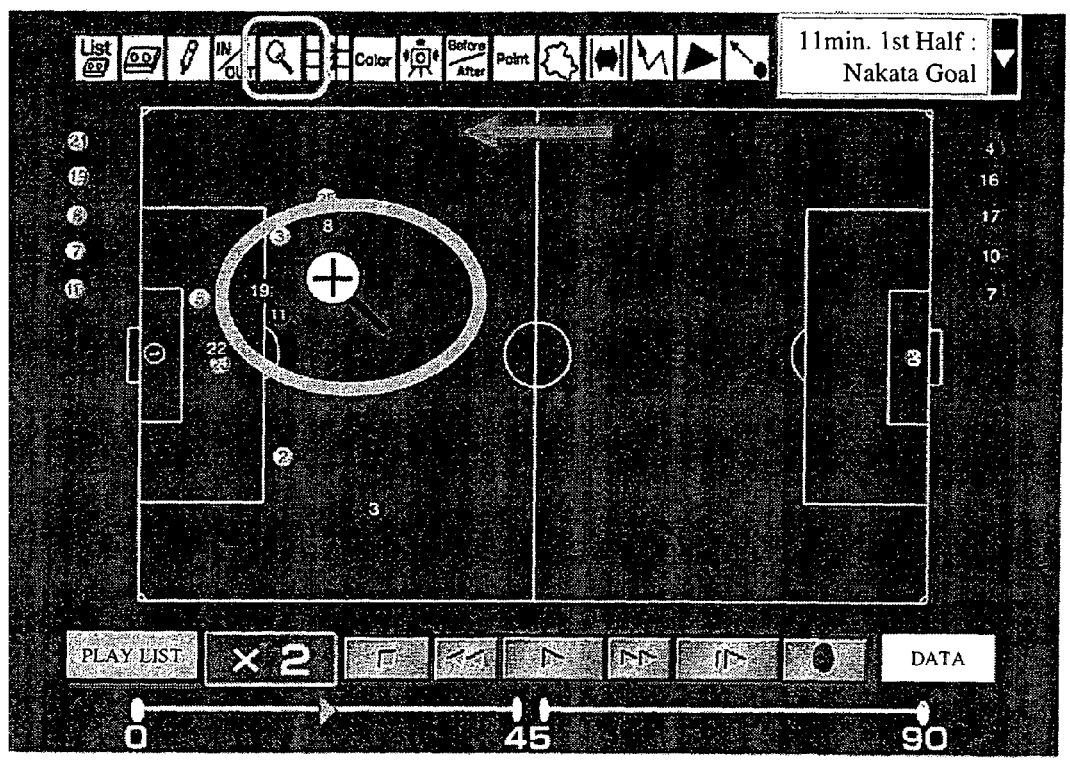
FIG. 41 is a schematic diagram showing the enlargement/reduction magnifying glass display tool of the formation analysis interface screen shown in FIG. 10.

If during data analysis, the area in front of the goal needs to be intensively analyzed as shown in FIG. 41, the magnifying glass tool can be used to enlarge that part of screen. By clicking the magnifying glass on the field, the area around the cursor in the image will be enlarged to two times the original size. To reduce the image, the 'option' key is pressed to change the magnifying glass to a minus sign. By clicking on it while holding down the 'option' key, the image will reduce to 50%. Pressing the tool icon again will deactivate the enlargement and reduction function to bring the image back to its original size. The enlargement of the desired sections allows an effective analysis of specified zones.

Figure 42:
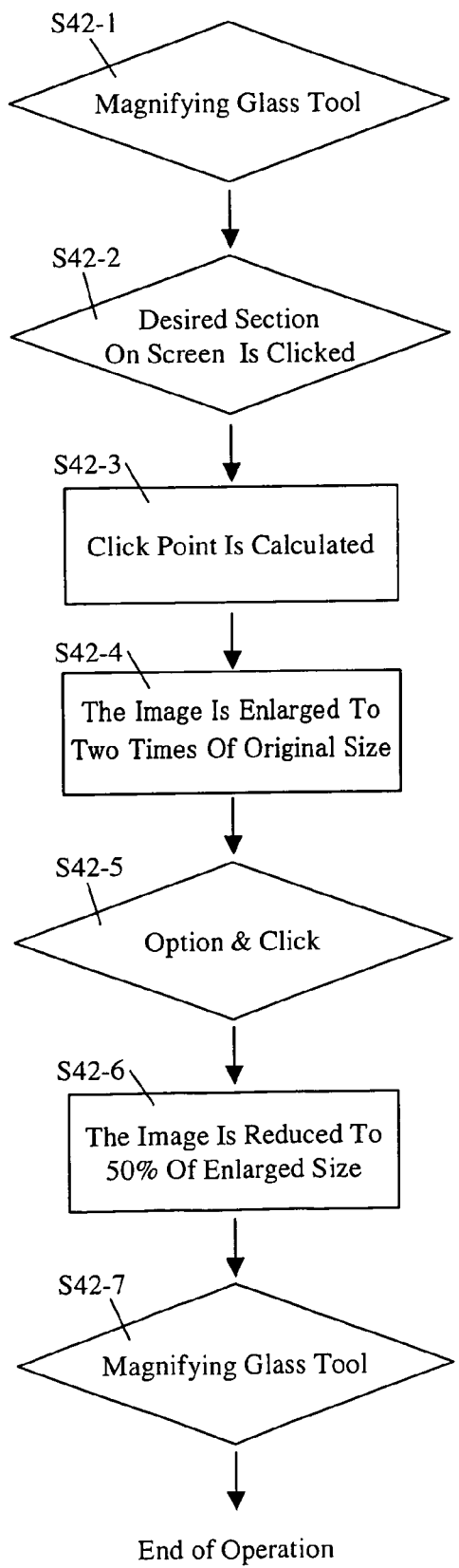
FIG. 42 is a flow chart illustrating the display enlargement/reduction magnifying glass tool shown in FIG. 41.

FIG. 42 shows the operation of the magnifying glass tool for enlargements and reductions. First, the magnifying glass tool button is pressed (Step S42-1) and the desired section on the screen is clicked (Step S42-2). The clicked point is calculated (Step S42-3) and the area around the cursor in the image will be enlarged to two times the original size (Step S42-4). Pressing the button while holding down the 'option' key will reduce the image to 50% of the enlarged size (Step S42-6). Pressing the magnifying glass tool again (Step S42-7) will bring the image back to its original size, ending the process.

Figure 43:
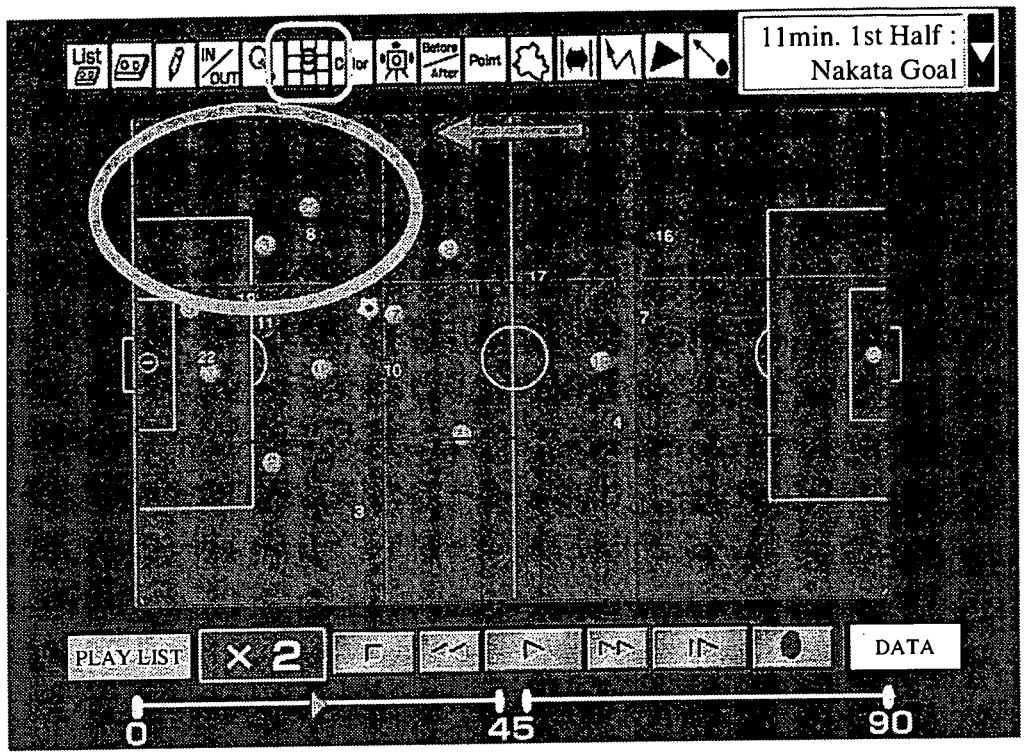
FIG. 43 is a schematic view showing the field block display tool of the information analysis interface screen shown in FIG. 10.

9e. Field Block Display Tool (FIGS. 10, 43 and 44)

The field block display tool can be used to divide the field into blocks and display an enlarged image. Clicking the tool icon will show the division patterns as shown in FIG. 43, and the desired zones of analysis can be clicked to mask all other areas. More than one section can be selected so that, as an example, all three blocks on the right side can be selected. This enables an effective analysis of a narrowed zone on the play field.

Figure 44:
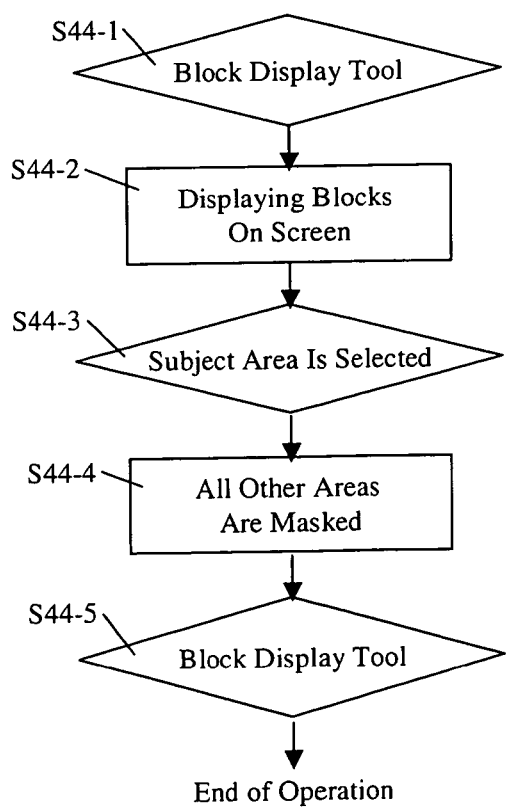
FIG. 44 is a flow chart illustrating the field block display tool shown in FIG. 43.

FIG. 44 shows the operation of the block display tool. First, the block display tool button is pressed (Step S44-1) to display the blocks on the screen (Step S44-2). Next, the subject area is selected (Step S44-3) and all other areas are masked (Step S44-4). Pressing the block display tool button again (Step S44-5) ends the process.

Figure 45:
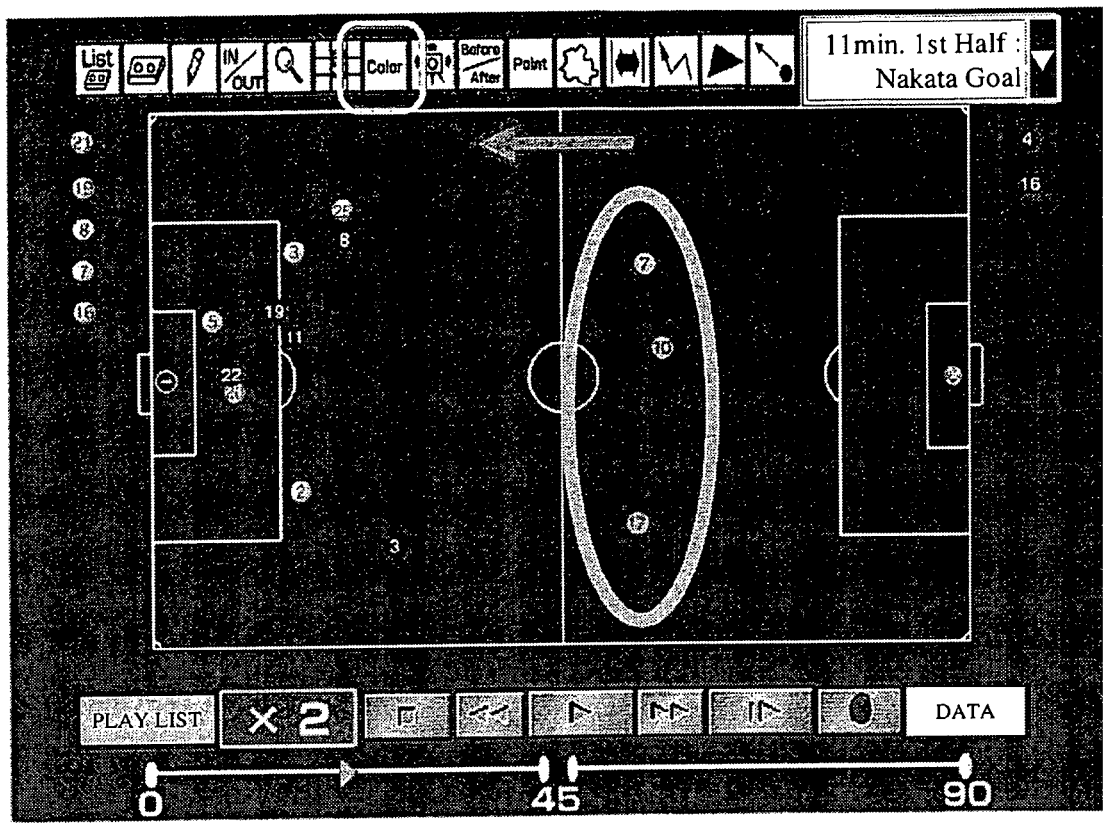
FIG. 45 is a schematic view showing the player position color-coding tool of the formation analysis interface screen shown in FIG. 10.

9f. Color-coding Tool for Players by Position (FIGS. 10, 45 and 46)

Normally, in sports like soccer, the players are assigned to a particular position. But often, these positions are interchanged or players cover for unusual areas depending on the flow of the game, making rapid changes like these, a part of the game. The color-coding tool enables a color visualization of player movements by positions, cover situations, and the forward and backward movements of formation lines. For example, as shown in FIG. 45, the defense (DF), mid-fielder (MF) and forward (FW) player can each be color-coded. This results in the segmentation of the players and their positions, enabling an analysis with a focus on strategic points of the formation analysis, such as the interchange of marking and coverage.

Figure 46:
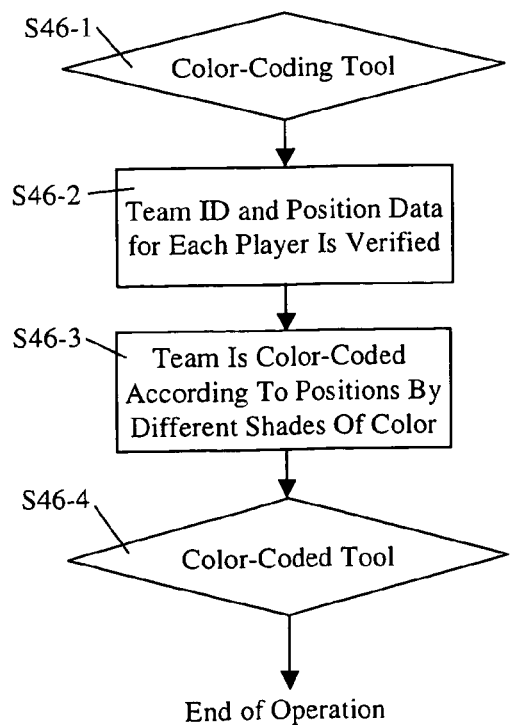
FIG. 46 is a flow chart illustrating the player position color-coding tool shown in FIG. 45.

FIG. 46 shows the operation of the color-coding tool for players by position. First, the color-coding tool button is pressed (Step S46-1), and both the team ID and position data for each player is verified (Step S46-2). A team will be color-coded according to positions using different shades of a color (Step S46-3). Pressing the color-coding tool button again (Step S46-4) ends the process.

9g. Viewpoint Change Tool (FIGS. 10, 47 and 48)

Figure 47:
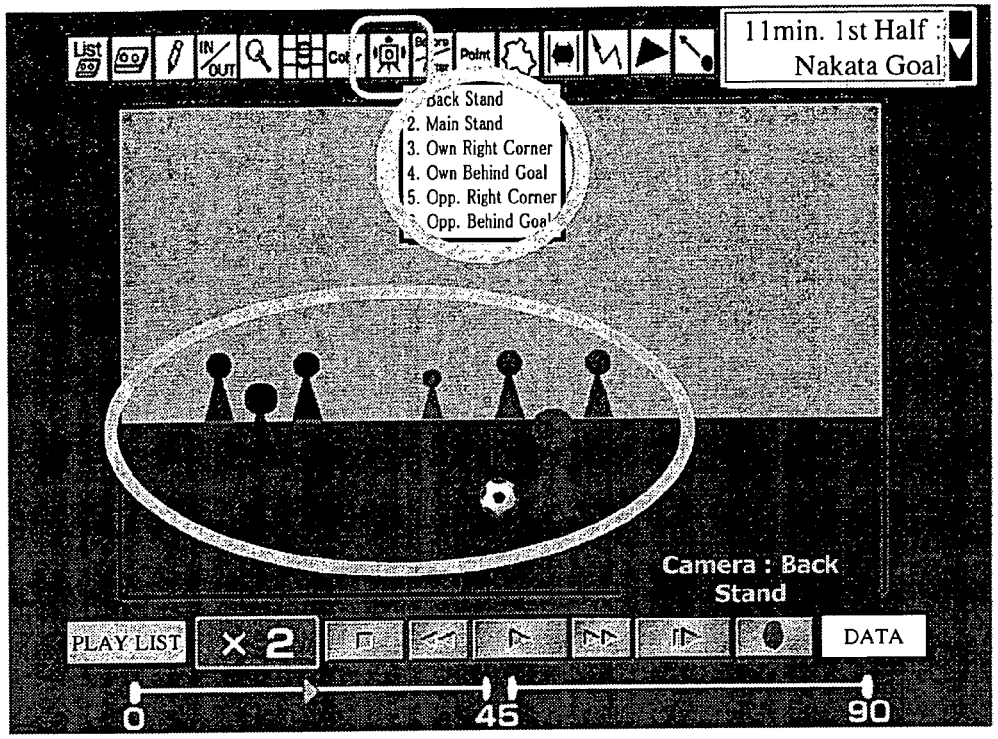
FIG. 47 is schematic view showing the viewpoint change tool of the formation analysis interface screen shown in FIG. 10.

Viewpoints can be selected to display images from different points of view, so that for example, the analysis image will not only be a general view from above the ground, but can also be from the back stand, behind the goal, and corner area, as shown in FIG. 47. The viewpoint can be changed during analysis, by clicking on the viewpoint change tool icon to access the. pull-down menu where the viewpoint can be re-selected. Further, by making the analysis image into three dimensional, a virtual space can be created in which different angles can be specified. The change of viewpoints allows a more detailed analysis of formation.

Figure 48:
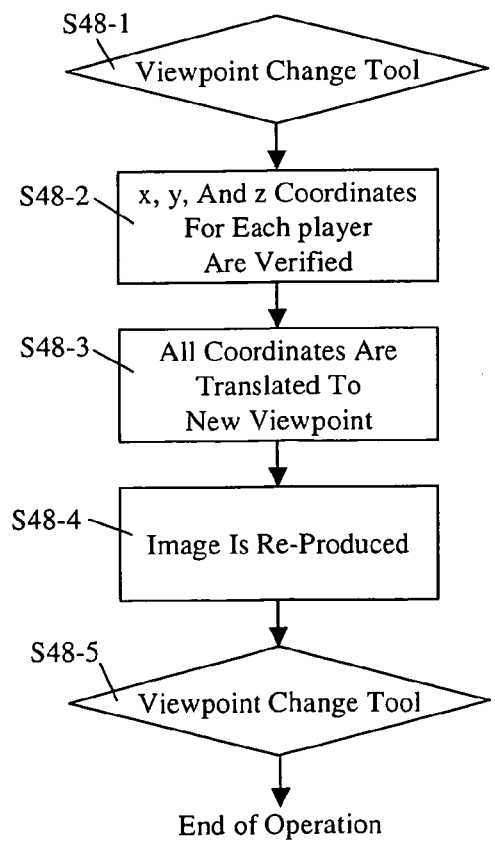
FIG. 48 is a flow chart illustrating the viewpoint change tool shown in FIG. 47.

FIG. 48 shows the operation of the viewpoint change tool. First, when the viewpoint change tool button is pressed (Step S48-1), the x, y and z coordinates for each player are verified (Step S48-2) and each player's coordinates are translated to accommodate the new viewpoint (Step S48-3). The image is re-produced (Step S48-4) based on the new values of the coordinates. Pressing on the viewpoint change tool button again (Step S48-5) ends the process.

9h. OL Display Tool of Player Movements by Activity Area (FIGS. 10, 49 and 50)

Figure 49:
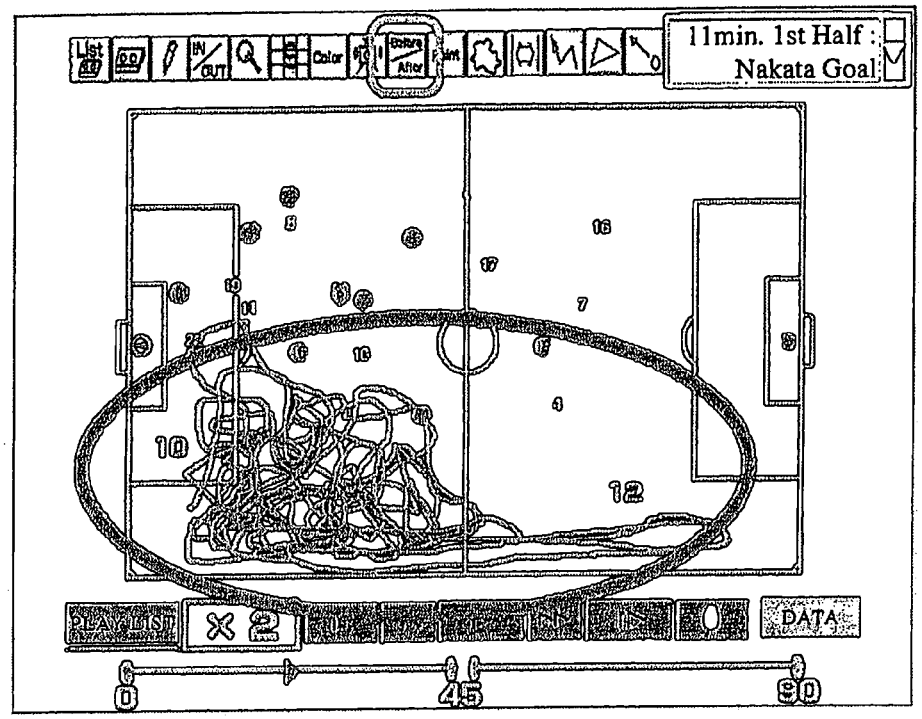
FIG. 49 is a schematic view showing the changed player's activity area OL display tool of the formation analysis interface screen shown in FIG. 10.

As shown in FIG. 49, the movements of 'the two players before and after replacement' can be overlapped and displayed to analyze the activity areas of each player. By comparing the activity areas of the original player and the replacing player, the conformity as well as a comparison of the strong areas of each player's becomes possible.

Figure 50:
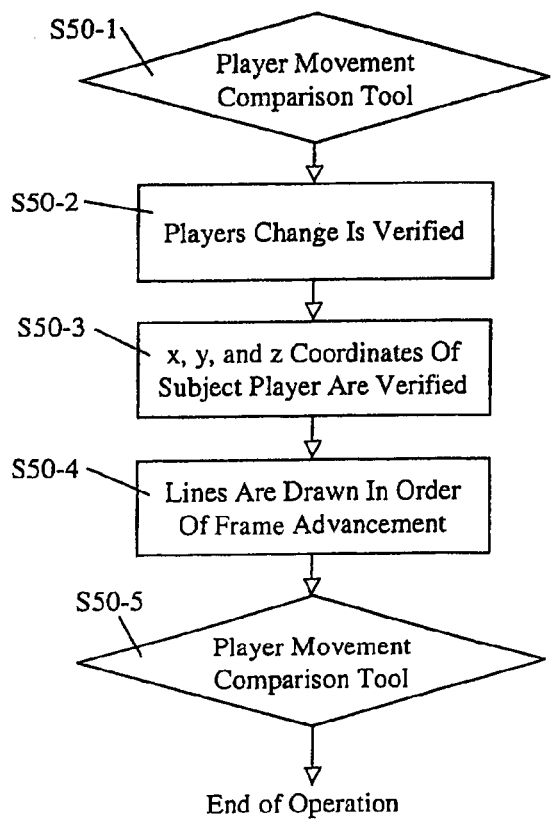
FIG. 50 is a flow chart illustrating the changed player's activity area OL display tool shown in FIG. 49.

FIG. 50 shows the operation of the player movement comparison OL display tool. First, the player movement comparison tool button is pressed (Step S50-1) and the players change is verified (Step S50-2). Next, the x, y and z coordinates of the subject player are verified (Step S50-3), and lines are drawn on the screen in order of frame advancement (Step S50-4). Pressing the player movement OL comparison display tool button again (Step S50-5) ends the process.

9i. Tool to Translate the Play into Numeric Values (FIGS. 10, 51 and 52)

Figure 51:
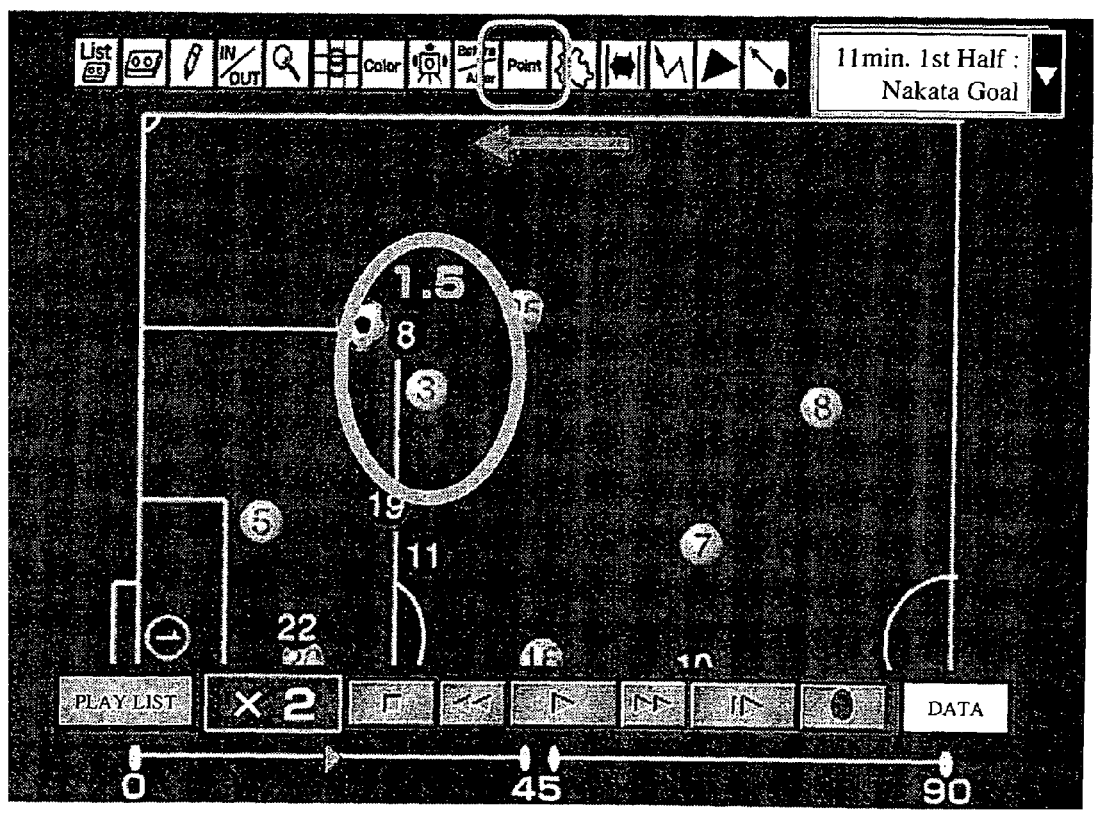
FIG. 51 is a schematic view showing the tool to translate data into numeric values of the formation analysis interface screen shown in FIG. 10.

This tool enables the evaluation of plays by numeric values (FIG. 51). Specifically, in a situation where the player passes the defense line by dribbling, showing factors like dribble speed and defense position in numeric values allows a more objective evaluation of whether the play has been reasonable, or the play could have been blocked. It is also possible to display an objective overall evaluation of the player in a given game by double clicking on the player icon (blue and red circles with numbers) after the play translation tool is activated. This enables an objective evaluation of the plays by each player. Further, a general, objective evaluation of each player in a given game becomes possible by calculating the total of the numeric values of the plays for each player.

Figure 52:
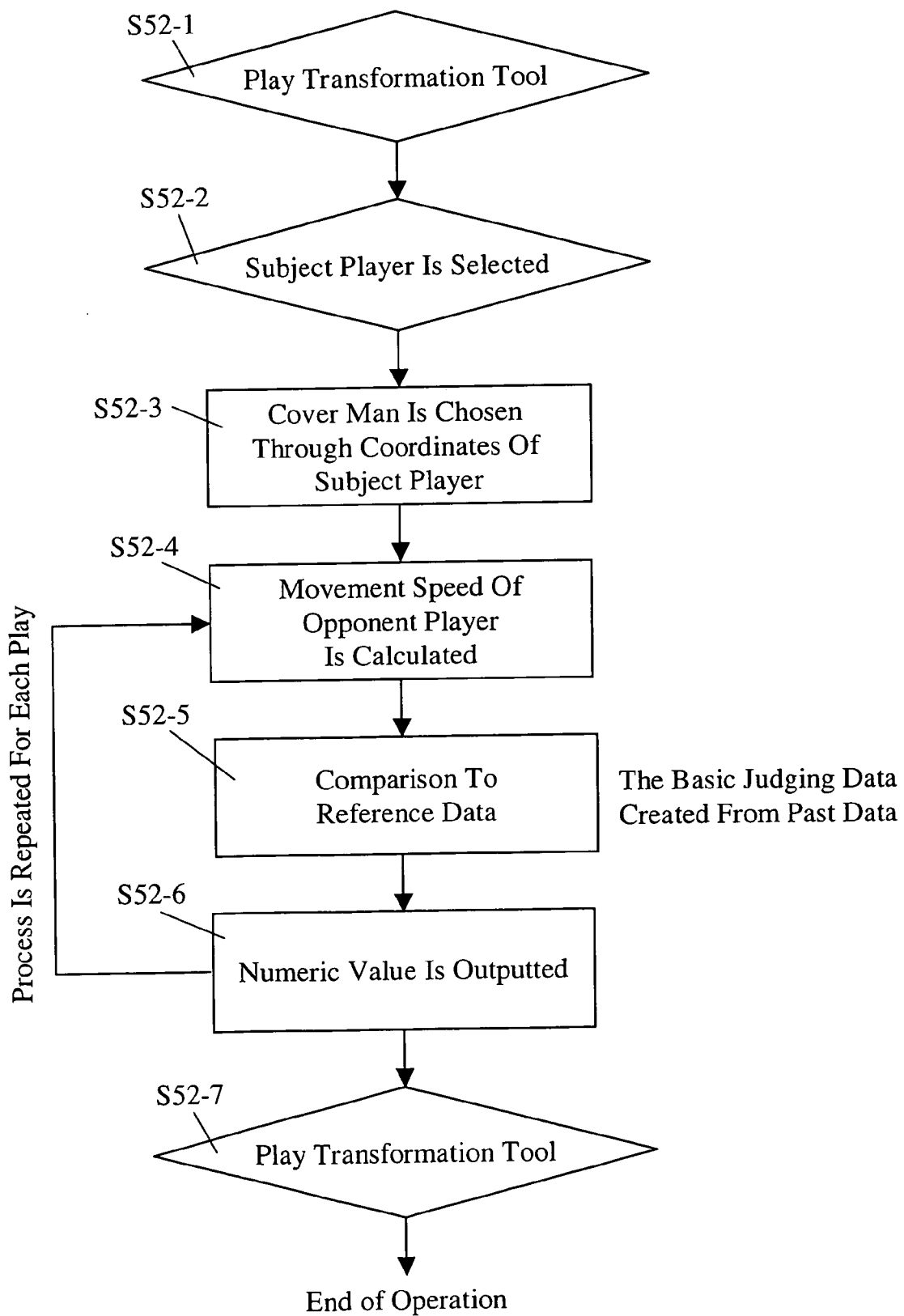
FIG. 52 is a flow chart illustrating the tool to translate data into numeric values shown in FIG. 51.

FIG. 52 shows the operation of the tool. First, the play transformation tool button is pressed (Step S52-1) and the subject player is selected (Step S52-2). A cover man is chosen through the coordinates of the player (Step S52-3), and the movement speed of the opponent player is calculated (Step S52-4). This is compared to the basic judging data created from past data (Step S52-5) and a numeric value is produced as a result (Step S52-6). Steps S52-4 to S52-6 are repeated for each play. Pressing the tool button again (Step S52-7) ends the operation.

9j. Open Space Display Tool (FIGS. 10, 53 and 54)

Figure 53:
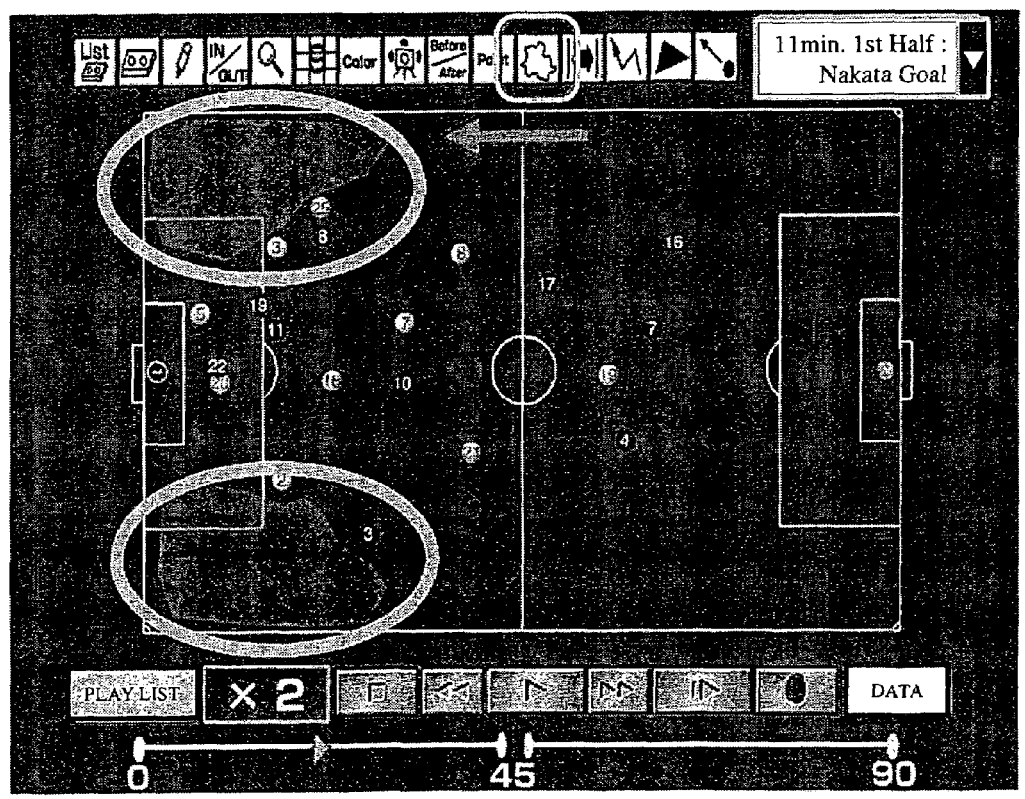
FIG. 53 is a schematic view showing the open space display tool of the formation analysis interface screen shown in FIG. 10.

In soccer, it becomes strategically very important for the offense to create and widen a space where there is no player (open space), and to have the offense player run into this space in order to take an advantage, as shown in FIG. 53. The open space display tool allows a constant graphic display of the open space where the players are not crowded during space creation analysis. Consequently, the initiation of the offensive is made clear.

Figure 54:
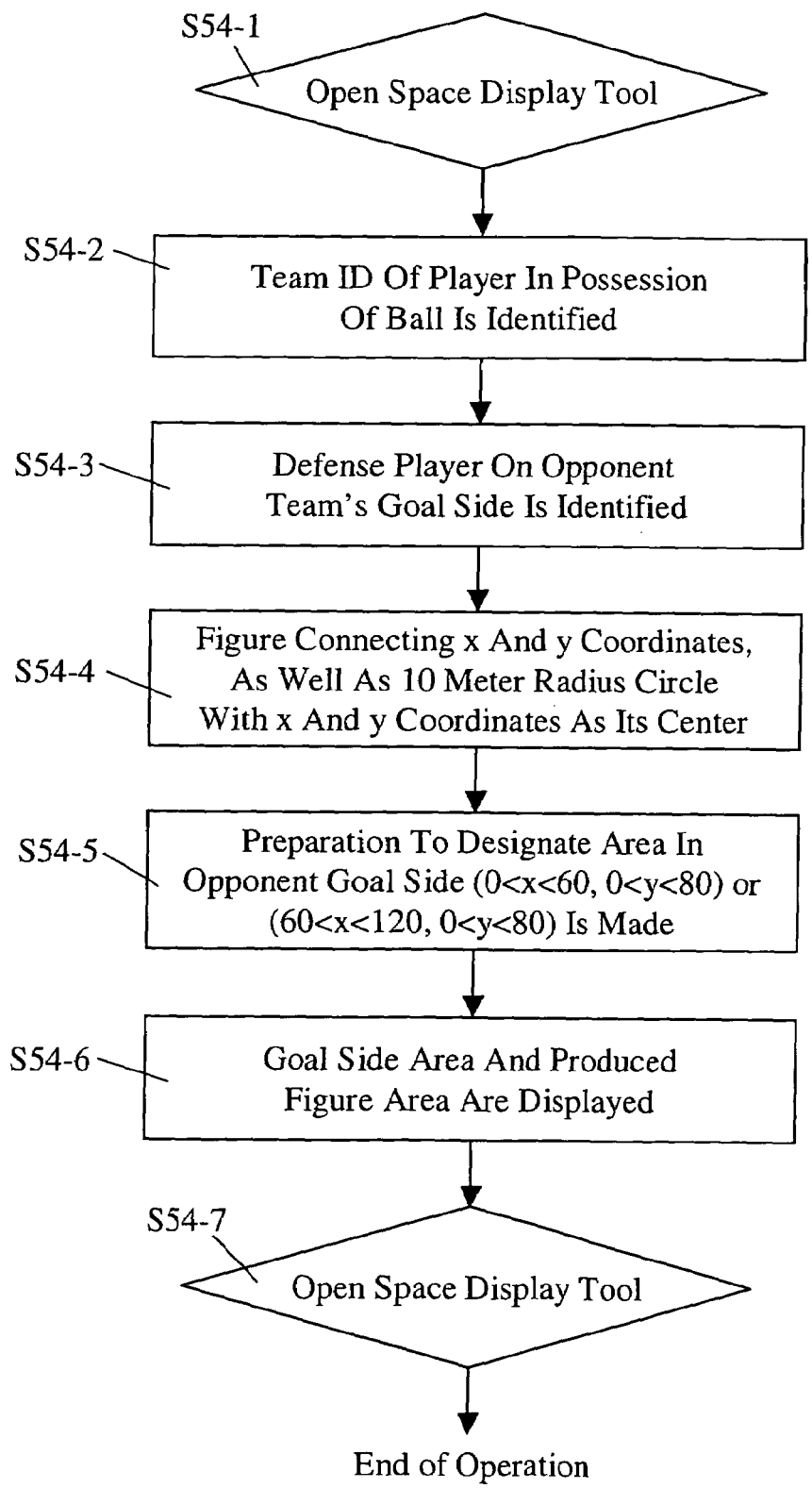
FIG. 54 is a flow chart illustrating the open space display tool shown in FIG. 53.

FIG. 54 shows the operation of the open space display tool. First, the open space display tool button is pressed (Step S54-1) to identify the team ID of the player in possession of the ball (Step S54-2). The defense player on the opponent team's goal side is identified (Step S54-3) and a figure connecting the x and y coordinates, as well as a 10 meter radius circle with the x and y coordinates as its center (in the scale of the field) are made (Step S54-4). Preparation to designate the area in the opponent goal side (0<x<60, 0<y<80) or (60<x<120, 0<y<80) is made (Step S54-5) and the goal side area and produced figure area are displayed (Step S54-6). Pressing on the open space display tool button again (Step S54-7) ends the operation.

Figure 55:
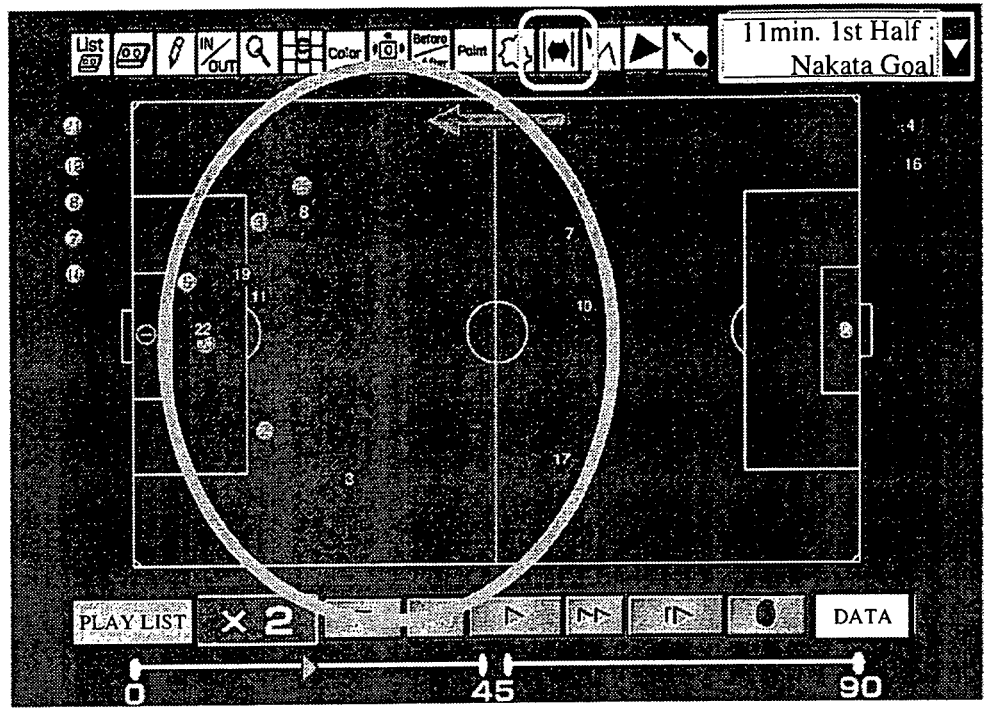
FIG. 55 is a schematic view showing the rearmost line advancement display tool of the formation analysis interface screen shown in FIG. 10.

9k. Rearmost Line Advancement Display Tool (FIGS. 10, 55 and 56)

In soccer, when the distance between the foremost line of offense and the rearmost line of defense is kept short, the team is generally considered to have good formation. The rearmost line advancement display tool shows the spread area between the foremost and rearmost lines by shading, as shown in FIG. 55. This enables a clear visualization of the extent to which compact soccer is achieved by seeing the overall formation.

Figure 56:
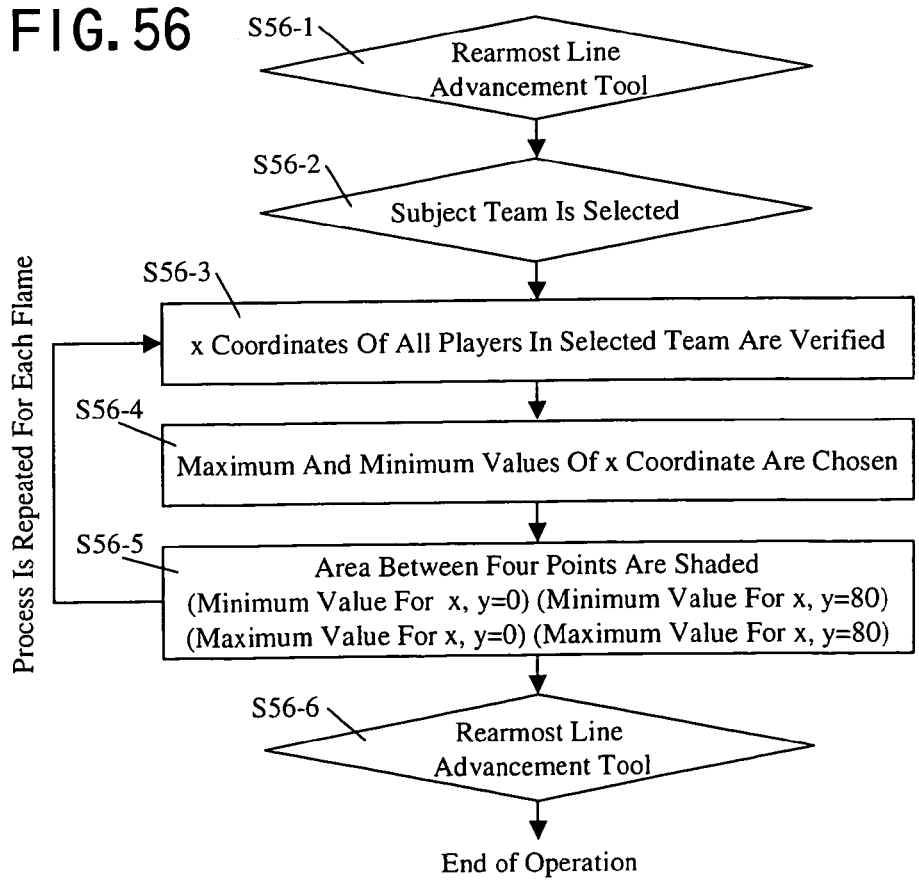
FIG. 56 is a flow chart illustrating the rearmost line advancement display tool shown in FIG. 55.

FIG. 56 shows the operation of the rearmost line advancement tool. First, the advancement tool button is pressed (Step S56-1) and the team is selected (Step S56-2). The x coordinates of all the players in the selected team are verified (Step S56-3) and the maximum and minimum values of the x coordinate are chosen (Step S56-4). The area between the four points (minimum value for x, y=0)/(minimum value for x, y=80)/(maximum value for x, y=0)/(maximum value for x, y=80) is shaded (Step S56-5). Steps S3 to S5 are repeated for each frame. Pressing on the rearmost line advancement tool button again (Step S56-6) ends the operation.

Figure 57:
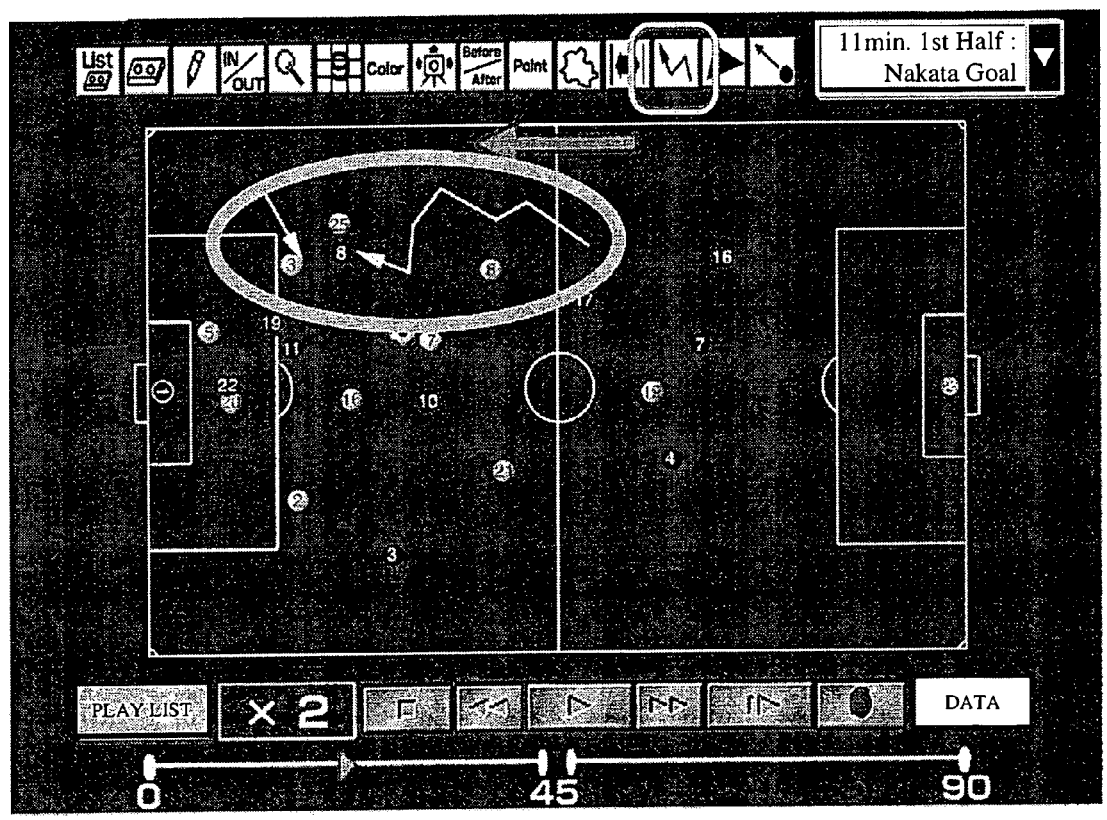
FIG. 57 is a schematic view showing the player movement track display tool of the formation analysis interface screen in FIG. 10.

9l. Player Movement Track Display Tool (FIGS. 10, 57 and 58)

The player to be traced can be selected by pressing the tool button. As pressing the tool button, the icons of all players start flashing, and the movie playback pauses. The flashing stops when the player is selected. The track of the player's movement appears on the screen as shown in FIG. 57. In this example, the color of the arrow is the same color that was selected in formation analysis. It becomes possible to visually analyze the play of each player.

Figure 58:
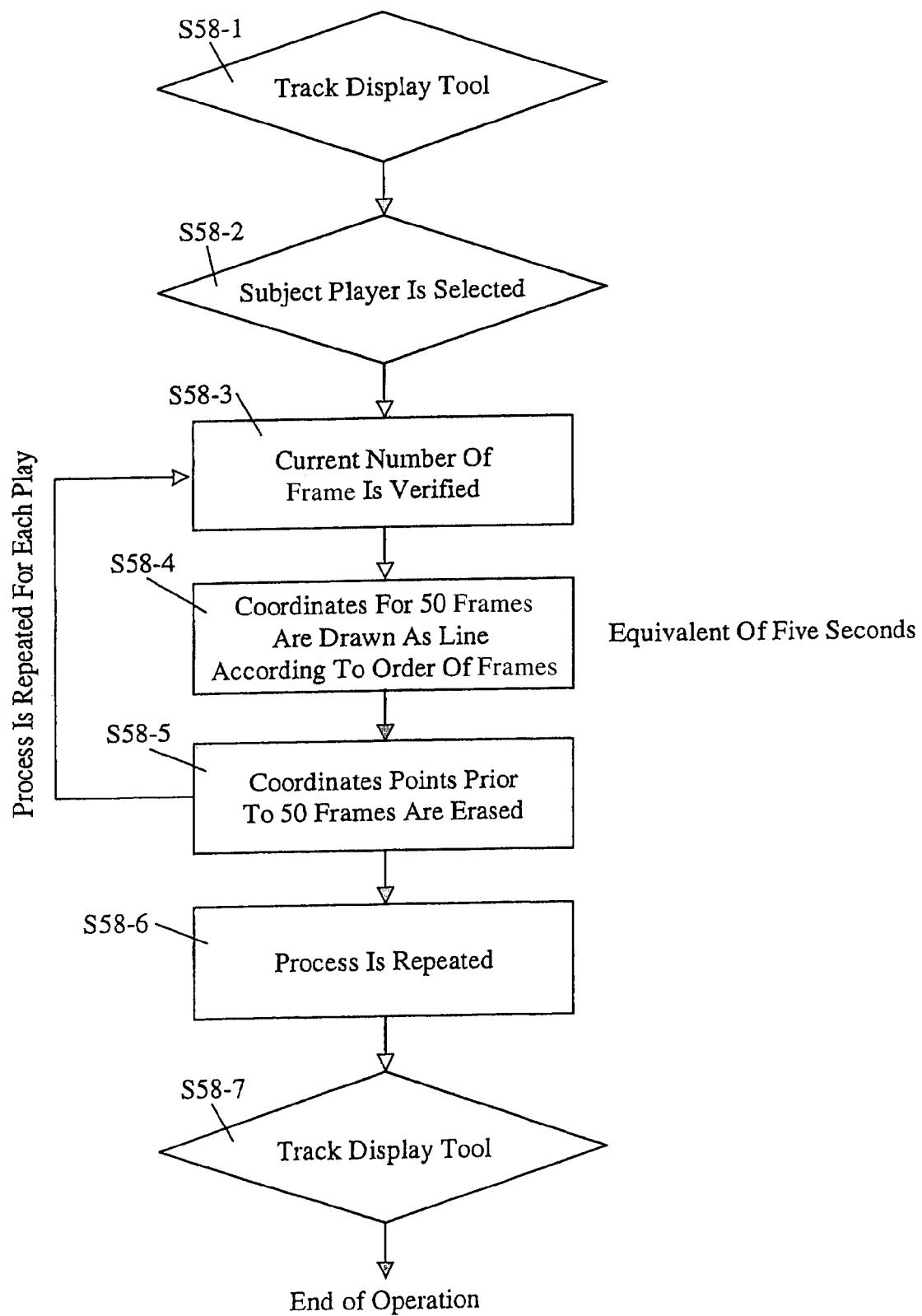
FIG. 58 is a flow chart illustrating the player movement track display tool shown in FIG. 57.

FIG. 58 shows the operation of the player movement track display tool. First, the track tool button is pressed (Step S58-1), and the player is selected (Step S58-2). The current number of frame is verified (Step S58-3), and the coordinates for the 50 frames just before, which is the equivalent of five seconds, are drawn as a line according to the order of the frame (Step S58-4). The coordinates points prior to the 50 frames just before are erased (Step S58-5). Steps S58-3 to S58-5 are repeated for each frame (Step S58-6). Pressing on the tool button again (Step S58-7) ends the operation.

Figure 59:
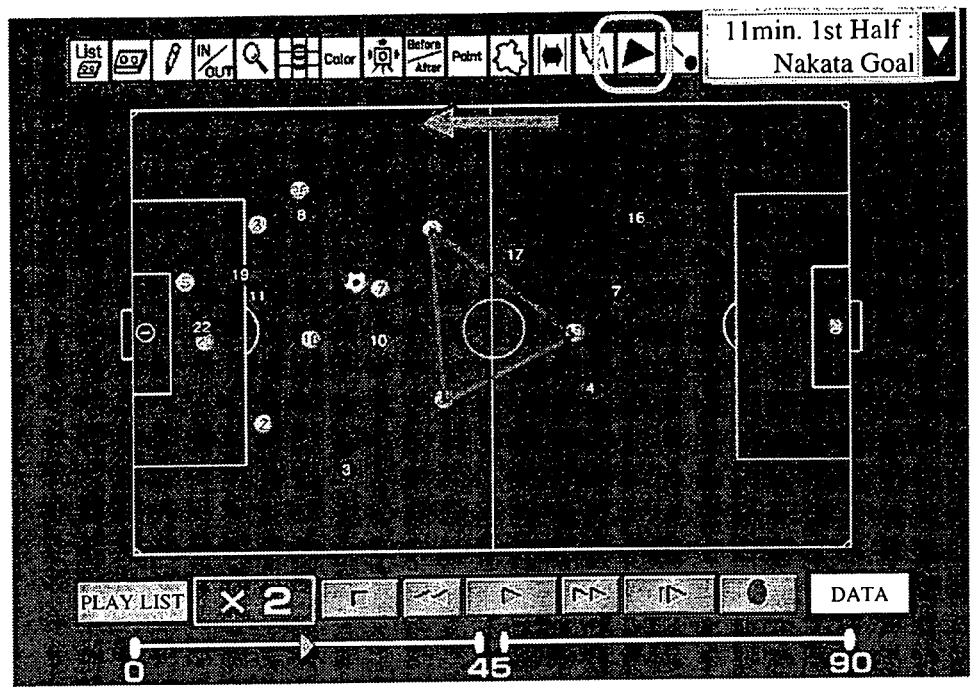
FIG. 59 is a schematic view showing the positional relationship display tool of the formation analysis interface screen shown in FIG. 10.

9m. Positional Relationship Display Tool (FIGS. 10, 59 and 60)

In soccer, the effective interchanges of positions and positioning among players are important tactics. This tool joins the two selected players by a line or a figure that forms more than two players to illustrate the lengths and size of the lines and figures in real time. Consequently, the understandings of the mobility between players and game plans are clearly improved.

Figure 60:
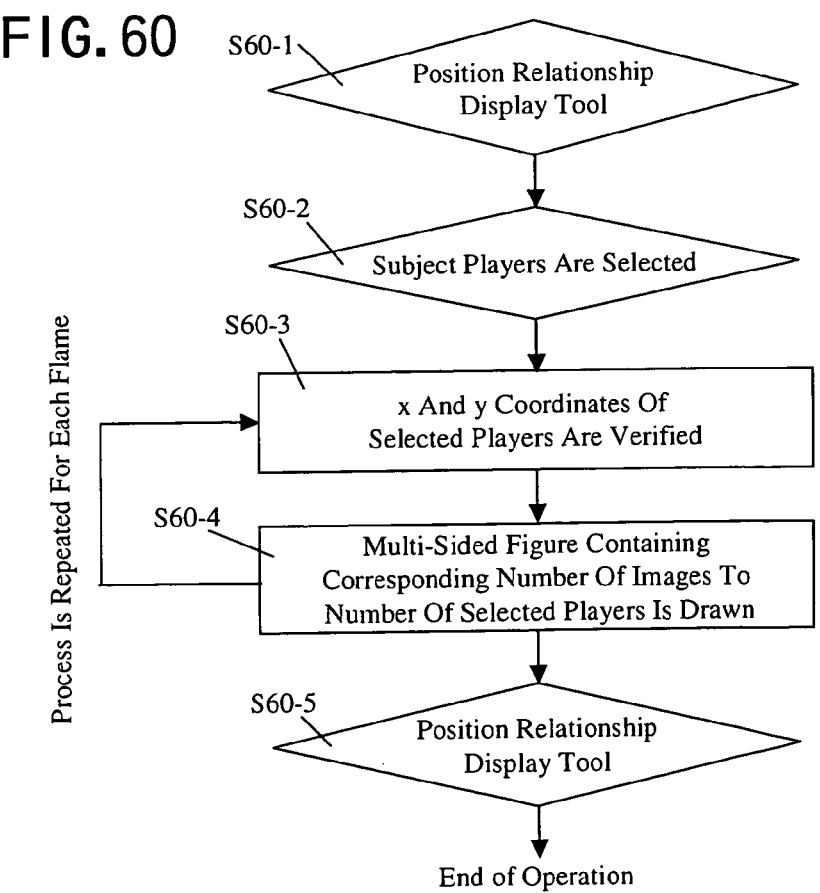
FIG. 60 is a flow chart illustrating the positional relationship display tool shown in FIG. 59.

FIG. 60 shows the operation of the positional relationship display tool. First, the relationship tool button is clicked (Step S60-1), and the subject players are selected (Step S60-2). The x and y coordinates of the selected player are verified (Step S60-3), and a multi-sided figure containing the corresponding number of images to the number of selected players is drawn (Step S60-4). Steps S60-3 to S60-4 are repeated for each frame. Pressing the relationship tool button again (Step S60-5) ends the operation.

Figure 61:
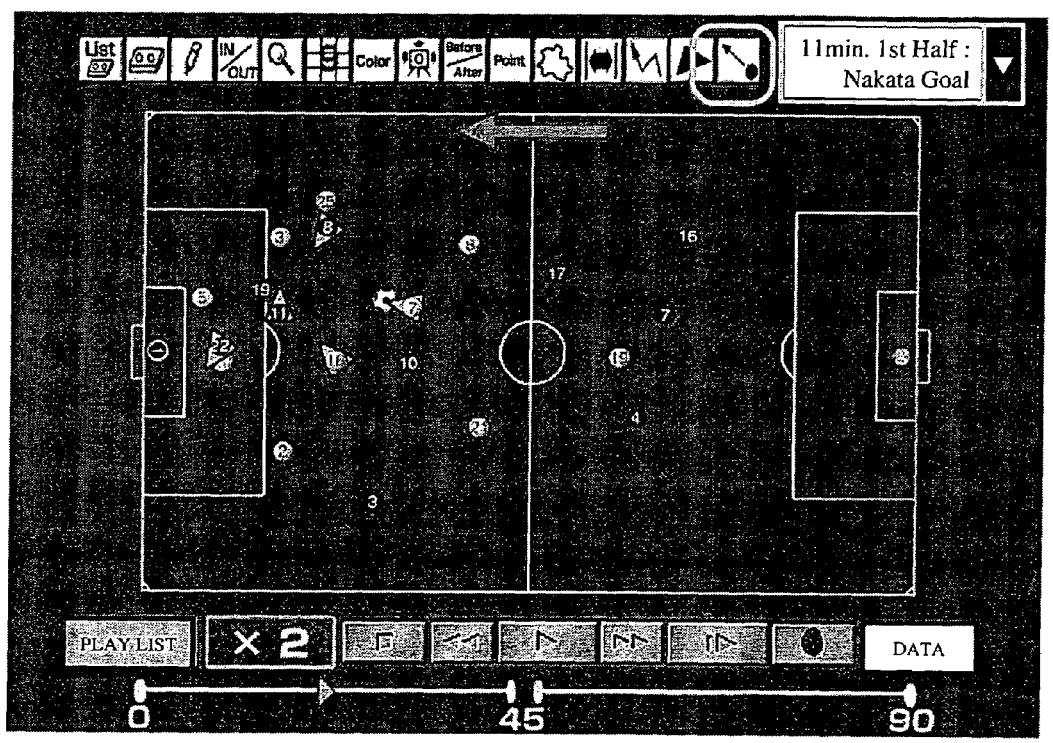
FIG. 61 is a schematic view showing the advancement vector display tool of the formation analysis interface screen shown in FIG. 10.

9n. Direction Vector Display Tool (FIGS. 10, 61 and 62)

This tool determines the direction of movement in the next frame of the coordinate data obtained by the automatic tracking device and uses the difference between coordinates from the previous frame in order to determine the direction. Triangles, showing the player's direction derived as a result, can additionally be displayed for the selected player simultaneously (FIG. 61). This enables the display of individual player's direction through an easy, flat player iron FIG. 62 shows the operation of the direction vector display tool. First, the direction vector display tool button is pressed (Step S62-1), and the subject player is selected (Step S62-2). The selected player's current coordinates are verified (Step S62-3) and the player's coordinates one frame ahead are verified (Step S62-4). The difference between the current coordinates and the coordinates for the next frame is calculated (Step S62-5) and a triangle with its peak pointing the direction of movement is drawn (Step S62-6). Steps S62-4 to S62-6 are repeated for each frame. Pressing on the tool button again (Step S62-7) ends the operation.

In the following, 'Data Analysis' 202 (See FIG. 2) will be explained with reference to FIGS. 63 to 104.

Figure 63:
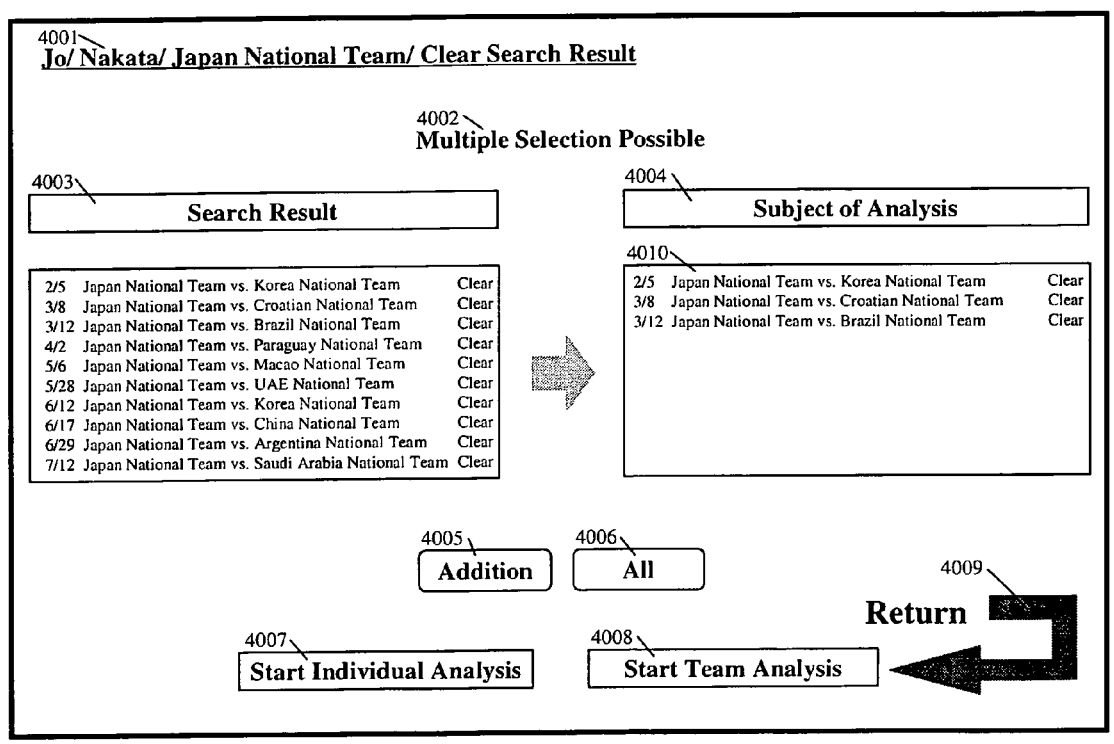
FIG. 63 is a schematic view showing a sample screen of the data analysis top menu of the analysis system shown in FIG. 1.

As shown in FIG. 63, the headings 'Jo/Nakata/Japan National Team/Clear search results' 4001 appears on the top of screen followed by 'Multiple selection possible' 4002, 'Search results' 4003, 'Subject of analysis' 4004, 'Addition' 4005, 'All' 4006, 'Start individual analysis' 4007, 'Start team analysis' 4008, and 'Return' 4009.

In this example, the following appeared for heading 'Search Results' 4003 as seen in FIG. 6.

| 2/5 | Japan National Team vs. Korea National Team | Clear |
| 3/8 | Japan National Team vs. Croatian National Team | Clear |
| 3/12 | Japan National Team vs. Brazil National Team | Clear |
| 4/2 | Japan National Team vs. Paraguay National Team | Clear |
| 5/6 | Japan National Team vs. Macao National Team | Clear |
| 5/28 | Japan National Team vs. UAE National Team | Clear |
| 6/12 | Japan National Team vs. Korea National Team | Clear |
| 6/17 | Japan National Team vs. China National Team | Clear |
| 6/29 | Japan National Team vs. Argentina National Team | Clear |
| 7/12 | Japan National Team vs. Saudi Arabia National Team | Clear |

Multiple games are selected as subjects of analysis from the match list in 'Data analysis'. In this example, the headings '2/5 Japan National Team vs. Korea National Team Clear, 3/8 Japan National Team vs. Croatia National Team Clear, 3/12 Japan National Team vs. Brazil National Team Clear' are clicked. The corresponding section shows the 'Subject of Analysis' 4004 as subject headings 4010;

| 2/5 | Japan National Team vs. Korea National Team | Clear |
| 3/8 | Japan National Team vs. Croatian National Team | Clear |
| 3/12 | Japan National Team vs. Brazil National Team | Clear |

Figure 64:
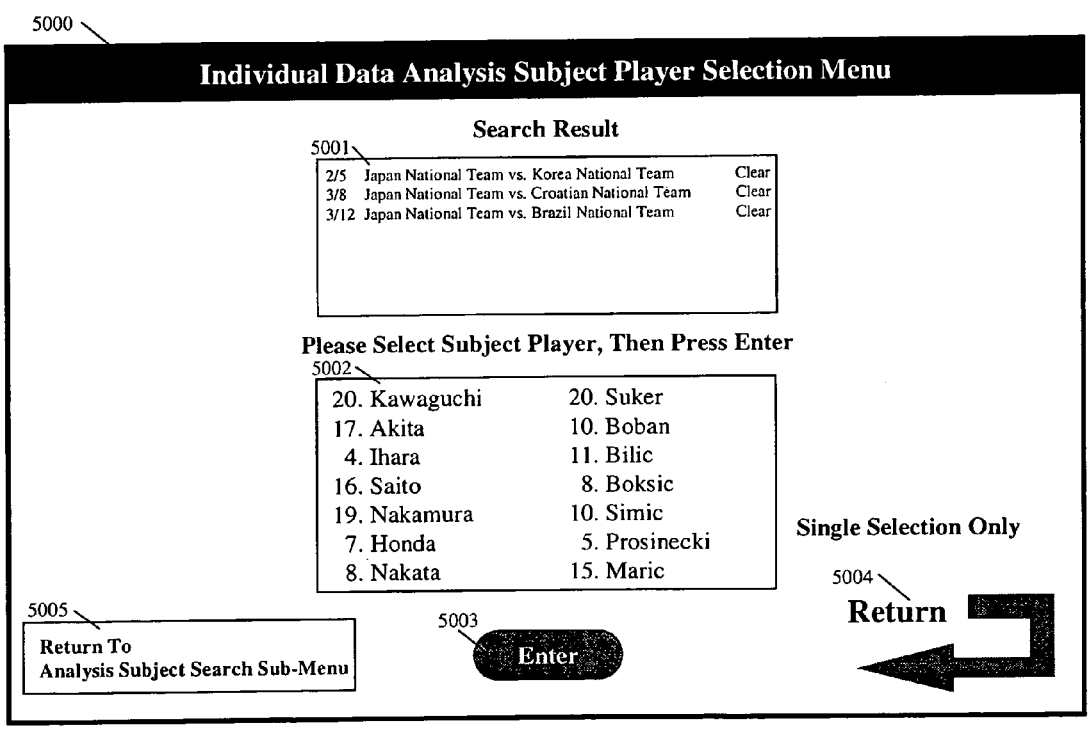
FIG. 64 is a schematic view showing the screen of the Individual Data Analysis Subject Player Selection Menu.
Figure 65:
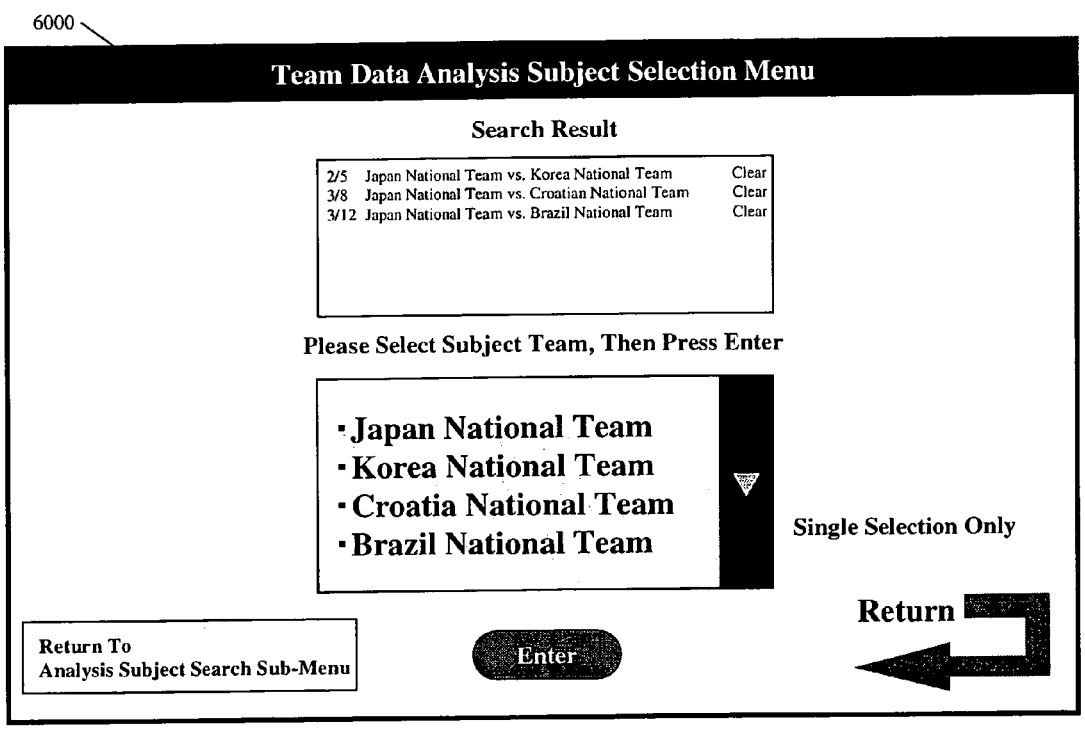
FIG. 65 is a schematic view showing the screen of the Team Data Analysis Subject Player Selection Menu.

When 'Start Individual Analysis' 4007 is clicked, the user proceeds to the 'Individual Data Analysis Subject Player Selection Menu' 5000 screen as shown in FIG. 64. (see details later) Similarly, by clicking the 'Start Team Analysis' 4008 of FIG. 63, the user proceeds to the 'Team Data Analysis Subject Selection Menu' 6000 screen as shown in FIG. 65. (See details later) Clicking on 'Return' 4009, will bring the user back to the analysis subject search sub-menu of FIG. 63.

First, 'Individual Analysis' of 'Data Analysis' will be explained.

When 'Start Individual Analysis' 4007 in FIG. 63 is clicked, the 'Individual Data Analysis Subject Player Selection Menu' 5000, like that shown in FIG. 64, appears on the display 50 of FIG. 1. The subject game is selected from the 'Search Results' 5001 shown at the top of FIG. 64. The players participating in the particular game appear under 'Player List' 5002. The following is a part of the list shown in FIG. 64. By scrolling down on the scroll key to the right of 5002 in FIG. 64, alternate players can be selected.

| 20. | Kawaguchi | 20. | Suker |
| 17. | Akita | 10. | Boban |
| 4. | Ihara | 11. | Bilic |
| 16. | Saito | 8. | Boksic |
| 19. | Nakamura | 10. | Simic |
| 7. | Honda | 5. | Prosinecki |
| 8. | Nakata | 15. | Maric |

After one player is selected from the 'Player List' 5002 above, the 'Enter' button 5003 is clicked. The 'Detailed Play Analysis' screen (explanation to follow) of the selected player in a given game will appear. The user can return to (1) 'Data Analysis Top Menu' 5004 and (2) 'Analysis Subject Search Sub-menu' 5005 from the 'Individual Data Analysis Subject Player Selection Menu' 5000.

In the following, each 'Detailed Play Analysis' screens will be described.

11a. Individual Data<Field Player> (FIGS. 64 and 66)

When the field player (player) is selected from the 'Individual Data Analysis Subject Selection Menu' (FIG. 64), the user can see a list of detailed numeric data regarding the subject player, such as the numbers of goals and fouls in the subject game.

FIG. 66 shows a case where 'Nakata' is the selected as a field player. In FIG. 66, 'pass', 'shoot', 'foul', 'card', 'card obtained' and 'athletic ability' in the three games 'vs. Croatia', 'vs. Korea', 'vs. Brazil' appear under 'Nakata's personal data chart'. By clicking the number under 'pass' in the 'vs. Croatia' game for example in FIG. 66, 'Nakata's individual play data chart<pass>' (explanation to follow) screen appears as shown in FIG. 67.

Further, by clicking the 'Detailed Data' 6001 to 6003 shown to the right in FIG. 66, the user proceeds to the 'Individual Related Detailed Data Menu' (will be described below) where play data obtained from the play analysis of the corresponding games is shown as graphs/diagrams.

11b. Individual Play Data (FIGS. 64 and 67)

When the number under 'total number' in 'passes' is clicked for 'Individual data<Nakata>' in the game 'vs. Croatia' in FIG. 66, the 'Individual Play Data' screen appears as shown in FIG. 67. Here, the details of player 'Nakata's' pass play in the 'vs. Croatia' game can be seen. The same can be done for 'shot', and 'foul', etc.

The headings, 'time', which shows the time that the pass was made, 'passed to', which gives the name of the player who the pass was made to, 'kicking foot' during pass, 'speed', 'distance' and 'direction' are listed as shown in FIG. 67.

One pass play is selected from the list in FIG. 67. By clicking the 'play list' 7001 the user proceeds to the play list pertaining to the 'Formation Analysis' mentioned above. (See FIGS. 26 and 27)

12. Team Data (FIG. 68)

'Data<J Team>' under 'Team Data' shown in FIG. 68 shows a detailed the numeric data list of all of 'passes', 'shots', 'fouls', 'cards', 'acquired cards', 'athletic ability', 'ball touch', 'dribble distance', 'off-side', 'FK (Free kicks)', 'CK (Corner kicks)', 'top to bottom', 'opponent area invasion rate' (figure omitted), 'loose ball acquisition rate' (figure omitted) and 'ball control rate' (figure omitted), in a given game of the Japan National Team (J Team) when it is selected from the 'Team Data Analysis Subject Selection Menu' in FIG. 65.

By clicking the total number under 'passes', 'shoots' and 'fouls' of each game, the user can proceed to 'Team Play Data' where a detailed list of game contents can be seen such as the time period during which each play took place.

FIG. 69 shows an example of 'Team Play Data <passes>', which is the 'Team Play Data' for 'passes'.

By clicking the 'Detailed Data' (8001 to 8003) button to the right in (explanation to follow) where the plays in each game are analyzed and designed into graphs and charts. Further, clicking on the 'Return to data analysis top menu' heading will bring the user back to the 'Data Analysis Top Menu'shown in FIG. 63.

Next the aforementioned 'Detailed Individual Data' will be explained.

12. Detailed Individual Data Menu

Figure 70:
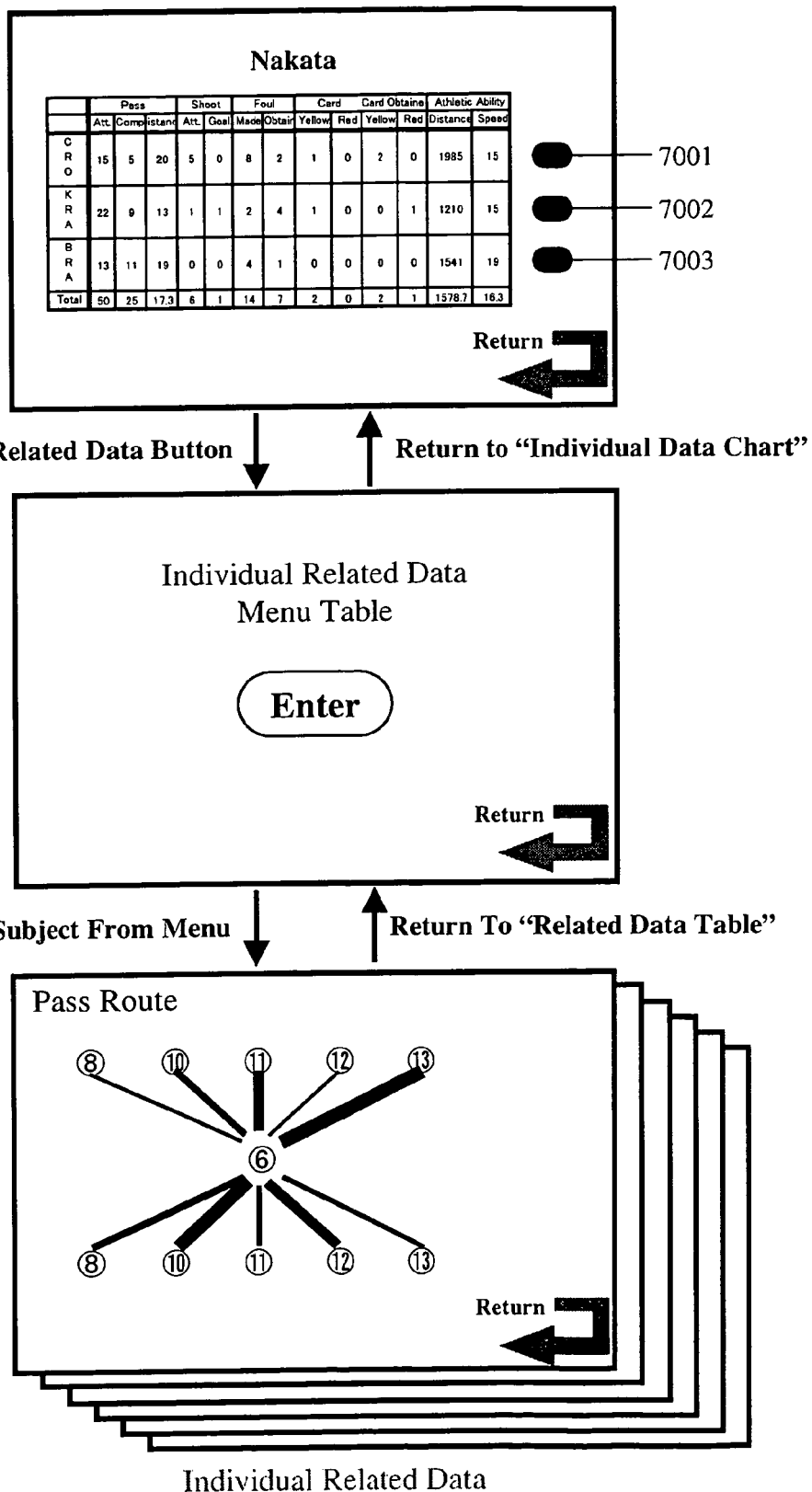
FIG. 70 is a flow chart illustrating the operation of the Individual Related Detailed Data Menu of the analysis system shown in FIG. 1.

As shown in FIG. 70, 'Individual Data' has menus (icon) 7001 to 7003 that can bring up the 'Detailed Individual Data' for each game. By clicking the icons 7001 to 7003, the title list (menu) of all obtainable 'Detailed Individual Data' for the selected game appears on the screen of the image display device 50 from the memory device 23 of the automatic tracking device 20 through the interface 30 shown in FIG. 1.

Figure 71:
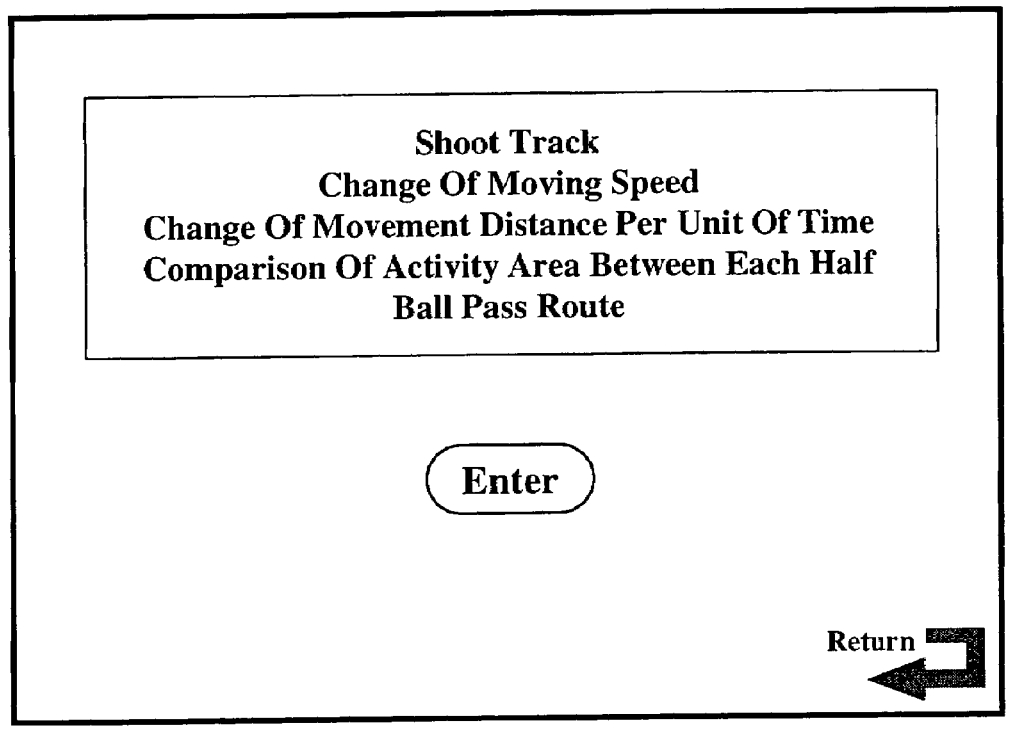
FIG. 71 is a schematic view showing the table of contents of the Individual Related Detailed Data Menu shown in FIG. 70.

The 'Detailed Individual Data' outlined in FIG. 71 basically generates data as figures and graphs, and includes data like 'shoot track', 'change of movement speed', 'change of movement distance per unit of time', 'comparison of activity area between the two halves', and 'ball pass route'. Since 'Detailed Individual Data' should be displayed as a graph, there is no further links.

12a. Individual Related Data—Shoot Track (FIG. 72)

As the 'shoot track of the individual' is selected from the 'Individual Related Data' screen during 'Individual Data' analysis, the (1) total shoot number and (2) the track of each shoot appear as figures on the screen of the image display device 50 from the memory device 23 of the automatic tracking device 20 through the interface 30 as shown in FIG. 1.

Figure 72:
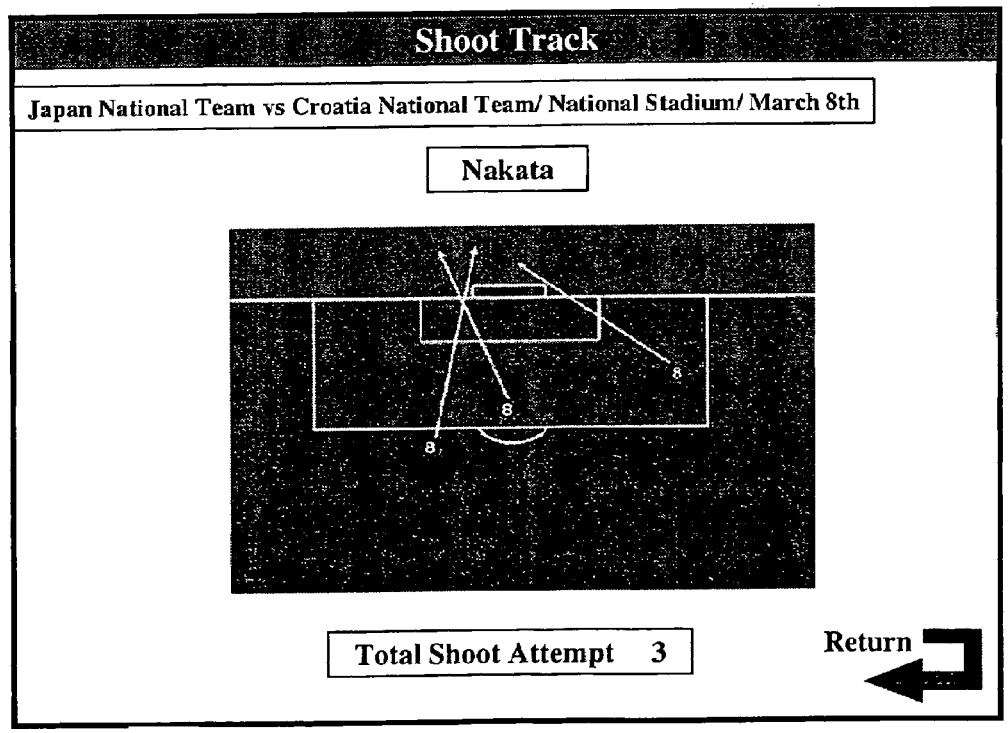
FIG. 72 is a schematic view showing a sample shoot tracks line diagram of the Individual Related Data shown in FIG. 71.

FIG. 72 visually illustrates the shoot tracks of the three shots that 'Nakata' made in the March 8 'vs. Croatia' game.

Figure 73:
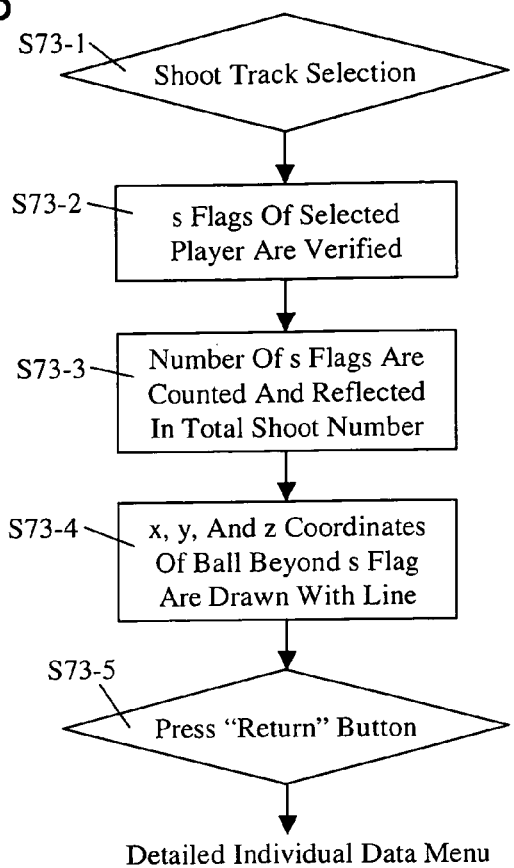
FIG. 73 is a flow chart illustrating the operation of the shoot track diagram shown in FIG. 72.

FIG. 73 shows the operation of the shoot track tool of the individual. First, the shoot track selection button is pressed (Step S73-1) and the s play flag of the selected player is verified (Step S73-2). The number of s flags are counted and reflected in the total shoot number (Step S73-3) and the x, y and z coordinates of the ball beyond the s flag are drawn with a line (Step S73-4). Pressing on the 'return' button (Step S73-5) will bring the user back to the 'Detailed individual data menu'.

12b. Individual Related Data—Change of Moving Speed (FIG. 74)

As the 'change of moving speed of individual player in a game' is selected from the 'Individual Related Data' screen during 'Individual Data' analysis, the (1) average moving speed and (2) speed, calculated from the time axis, appear as figures on the screen of the image display device 50 from the memory device 23 of the automatic tracking device 20 through the interface 30 as shown in FIG. 1.

Figure 74:
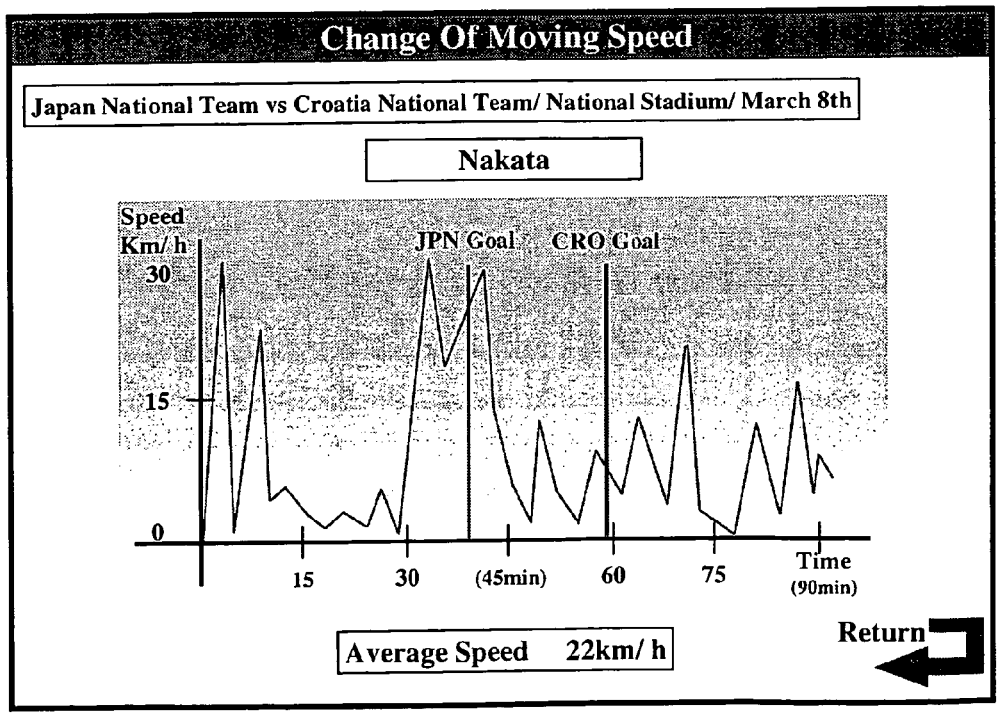
FIG. 74 is a graph showing the change in moving speed of the Individual Related Data shown in FIG. 71.

FIG. 74 shows the moving speed of 'Nakata' in the March 8 'vs. Croatia' game where time is the parameter on the horizontal axis. According to the graph, his overall speed decreases towards the later part of the first half of the game, and shows that he is not moving very much on the field until he gets involved in scoring plays.

Figure 75:
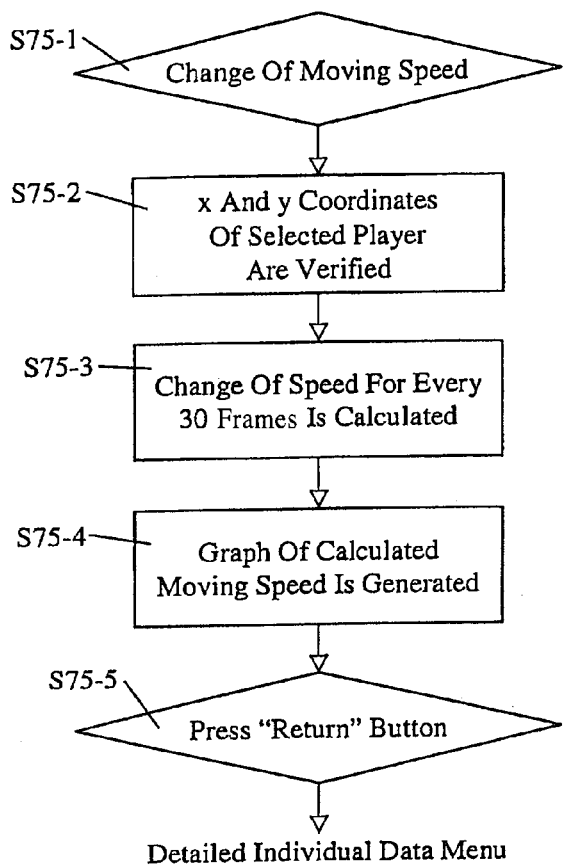
FIG. 75 is a flow chart illustrating the operation of the change of moving speed tool shown in FIG. 74.

FIG. 75 shows the operation of the change of moving speed tool. First, the change of moving speed button is pressed (Step S75-1), and the x and y coordinates of the selected player are verified (Step S75-2). The change of speed for every 30 frames is calculated (Step S75-3) and the graph of the calculated moving speed is generated (Step S75-4). Pressing the 'return' button (Step S75-5) will bring the user back to the detailed individual data menu.

12c. Individual Related Data—Change of Moving Distance Per Unit of Time (FIG. 76)

As the 'change of moving distance per unit of time for a player within a game' is selected from the 'Individual Related Data' screen during 'Individual Data' analysis, the (1) total moving distance and (2) moving distance per unit of time appear as a graph on the screen of the image device 20 through the interface 30 as shown in FIG. 1.

Figure 76:
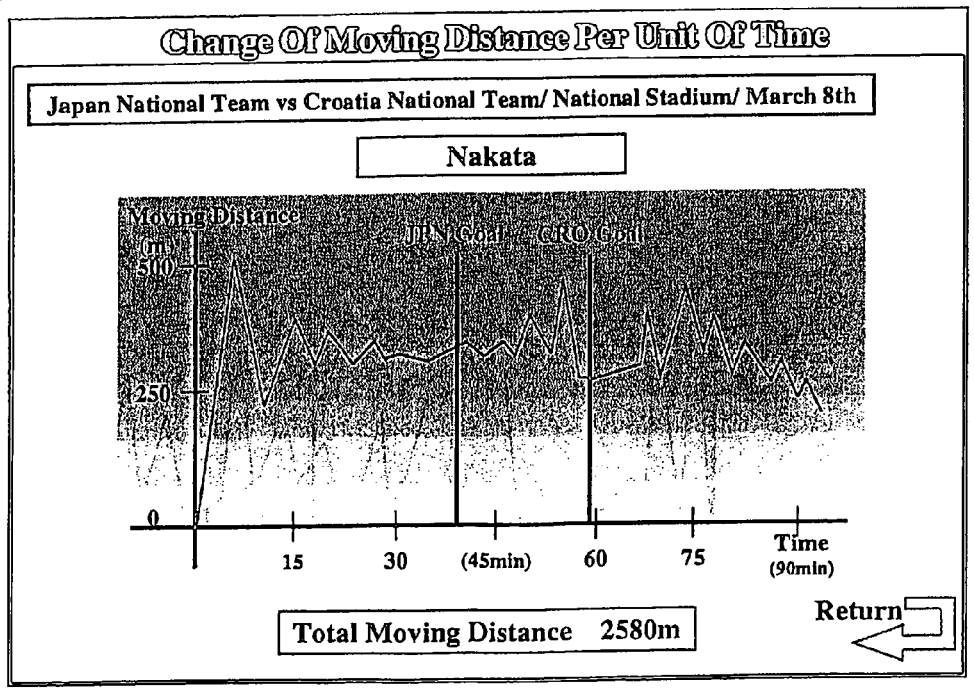
FIG. 76 is a graph showing the change in moving distance in the individual related data shown in FIG. 71.

FIG. 76 shows that 'Nakata' moved a total of 2580 meters during the March 8'vs. Croatia' game, and that his change in moving distance per unit of time was stable except towards the later part of the second half.

Figure 77:
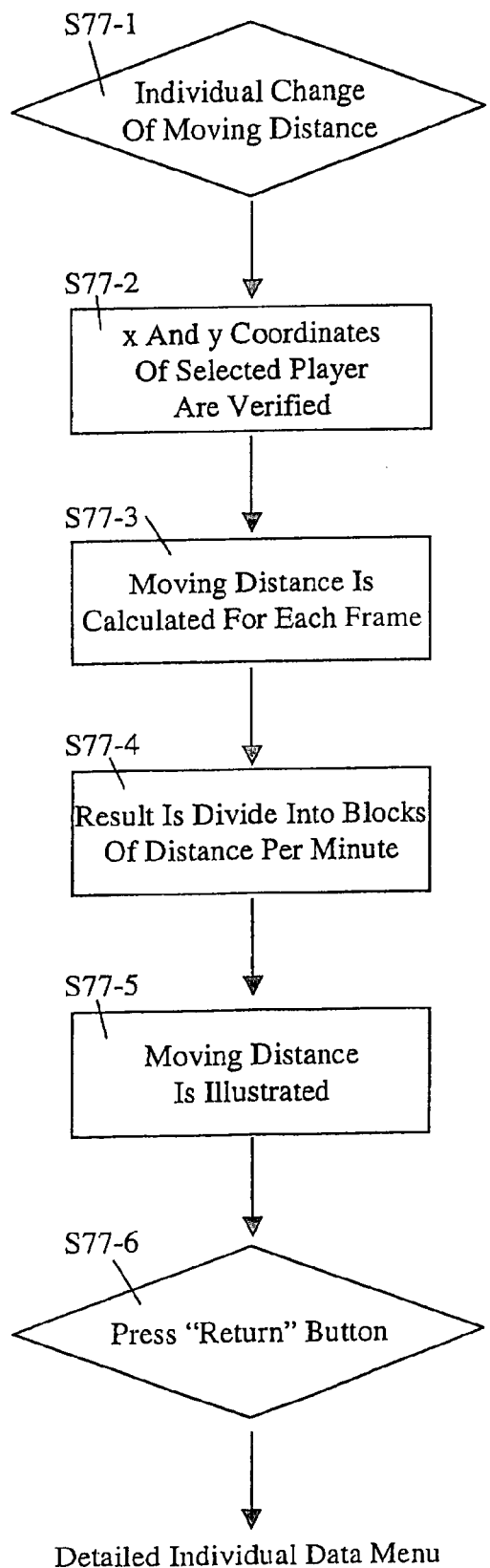
FIG. 77 is a flow chart illustrating the operation of the change in moving distance tool shown in FIG. 76.

FIG. 77 shows the operation of the individual change of moving distance tool. First, the individual change of moving distance button is pressed (Step S77-1), and the x and y coordinates of the selected player are verified (Step S77-2). The moving distance is calculated for each frame (Step S77-3), the result is divided into blocks of distance per minute (Step S77-4) and the moving distance is illustrated (Step S77-5). Pressing the 'return' button (Step S77-6) will bring the user back to the detailed individual data menu.

12d. Individual Related Data—Comparison of Activity Area in the Each Half (FIG. 78)

As 'comparison of activity area in the two halves' is selected from the 'individual related data' during 'Individual Data' analysis, the (1) movement distance during each half and the (2) comparison of movement distance between two halves appear as figures on the screen of the image display device 50 from the memory device 23 of the automatic tracking device 20 through the interface 30 as shown in FIG. 1.

Figure 78:
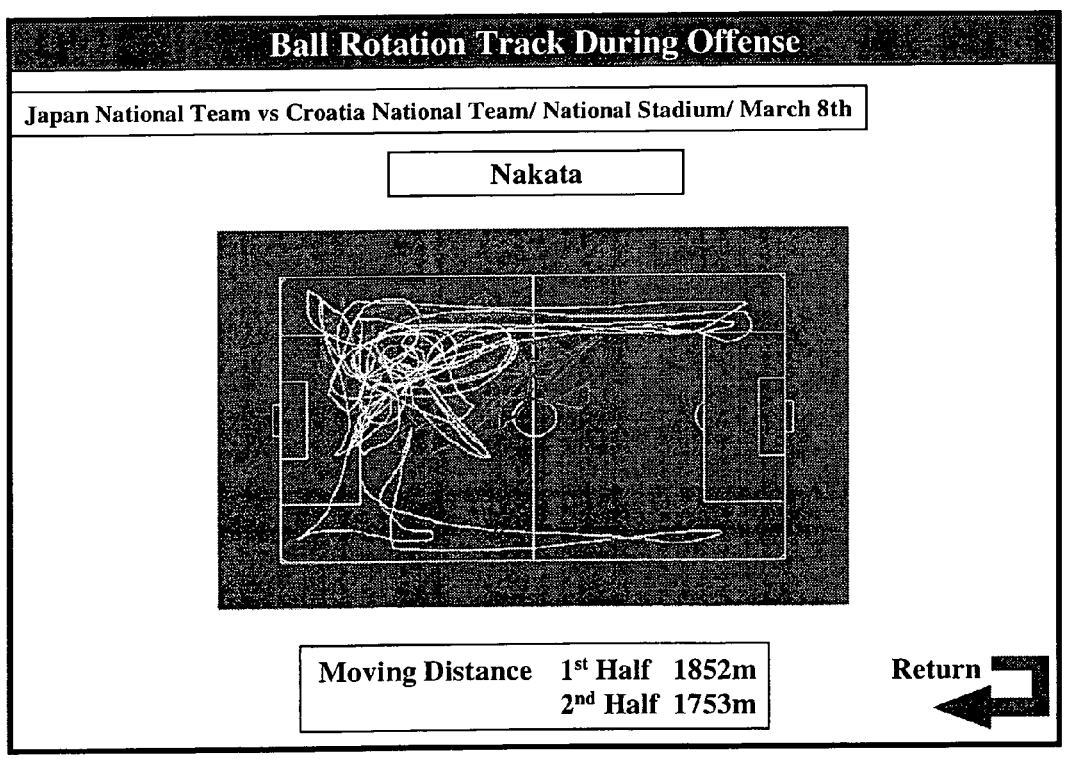
FIG. 78 is a schematic view showing the activity area comparison diagram between the two halves of the game in the individual related data in FIG. 71.

FIG. 78 shows that 'Nakata' moved a total of 1852 meters in the first half and 1735 meters in the second half of the March 8 'vs. Croatia' game and the activity areas during each half is illustrated as tracks.

Figure 79:
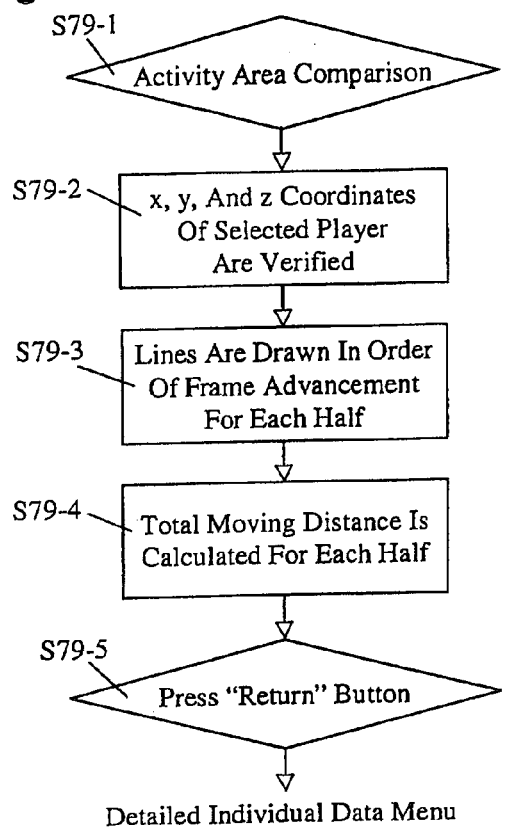
FIG. 79 is a flow chart illustrating the operation of the activity area comparison diagram between the two halves of the game tool shown in FIG. 78.

FIG. 79 shows the operation of the activity area comparison tool. First, the activity area comparison button is pressed (Step S79-1), and the x, y and z coordinates of the selected player are verified (Step S79-2). Lines are drawn in order of frame advancement for each half (Step S79-3) and the total moving distance is calculated for each half (Step S79-4). Pressing the 'return' button (Step S79-5) will bring the user back to the detailed in individual data menu 12e. Individual Related Data—Individual Pass Route Diagram (FIG. 80)

As 'activity area comparison' is selected from the 'Individual Related Data' screen during 'Individual Data' analysis, the (1) total pass number per individual (to/from) and the (2) frequency of pass between individual players appear as diagrams on the screen of the image display device 50 from the memory device 23 of the automatic tracking device 20 through the interface as shown in FIG. 1.

Figure 80:
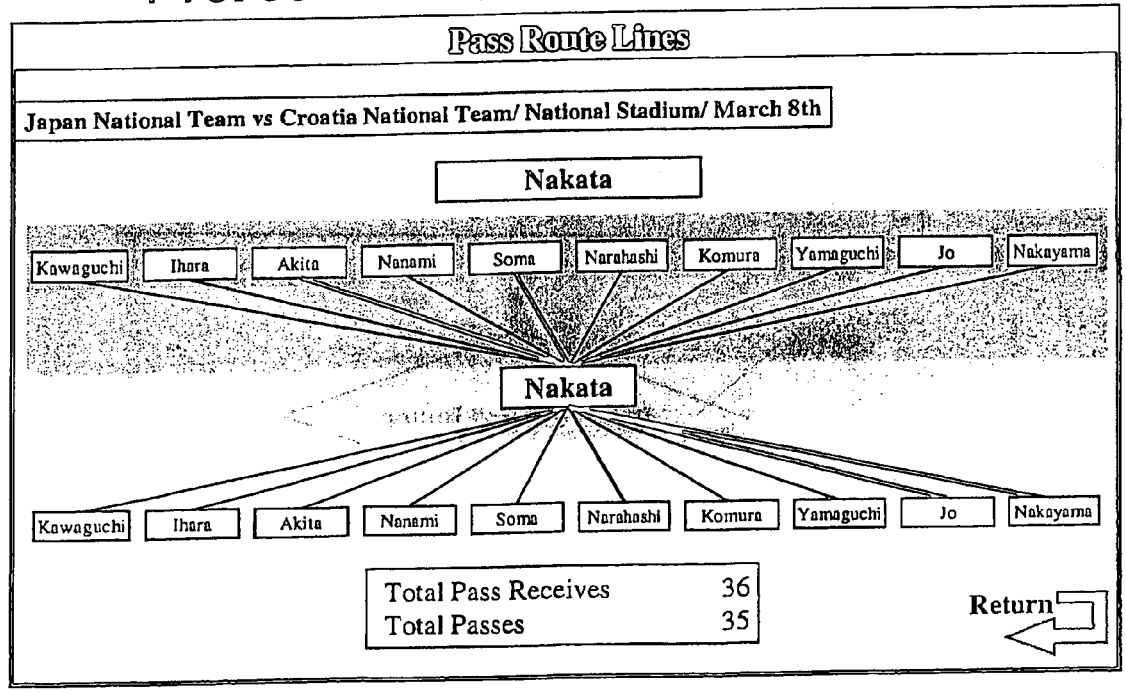
FIG. 80 is a schematic view showing the line diagram of the pass route of the individual related data shown in FIG. 71.

FIG. 80 shows the total pass number made by 'Nakata' during the March 8 'vs. Croatia' game. It shows that 'Nakata' received a total of 36 passes and made a total of 35 passes. The top row in FIG. 80 lists the players who 'Nakata' received passes from and the bottom row lists those who 'Nakata' made passes to. The frequency of the passes between two players can be easily visualized from the thickness of the lines connecting 'Nakata' and other players. It can be understood from FIG. 80, that 'Nakata' received more passes from 'Akita' and 'Soma' while he made more passes to 'Jo' and 'Nakayama'.

Figure 81:
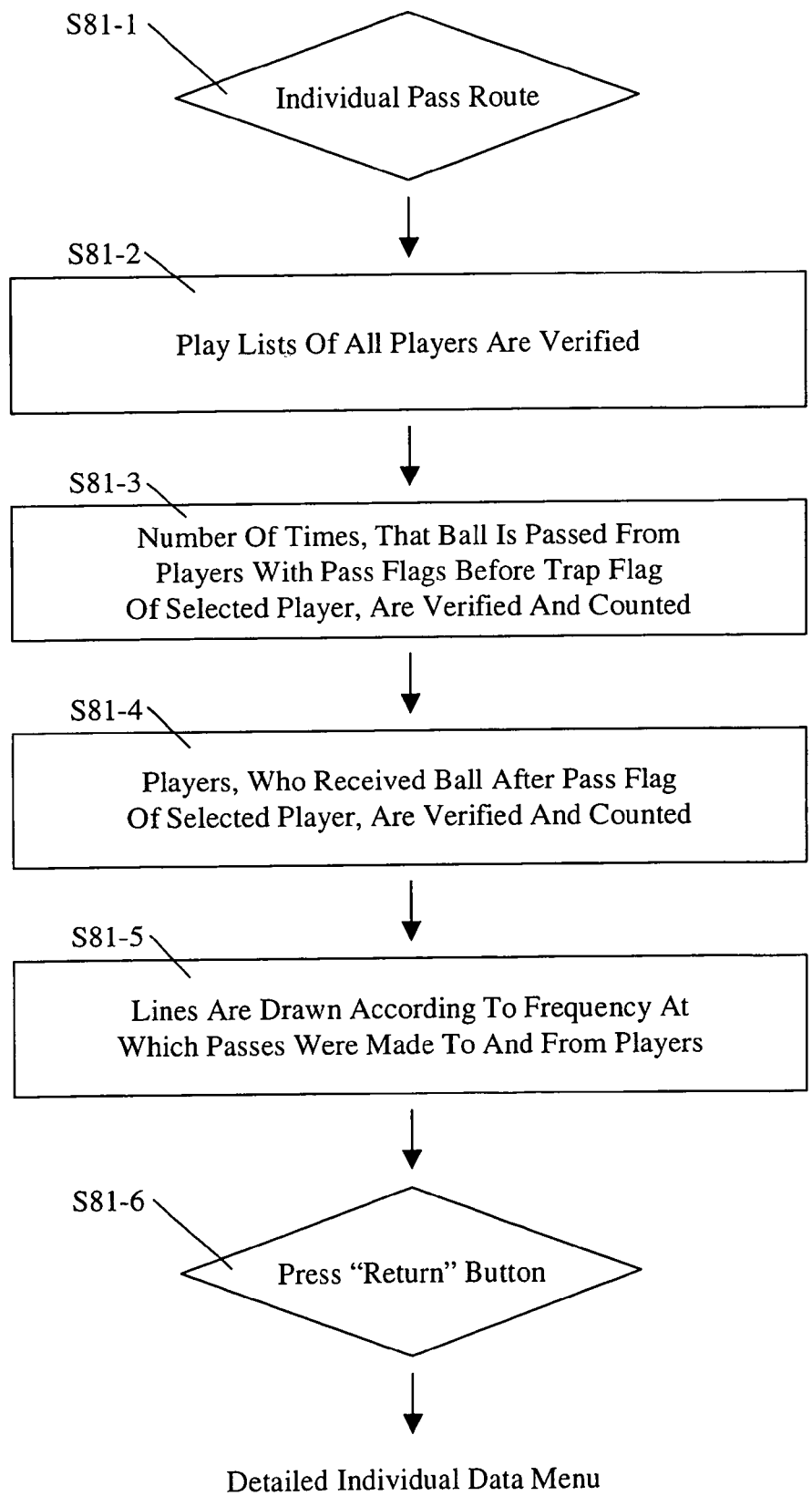
FIG. 81 is a flow chart illustrating the operation of the pass route tool shown in FIG. 80.

FIG. 81 shows the operation of the individual pass route tool. First, the individual pass route button is pressed (Step S81-1), and play lists of all players are verified (Step S81-2). The numbers of times, that the ball is passed from the player with the pass flag before the trap flag of the selected player, are verified and counted (Step S81-3). The player, who received the ball after the pass flag of the selected player, is verified and counted (Step S81-4). The lines are drawn according to the frequency at which the passes were made to and from the players (Step S81-5). Pressing the 'return' button (Step S81-6) will bring the user back to the detailed individual data menu.

In the following, the 'Team Related Data' will be explained.

Figure 82:
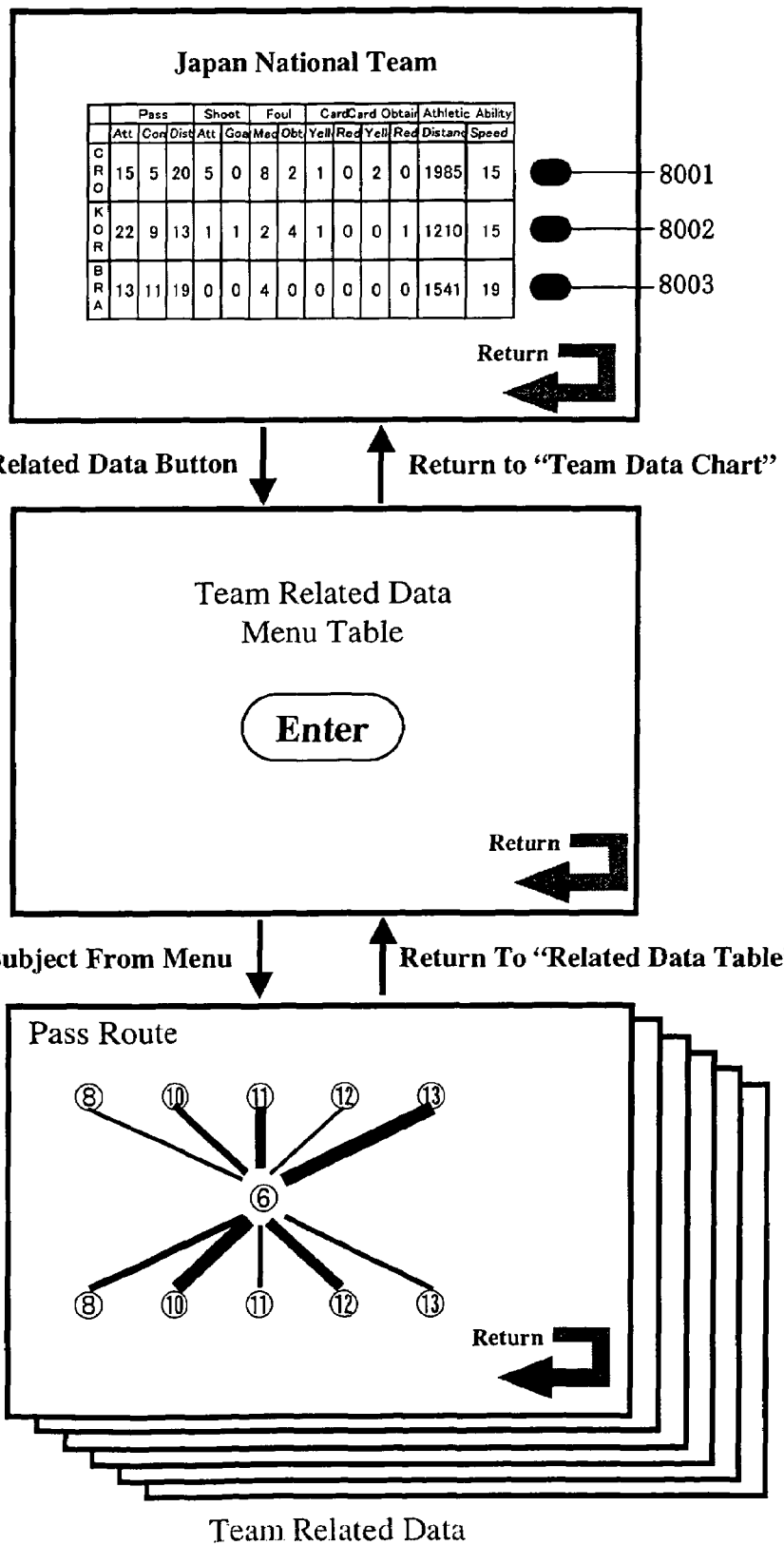
FIG. 82 is a flow chart illustrating the operation of the team related detailed data menu of the analysis system in FIG. 1.

13. Team Related Data Menu (FIG. 82)

Figure 83:
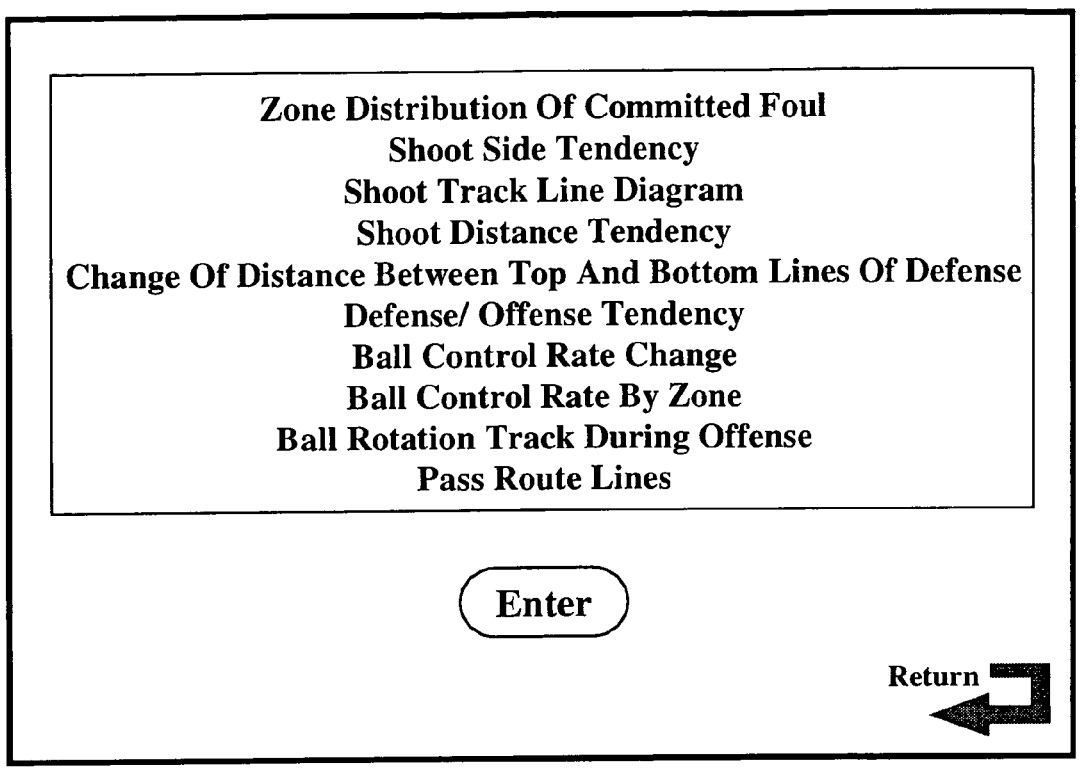
FIG. 83 is a schematic view showing the table of contents of the team related detailed data menu shown in FIG. 82.

Icons 8001 to 8003 are arranged to move to the 'Team Related Data' for each game under the 'Team data' heading The obtainable title list of the 'Team Related Data' will appear on the screen of the image display device 50 from the memory device 23 of the automatic tracking device 20 through the interface 30 when the icons 8001 to 8003 are clicked. From this list, data can be selected, and its contents will be available. The 'Team Related Data' basically generates graphs and figures of data just as the 'Individual Related Data'. As shown in FIG. 83, it includes figures such as 'zone distribution of committed fouls', 'shoot side tendency', 'shoot track', 'shot distance tendency', 'change of width between the top and bottom lines in defense', 'offense/defense tendency over time', 'change of ball control rate', 'comparison of ball control rates by area', 'ball rotation route in offense'and 'pass route line diagrams'. No further links exist since 'Detailed Team Data' is shown as graphs.

13a. Team Related Data—the Zone Distribution of Committed Fouls (FIG. 84)

As the 'zone distribution of fouls committed by a team' is selected from the 'Team related data' screen during 'Team data' analysis, the (1) total number of fouls and the (2) zones, in which the fouls were committed along the time axis, appear on the screen of the image display device 50 from the memory device 23 of the automatic tracking device 20 through the interface 30 as shown in FIG. 1.

Figure 84:
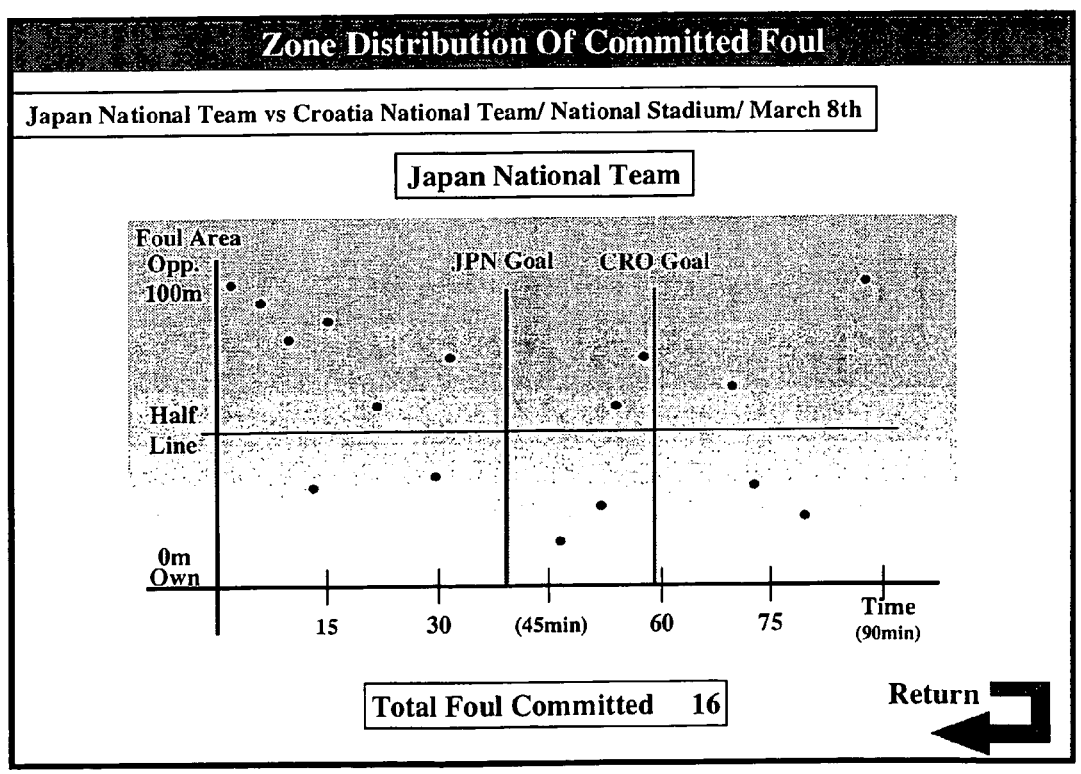
FIG. 84 is a schematic view showing the area distribution of committed fouls in the team related detailed data menu shown in FIG. 82.

FIG. 84 shows that there were many fouls committed after entering the opponent's zone during the first half of the March 8 'vs. Croatia' game, and in the second half, fouls were committed at the same rate in both opponent's and own zones. Further, it is evident that the opponent team scores points after fouls have been committed in the opponent's zone.

Figure 85:
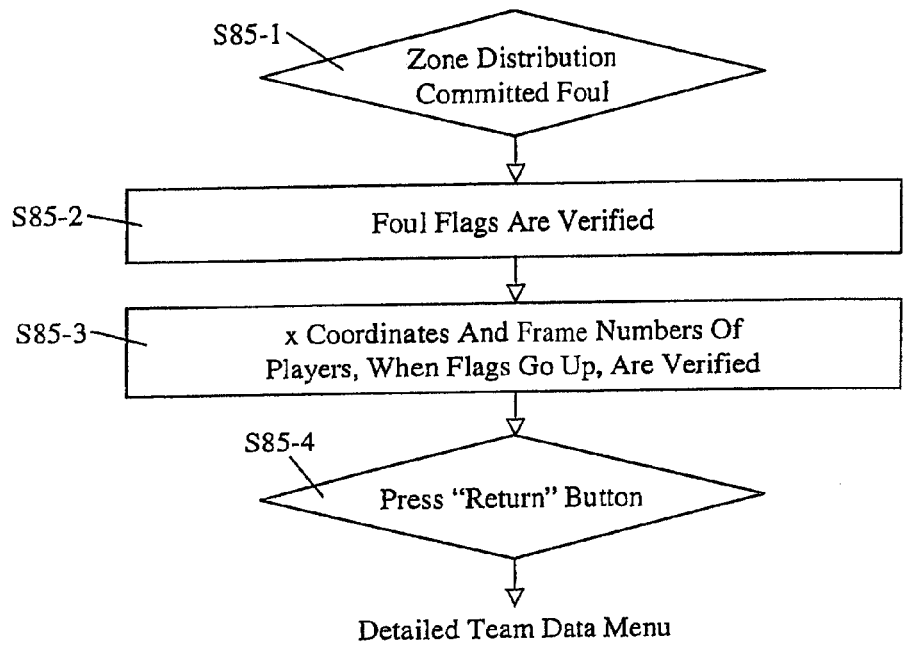
FIG. 85 is a flow chart illustrating the operation of the area distribution of committed fouls tool shown in FIG. 84.

FIG. 85 shows the operation of the zone distribution of committed fouls tool. First, the foul area button is pressed (Step S85-1), and the foul flag is verified (Step S85-2). The x coordinates and frame numbers of the players, when the flags go up, is reflected (Step S85-3). Pressing the 'Return' button (S85-4) brings the user back to the detailed team data menu.

13b. Team Related Data—Shoot Side Tendency (FIG. 86)

As 'shoot side tendency of the team over time' is selected from the 'Team Related Data' screen during 'Team Data' analysis, the (1) total number of shoot and the (2) angle of the shoot along the time axis appear as a figure on the screen of the image display device 50 from the memory device 23 of the automatic tracking device 20 through the interface 30 as shown in FIG. 1.

Figure 86:
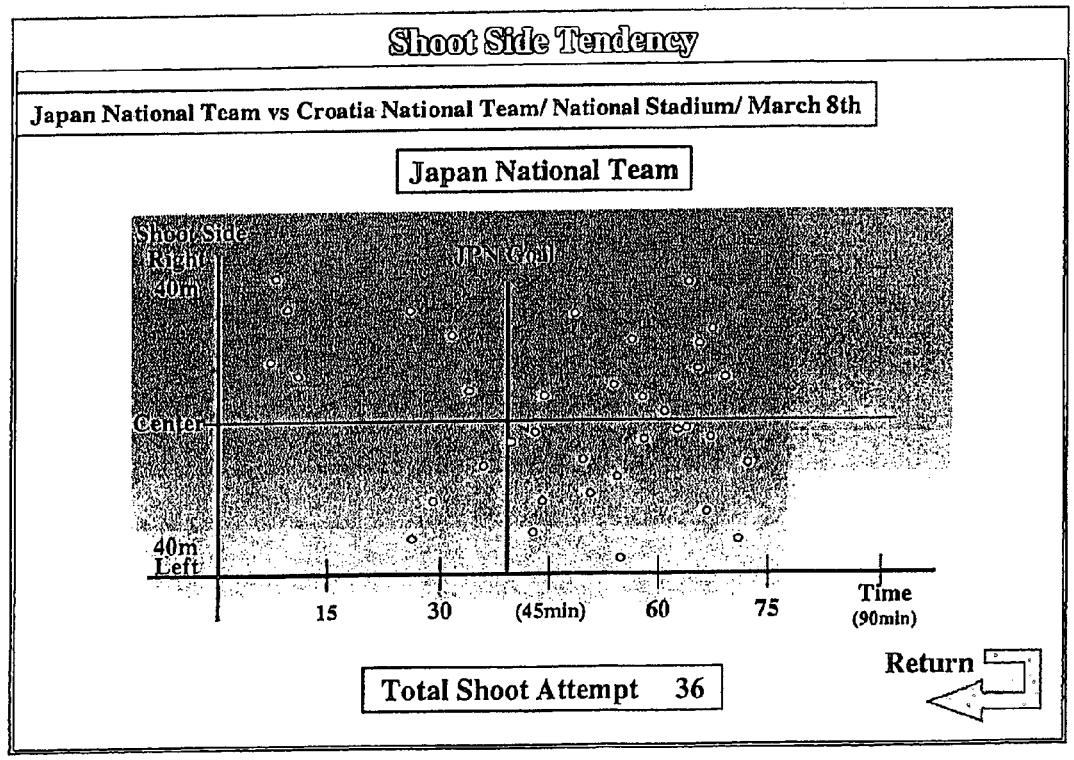
FIG. 86 is a schematic view showing the shoot side tendency of the team related data shown in FIG. 83.

FIG. 86 shows that there were more shoots from the right side in the first half of the March 8 'vs. Croatia' game. Then, some shoots were made from the side attack in the second half, and however, more shots were made from the center towards the end of the game.

Figure 87:
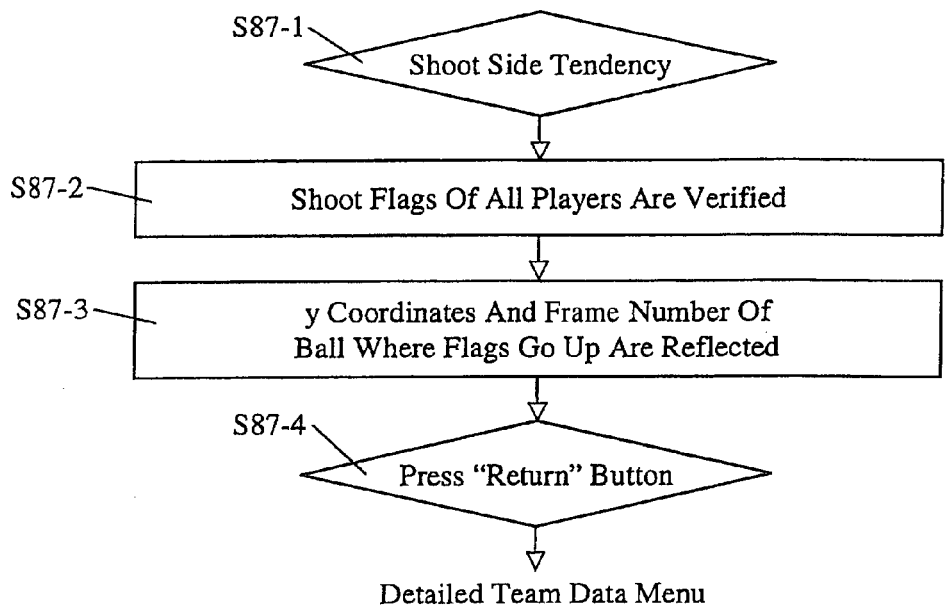
FIG. 87 is a flow chart illustrating the operation of the shoot side tendency tool shown in FIG. 86.

FIG. 87 shows the operation of the tendency of the team shoot side tendency tool. First, the shoot side tendency button is pressed (Step S87-1), and shoot flags of all players are verified (Step S87-2). The y coordinate/frame number of the ball when the flags go up are reflected (Step S87-3). Pressing the 'return' button (Step S87-4) will bring the user back to the detailed team data menu.

13c. Team Related Data Shoot Track Line Diagram (FIG. 88)

As 'shoot path line diagram' is selected from the 'Team Related Data' screen during 'Team Data' analysis, the (1) total number of shoot and the (2) track of the ball along the time axis appear on the screen of the image display device 50 from the memory device 23 of the automatic tracking device 20 through the interface 30 as shown in FIG. 1.

Figure 88:
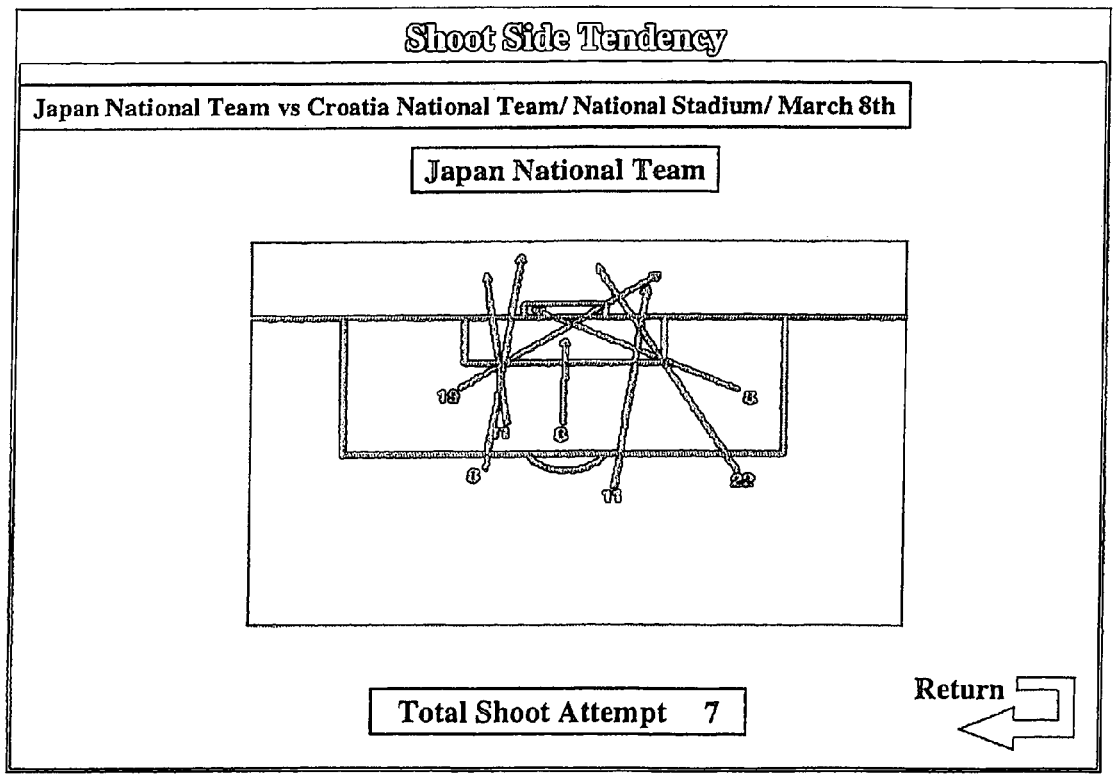
FIG. 88 is a schematic view showing the shoot track diagram of the team related detailed data shown in FIG. 83.

FIG. 88 shows the each shoot track of player numbers 8, 11, 19 and 22 in the March 8 'vs. Croatia' game. It becomes evident that the shoot made by player 8 from the penalty area to the right by makes the goal. Further, it can be understood that the shoot made by player number 19 has passed above the goal.

Figure 89:
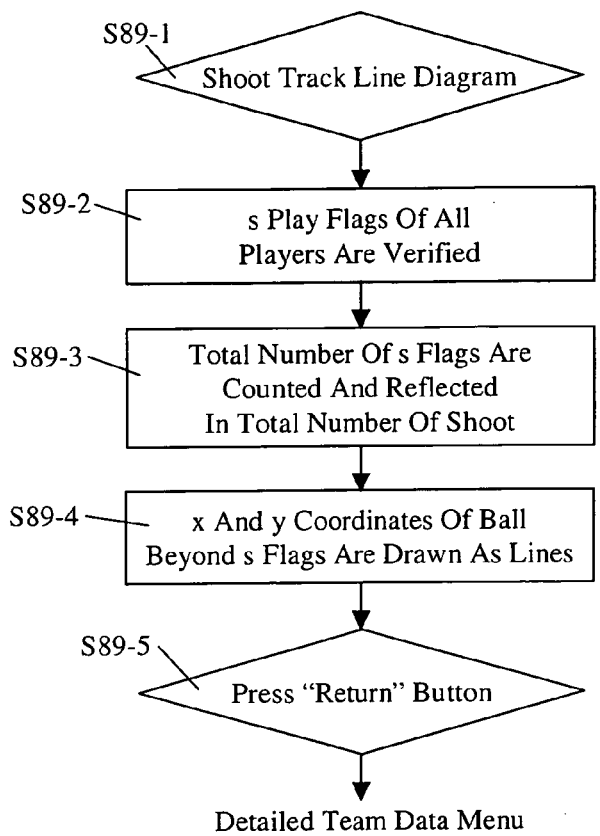
FIG. 89 is a flow chart illustrating the operation of the shoot track diagram tool shown in FIG. 88.

FIG. 89 shows the operation of the team shoot track line diagram. First, the shoot track diagram button is pressed (Step S89-1) and the s play flags of all players are verified (Step S89-2). The total number of s flags are counted and reflected in the total number of shoot (Step S89-3), and the x and y coordinates of the ball beyond the s flag are drawn as lines (Step S89-4). Pressing the 'return' button (Step S89-5) will bring the user back to the detailed team data menu.

13d. Team Related Data—Shoot Distance Tendency (FIG. 90)

As 'tendency of shoot distance over time' is selected from the 'Team Related Data' screen during 'Team Data' analysis, the (1) average shoot distance and the (2) shoot distance over time appear on the screen of the image display device 50 from the memory device 23 of the automatic tracking device 20 through the interface 30 as shown in FIG. 1.

Figure 90:
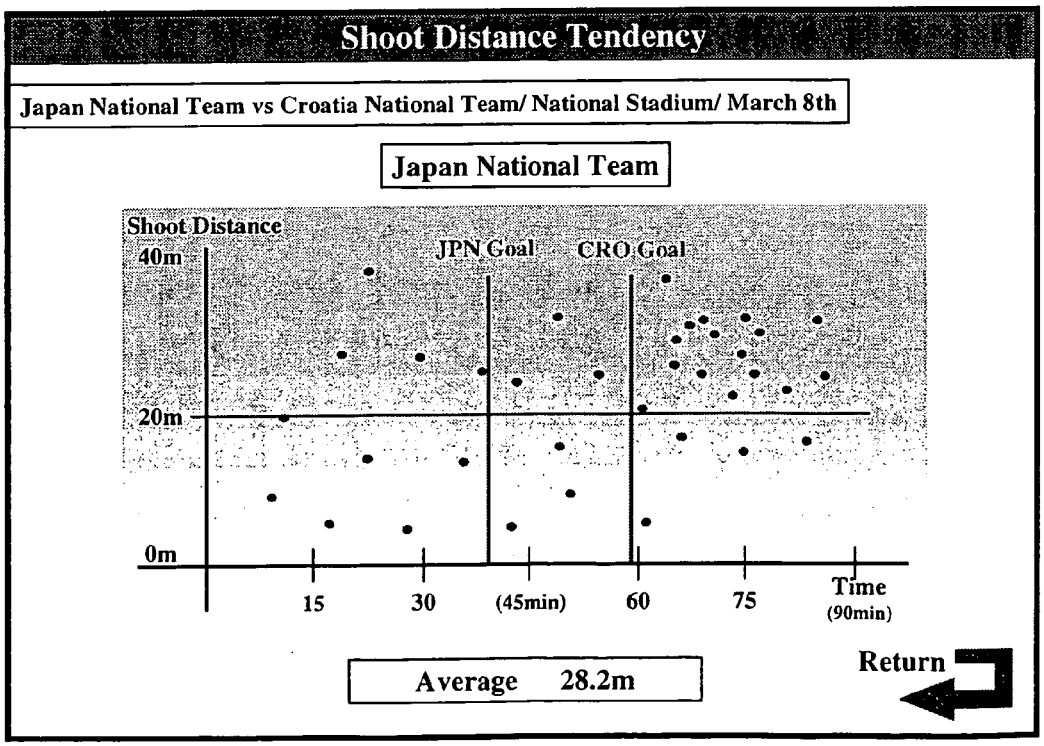
FIG. 90 is a graph showing the shoot distance tendency of the team related detailed data shown in FIG. 83.

FIG. 90 shows that shoots have been made from an average distance of 40 meters from the goal directed towards the center, in the first half of the March 8 'vs. Croatia' game, but in the second half, more shoots were made from a distance of 25 to 30 meters. In other words, this illustrates the fact that shots could not be made from near the goal. Further, it becomes the evident that the average shot distance was 28.2 meters.

Figure 91:
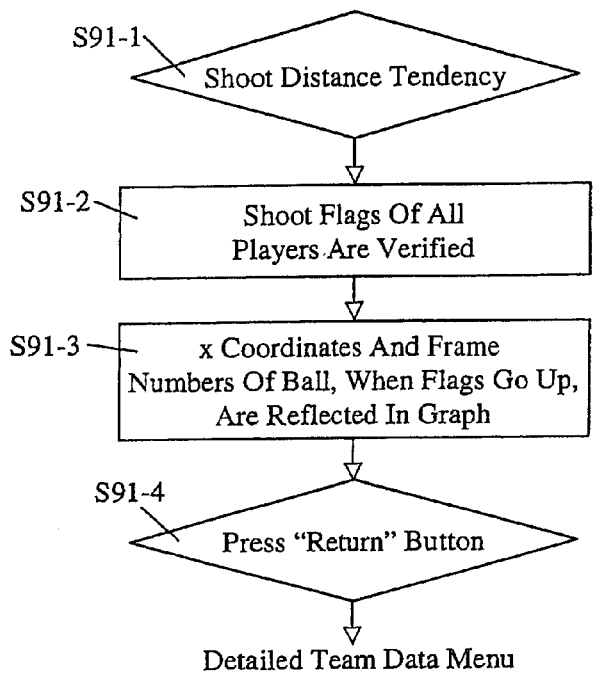
FIG. 91 is a flow chart illustrating the operation of the shoot distance tendency tool shown in FIG. 90.

FIG. 91 shows the operation of the team shoot distance tendency tool. First, the shoot distance tendency button is pressed (Step S91-1) and the shoot flags of all players are verified (Step S91-2). The x coordinates/frame number of the ball, when the flags go up, are reflected in the graph (Step S91-3). Pressing the 'return' button (Step S91-4) will bring the user back to the detailed team data menu.

13e. Team Related Data—Change of Distance Between the Top and Bottom Lines of Defense (FIG. 92)

As the 'change of distance between the top and bottom lines of defense' is selected from the 'Team Related Data' screen during 'Team Data' analysis, the (1) average distance between top and bottom lines and the (2) distance between the top and bottom lines during defense over time appear on the screen of the image display device 50 from the memory device 23 of the automatic tracking device 20 through the interface 30 as shown in FIG. 1.

Figure 92:
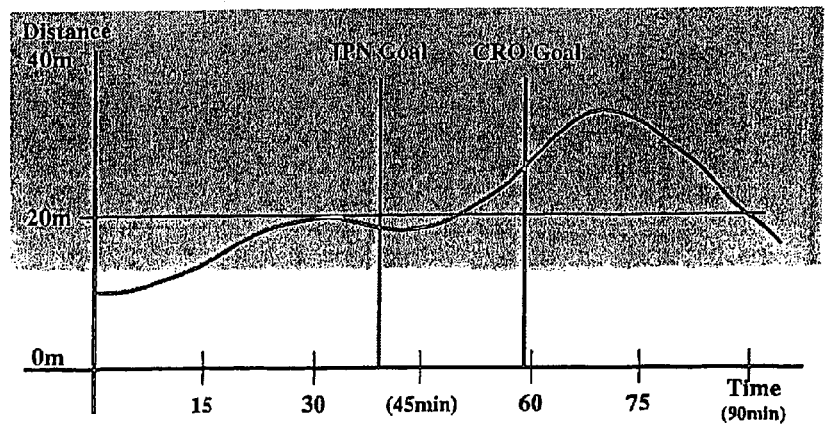
FIG. 92 is a graph showing the distance between top and bottom lines during defense in the team related detailed data shown in FIG. 83.

FIG. 92 shows that the distance between the top and bottom lines was below 20 meters when point was scored in the March 8 'vs. Croatia' game. But when the opponent team scored, this distance had increased to approximately 25 meters, and spreads to about 30 meters after the score by opponent. This means not only making difficult to defend by disabling to set up an offside trap, but also providing the opponent more opportunities to attack.

Figure 93:
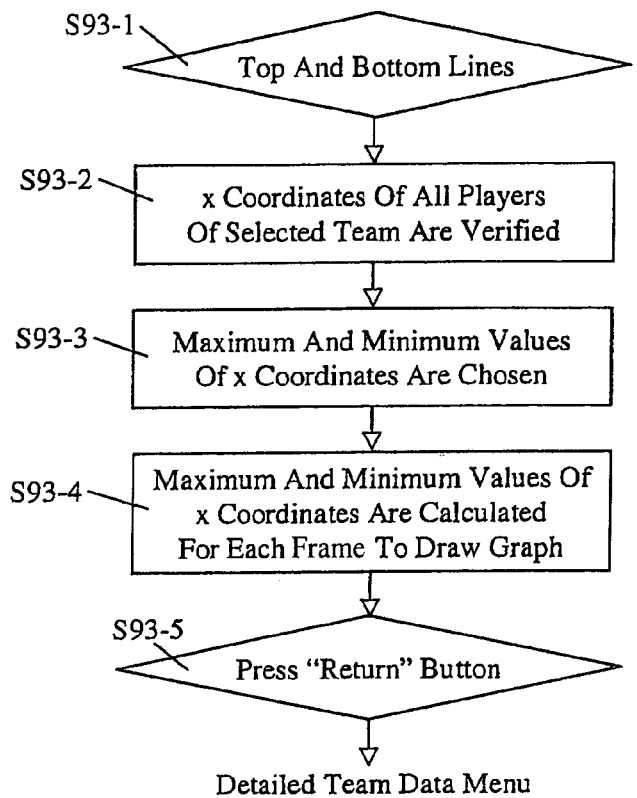
FIG. 93 is a flow chart illustrating the operation of the distance between top and bottom line during defense tool shown in FIG. 92.

FIG. 93 shows the operation of the distance between the top and bottom lines of defense. First, the distance between top and bottom is pressed (Step S93-1), and the x coordinates of all players of the selected team are verified (Step S93-2). The maximum and minimum values of the x coordinates are chosen (Step S93-3), and the (maximum/minimum) values of the x coordinates are calculated for each frame to draw a graph (Step S93-4). Pressing the 'return' button (Step S93-5) will bring the user back to the detailed team data menu.

13f. Team Related Data—Defense/Offense Tendency (FIG. 94)

As 'defense/offense tendency of a team over time' is selected from the 'Team related data' screen during 'Team data' analysis, the (1) play ratio in opponent's zone and the (2) ball movement track over time <movement right afterwards> appear on the screen of the image display device 50 from the memory device 23 of the automatic tracking device 20 through the interface as shown in FIG. 1.

Figure 94:
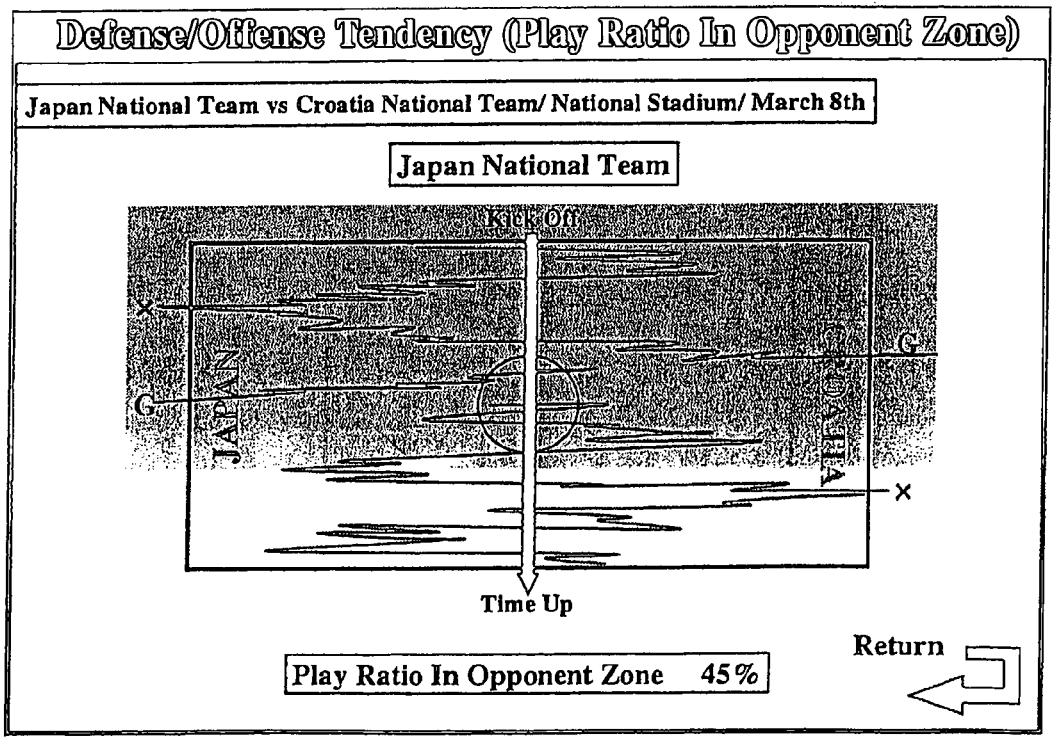
FIG. 94 is a graph showing the defensive/offensive tendency of the team related detailed data shown in FIG. 83.

FIG. 94 clearly shows the details in defense/offense of the Japan National Team from kick off to time up in the March 8 'vs. Croatia' game. There are big offensive periods in each the first and second half, but it is evident that overall, the team was in defense more time during the game.

Figure 95:
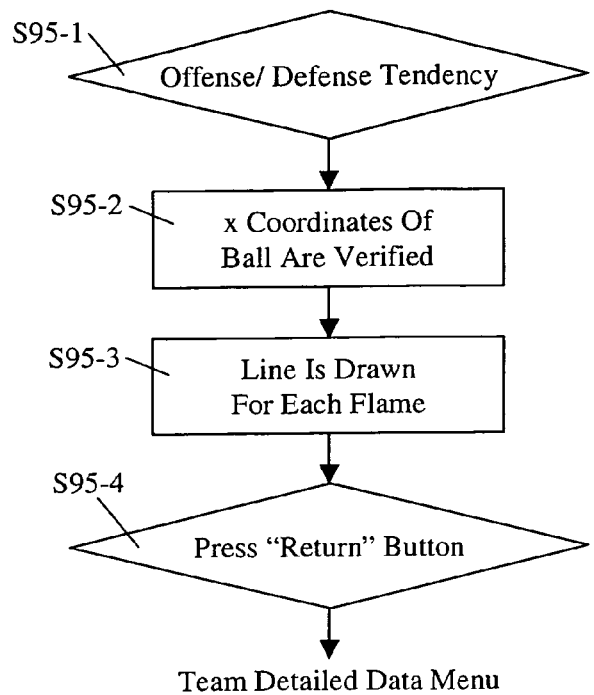
FIG. 95 is a flow chart illustrating the defense/offense tendency tool shown in FIG. 94.

FIG. 95 shows the operation of the defense/offense tendency tool. First, the team defense/offense tendency button is pressed (Step S95-1) and the x coordinates of the ball are verified (Step S95-2) to draw a line for each frame (Step S95-3). Pressing the 'return' button (Step S95-4) will bring the user back to the detailed team data menu.

13g. Team Related Data—Ball Control Rate Change (FIG. 96)

As 'change of ball control rate over time' is selected from the 'Team related data' screen during 'Team data' analysis, the (1) ball control rate and the (2) change of ball control rate over time appear on the screen of the image display device 50 from the memory device 23 of the automatic tracking device 20 through the interface 30 as shown in FIG. 1.

Figure 96:
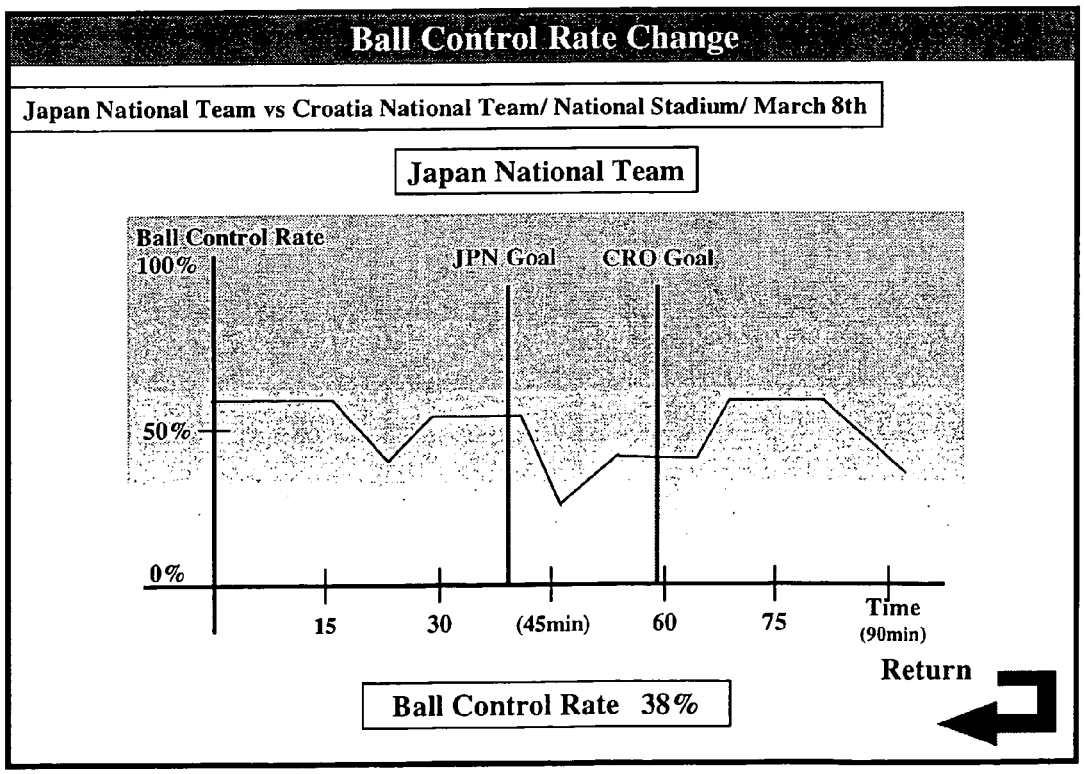
FIG. 96 is a graph showing the change in ball control rate in the team related detailed data shown in FIG. 83.

FIG. 96 shows that the ball control rate was 38% in the March 8 'vs. Croatia' game, and that this rate is especially low towards the end of the first half to the beginning of the second half.

Figure 97:
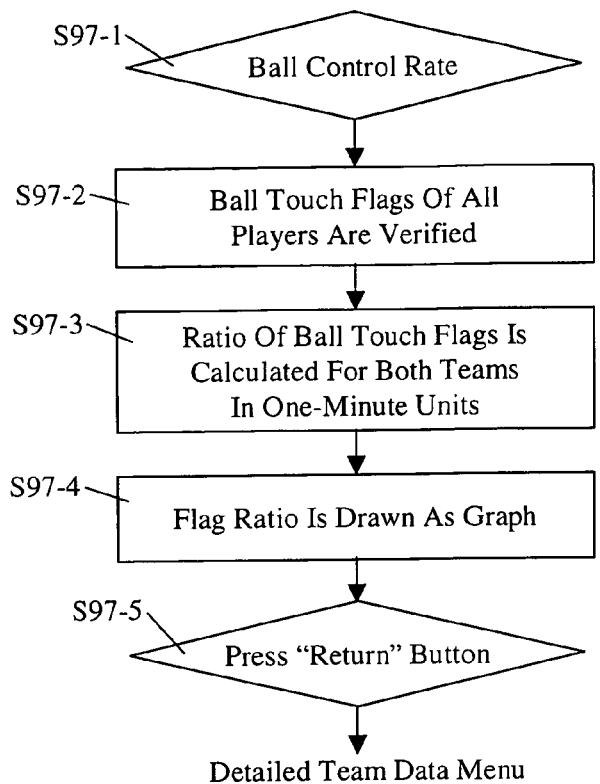
FIG. 97 is a flow chart illustrating the change in ball control rate tool shown in FIG. 96.

FIG. 97 shows the operation of the team ball control rate tool. First, the ball control rate button is pressed (Step S97-1) and the ball touch flags of all players are verified (Step S97-2). The ratio of ball touch flags is calculated for both teams in one-minute units (Step S97-3) and this flag ratio is drawn as a graph (Step S97-4). Pressing the 'return' button (Step S97-5) will bring the user back to the detailed team data menu.

13h. Team Related Data—Ball Control Rate by Zone (FIG. 98)

As 'ball control rate by zone' is selected from the 'Team related data' screen during 'Team data' analysis, the (1) ratio of play area and the (2) ball control rate of both teams by zone appear on the screen of the image display device 50 from the memory device 23 of the automatic tracking device 20 through the interface 30 as shown in FIG. 1.

Figure 98:
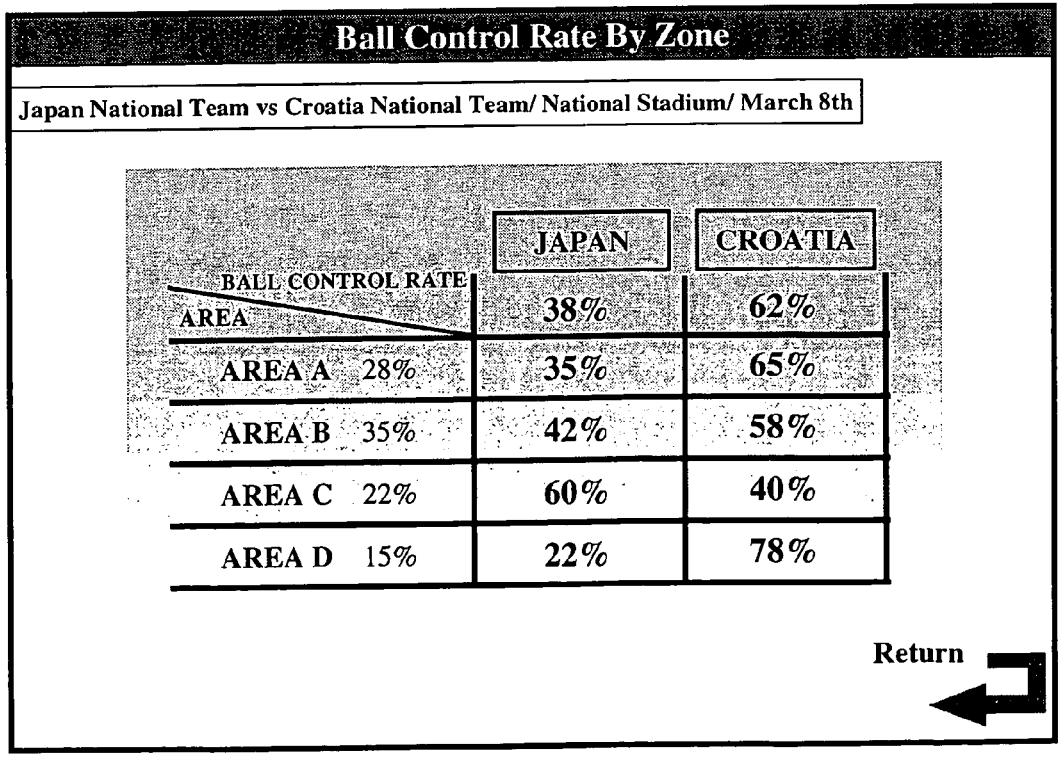
FIG. 98 is a schematic view showing the ball control rate by area in the team related detailed data shown in FIG. 83.

FIG. 98 shows the ball control rate for each zone (A to D) in the March 8 'vs. Croatia' game.

Figure 99:
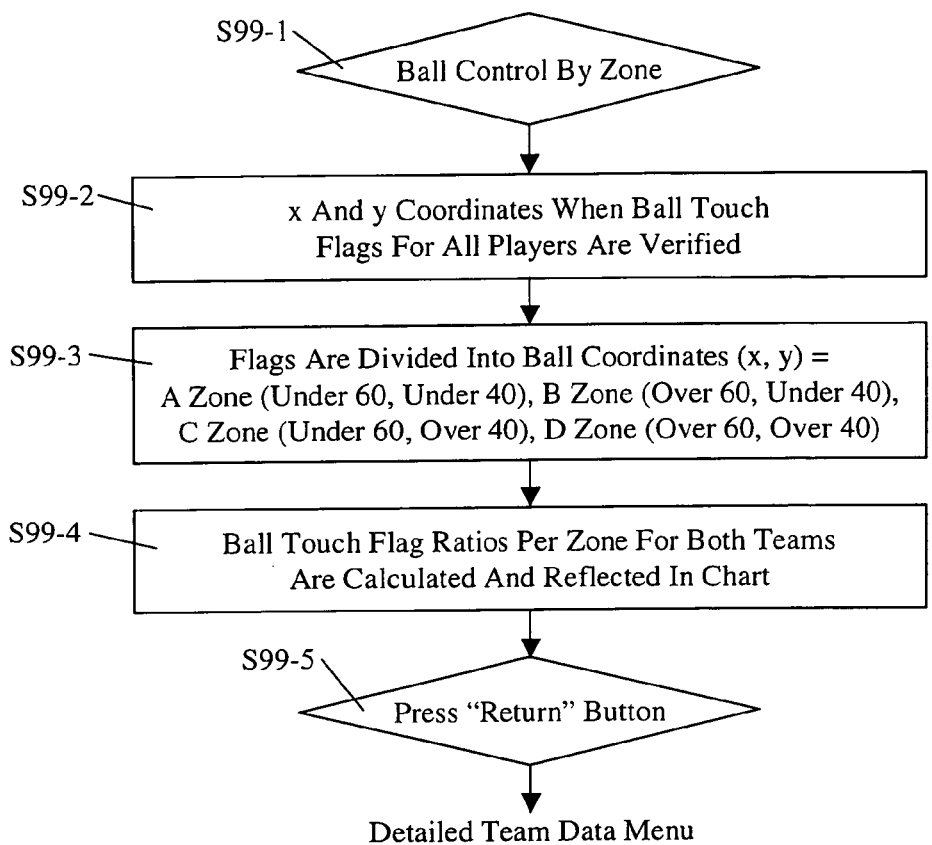
FIG. 99 is a flow chart illustrating the ball control rate by area tool shown in FIG. 98.

FIG. 99 shows the operation of the ball control rate by zone tool. First, the ball control rate by zone button is pressed (Step S99-1) and the x and y coordinates when the ball touch flags for all players go up are verified (Step S99-2). The flags are divided into ball coordinates (x, y)=A zone (under 60, under 40), B zone (over 60, under 40), C zone (under 60, over 40) and D zone (over 60, over 40) respectively (Step S99-3). Then, the ball touch flag ratios per zone for both teams are calculated and reflected in a chart (Step S99-4). Pressing the 'return' button (Step S99-5) will bring the user back to the detailed team data menu.

13i. Team Related Data—Ball Rotation Track During Offense (FIG. 100)

As 'ball rotation track during offense' is selected from the 'Team related data' screen during 'Team data' analysis, the (1) total number of passes and the (2) ball rotation tracks drawn by two different colors for each half appear on the screen of the image display device 50 from the memory device 23 of the automatic tracking device 20 through the interface 30 as shown in FIG. 1.

Figure 100:
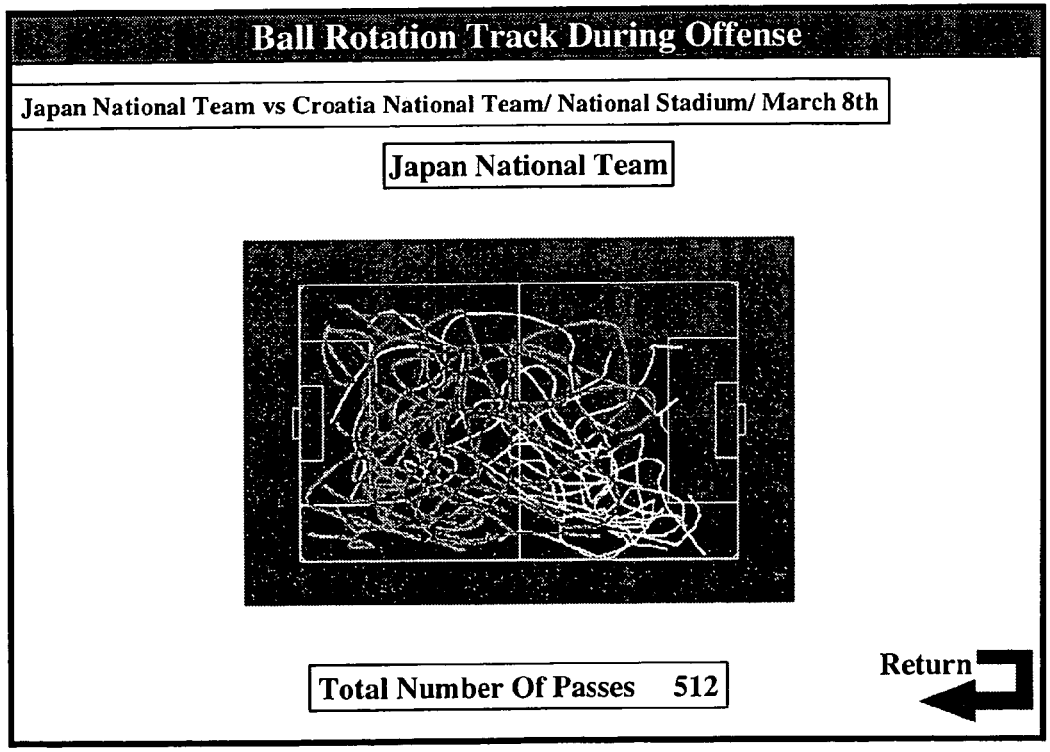
FIG. 100 is a schematic view showing the ball rotation track during offense in the team related detailed data shown in FIG. 83.

FIG. 100 shows the ball rotation tracks of that the Japan National Team used in their offense in the March 8 'vs. Croatia' game. The figure clearly shows that during offense drawn by 'red' lines, the ball rotation took place over an evenly spread area, however, during offense drawn by 'yellow' lines, the ball was rotated more often in the lower right section.

Figure 101:
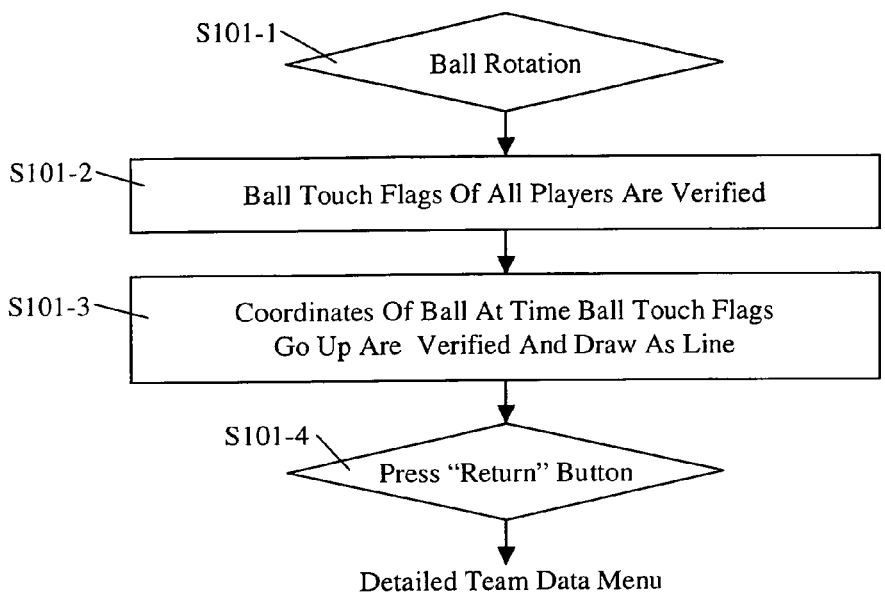
FIG. 101 is a flow chart illustrating the ball rotation track during offense tool shown in FIG. 100.

FIG. 101 shows the operation of the ball rotation track during offense. First, the ball rotation button is pressed (Step S101-1), and the ball touch flags of all players are verified (Step S101-2). The coordinates of the ball at the time the ball touch flags go up are verified and drawn as a line (Step S101-3). Pressing the 'return' button (Step S101-4) will bring the user back to the detailed team data menu.

13j. Team Related Data—Pass Route Lines (FIGS. 102, 103 and 104)

When 'pass route lines' is selected from the 'Team related data' screen during 'Team data' analysis, the (1) total number of passes and the (2) frequency of passes between players appear as a figure on the screen of the image display device 50 from the memory device 23 of the automatic tracking device 20 through the interface 30 as shown in FIG. 1.

Figure 102:
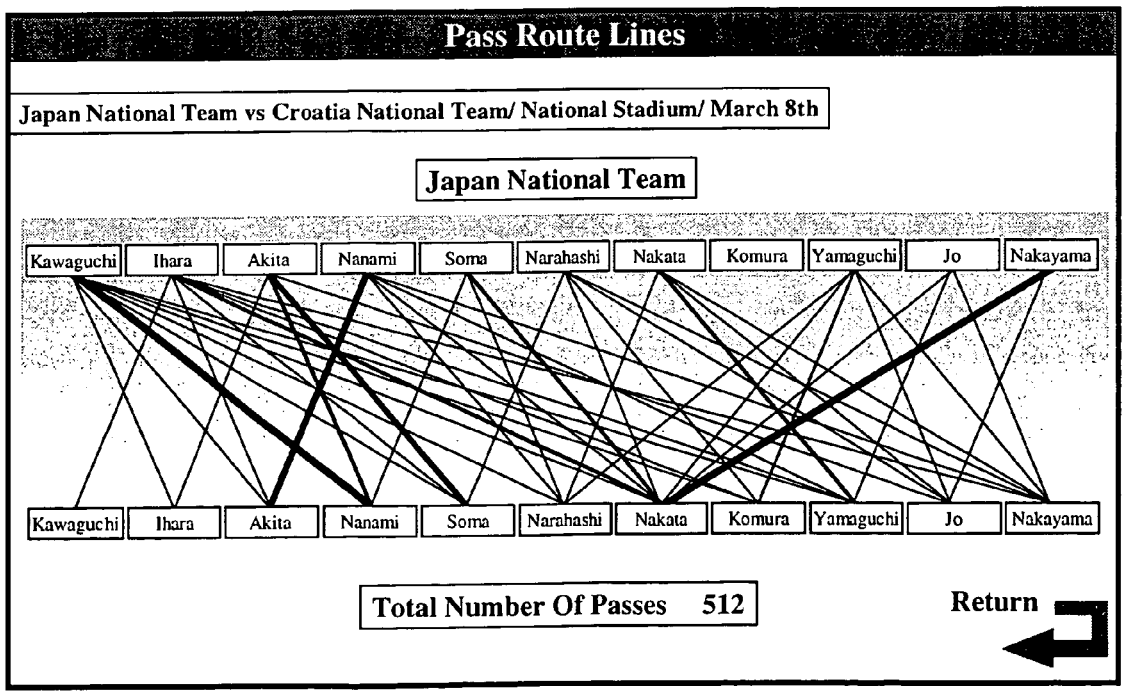
FIG. 102 is a schematic view showing the pass route diagram in the team related detailed data shown in FIG. 83.

FIG. 102 shows that pass route line diagram of the March 8 'vs. Croatia' game. It helps visualize the frequency of passes between players in the given game.

Figure 103:
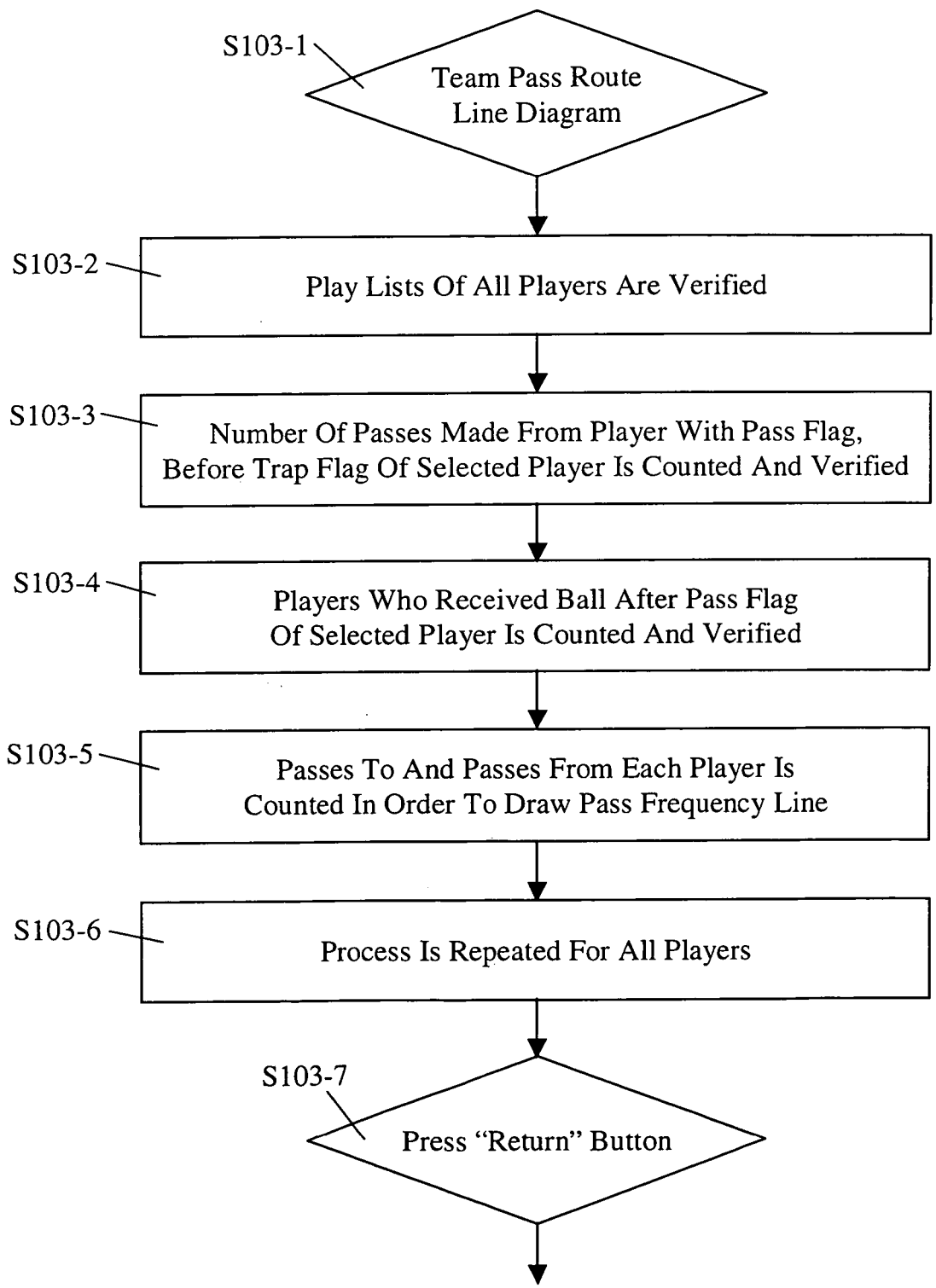
FIG. 103 is a flow chart illustrating the pass route diagram tool shown in FIG. 102.
Figure 104:
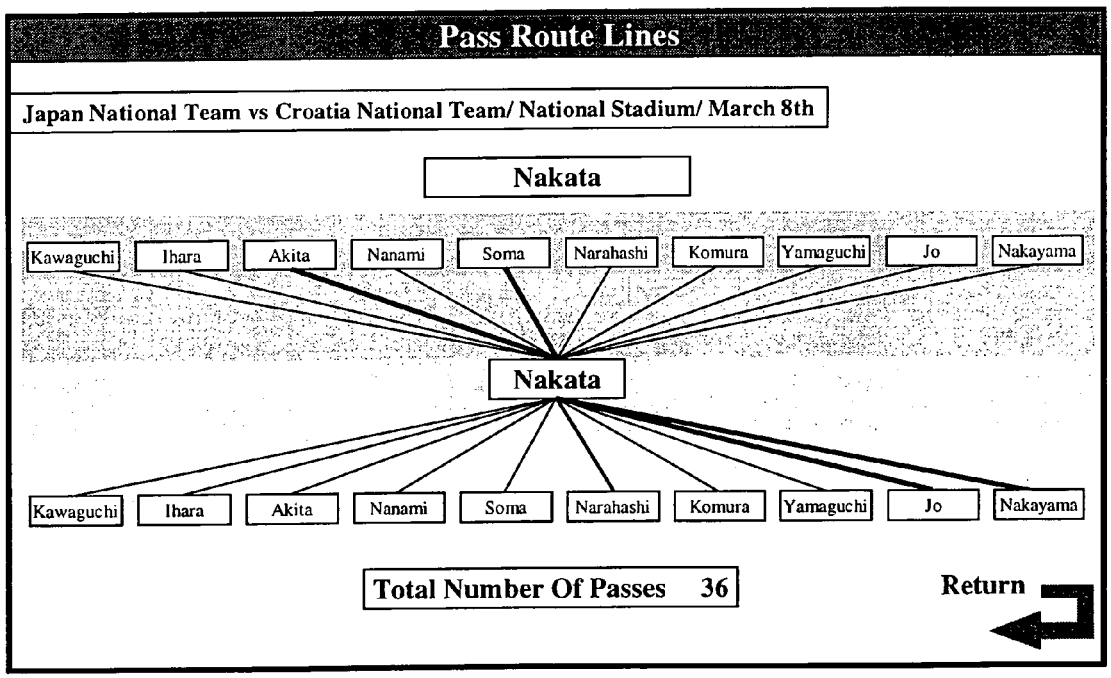
FIG. 104 is a schematic view showing the pass route diagram between a specified player and the players listed in FIG. 102.

FIG. 103 shows the operation of the pass route line diagram tool. First, the pass route line diagram button is pressed (Step S103-1) and the play lists of all players are verified (Step 103-2). The number of passes made from the player with the pass flag, before the trap flag of the selected player is counted and verified (Step S103-3). The player who received the ball after the pass flag of the selected player is counted and verified (Step S103-4), and passes to and passes from each player is counted in order to draw the pass frequency line (Step S103-5). This process is repeated for all players (Step S103-6). Pressing the 'return' button (Step S103-7) will bring the user back to the detailed individual data menu.

By clicking a specific player in the 'team pass route line diagram' shown in FIG. 104, the player's individual 'pass route line diagram' appears on the screen of the image display device 50 from the memory device 23 of the automatic tracking device 20 through the interface 30 as shown in FIG. 1, which shows both passes received and sent out. FIG. 104 shows the passes received and sent out for player 'Nakata' in the March 8 'vs. Croatia' game.

Next, other embodiments of the present invention are explained.

These embodiments consist of the functions explained below added to the functions through above mentioned embodiments.

1. The Detail Explanation for Formation Analysis Tools.

By clicking the tool button on the screen, the windows or tool boxes, where users can input the analysis object and condition, will appear on the screen.

The function is decided by pressing the return button after the user set up each condition depending on the each tool on the screen. Also, by pressing the play back button of play control button, the operation of each function will be started.

The operation is stopped when the user clicked the tool icon during the operation is active.

For resetting the operation, the user can reset by clicking the tool box again after the user cancel the operation by clicking the tool button.

1-1. Digital Video Set Tool

<Function>

Figure 105:
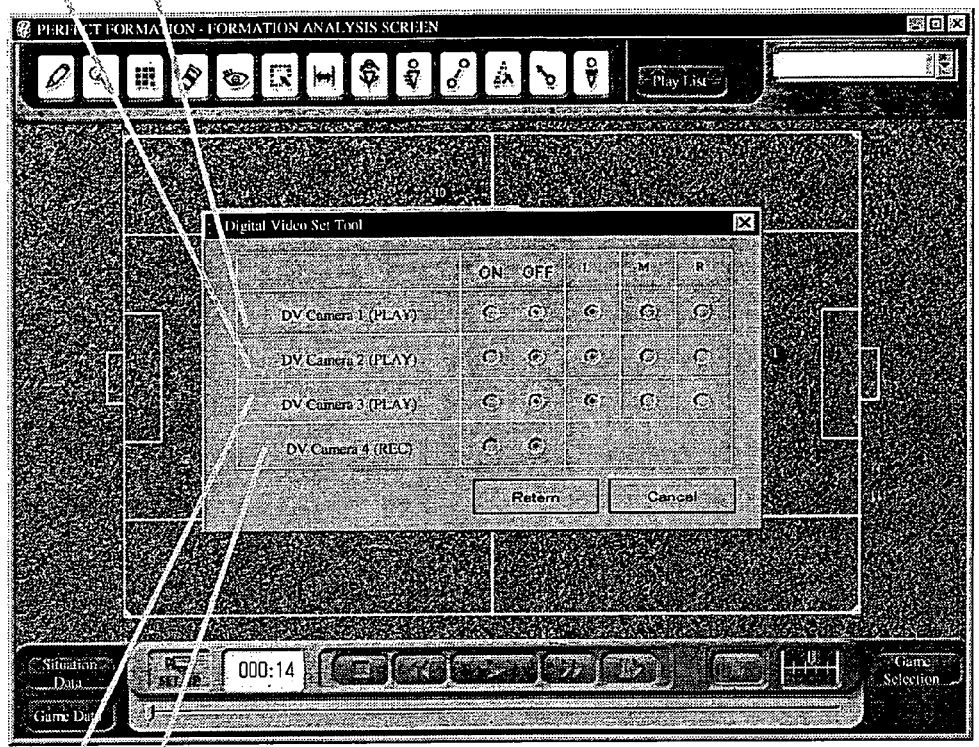
FIG. 105 is a diagram for illustrating a function of the digital video set tool in another embodiment of the present invention.

As shown in FIG. 105, the user can control play back and copy operations through multiple recording digital video camera and playing digital video cameras by "play control button" 105a~105c and/or "video edit recording button" 105d after selecting this digital video set tool.

<Set Up Window>

It is outputted in a window form on the formation analysis screen. After setting up each digital video camera, by clicking the return button the user enables to operate the play control button or the video edit recording button linking with video materials during the formation analysis.

1-2. Field Block Display Tool

<Function>

Figure 106:
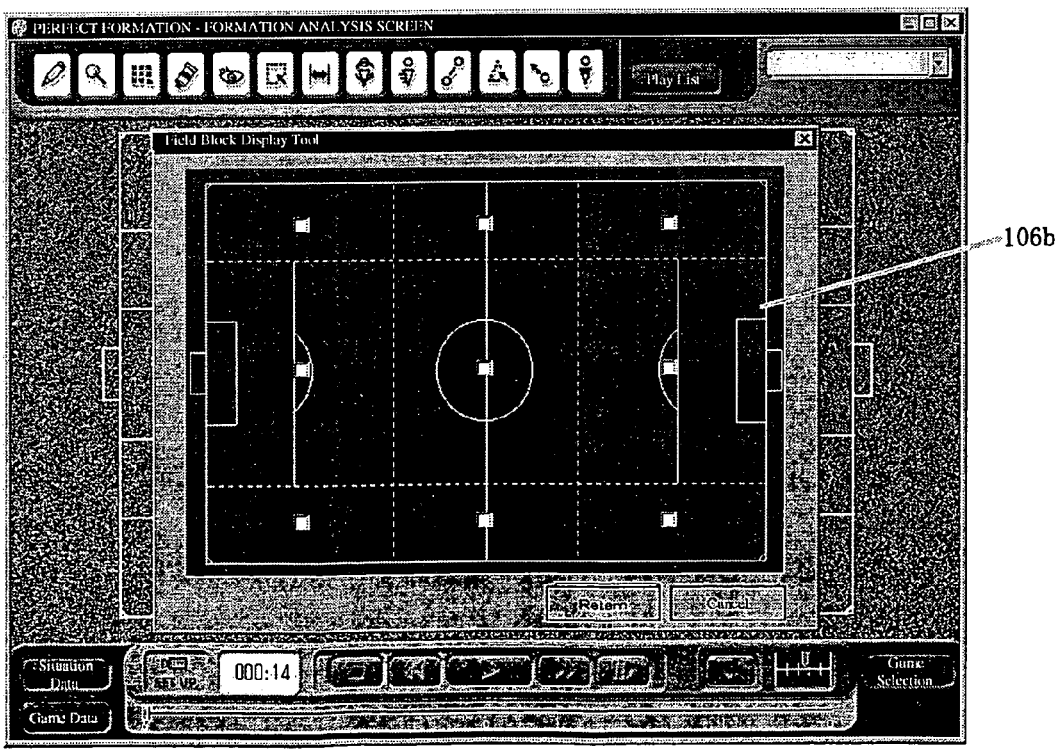
FIG. 106 is a diagram for illustrating a function of the field block display tool in another embodiment of the present invention.
Figure 107:
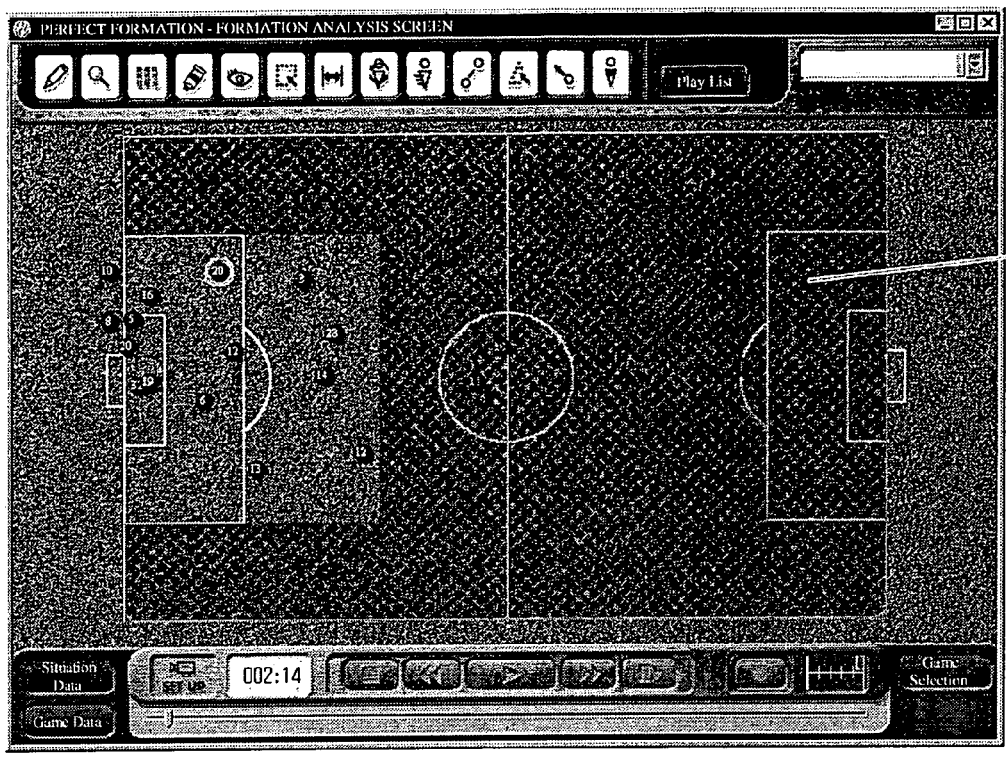
FIG. 107 is an explanatory diagram at a time when implementing the masking using the field block display tool shown in FIG. 106.

By pressing this tool icon, the multiple block pattern 106a on the screen as shown in FIG. 106. By clicking the desired analysis area in this block pattern, all area will be masked except the desired area.

<Set Up Window>

It is outputted in a window form on the formation analysis screen.

The field divided into blocks is shown on the screen. As the user selects the check button(s) assigned to each block (multiple selection possible) and presses the return button, the masking 107a is reflected on the actual formation screen as shown in 107.

1-3. Player Position Color-coding Tool

<Function>

Figure 108:
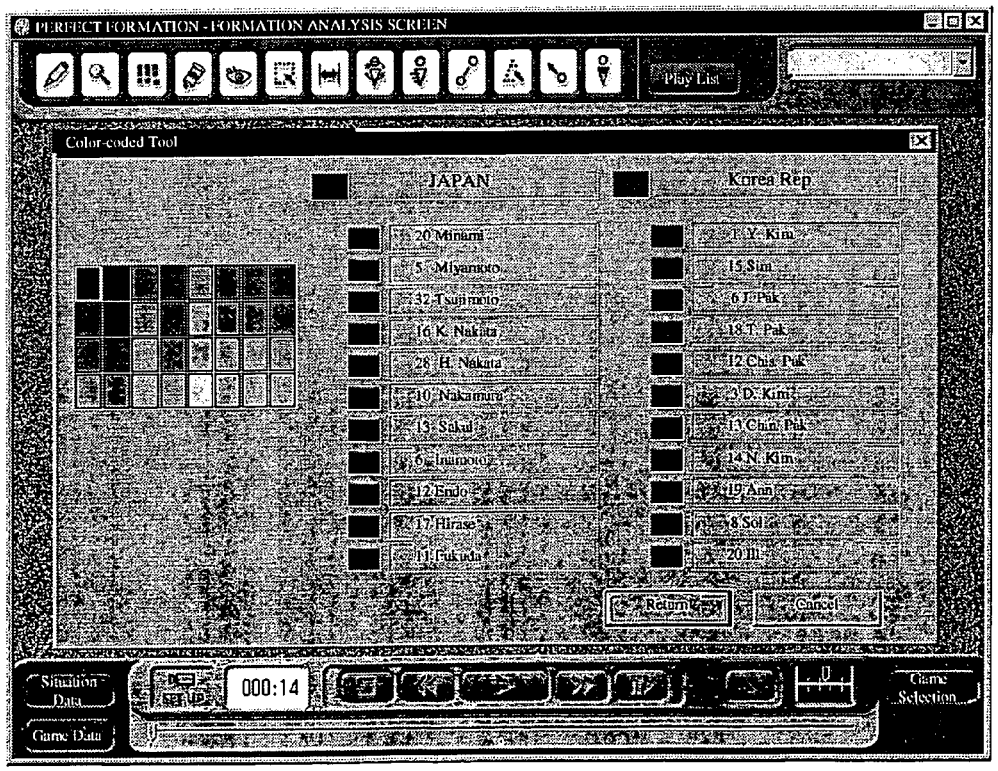
FIG. 108 is a diagram for illustrating the player position color-coded tool in another embodiment of the present invention.
Figure 109:
FIG. 109 is an explanatory diagram at a time when displaying the players in different colors using the player position color-coded tool shown in FIG. 108.

As using this color-coding tool, the user can recognize "player's movement," "covering situation," or "commands of lines" for each position in different colors. (FIG. 108 and FIG. 109)

<Set Up Window>

It is outputted in a window form on the formation analysis screen.

The player icon for color preview is displays next to player's names.

By selecting the subject player(s) icon and clicking subject color(s) on the color palette, the user can change the icon(s) color.

1-4. Subject Player Change Tool

<Function>

Figure 110:
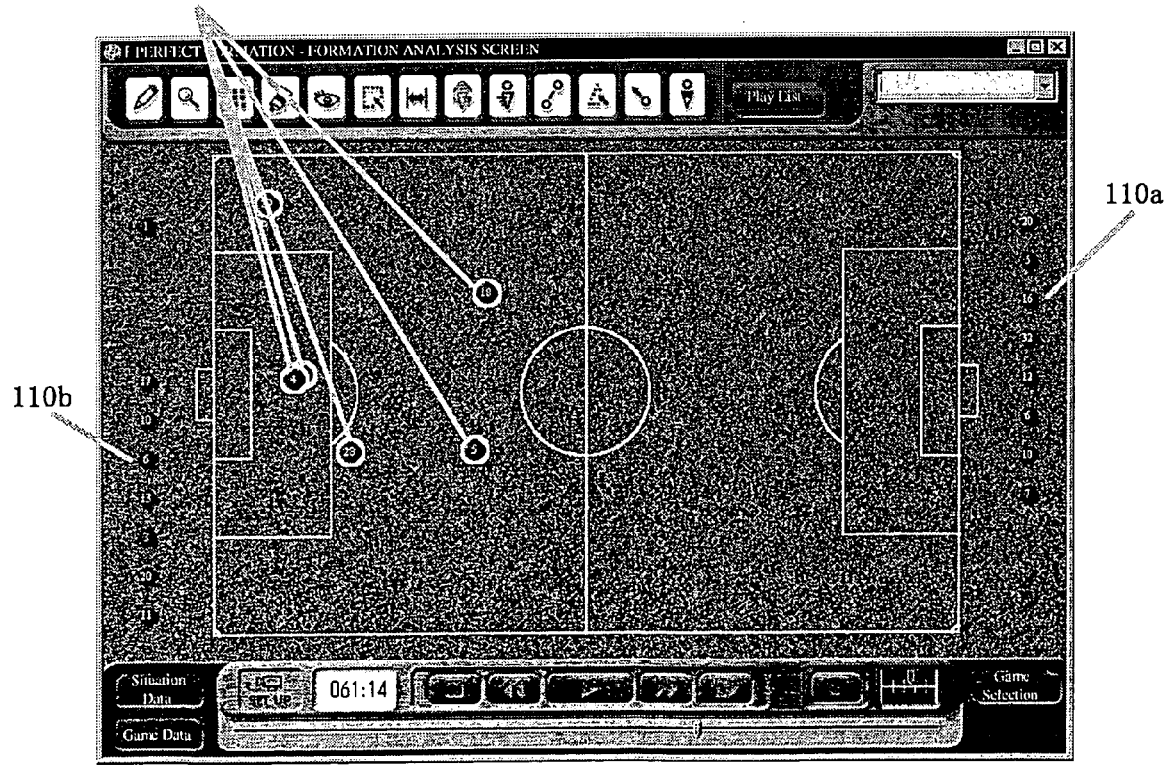
FIG. 110 is a diagram for illustrating a function of the subject player change tool in another embodiment of the present invention.

By using this subject player change tool, the user enables to analyze particular player intensively. For example, if the user likes to analyze forward position player(s) of own team intensively, all players except analysis subject player(s) can be put out of the field. (FIG. 110)

<Set Up Window>

When the user starts up the tool, all players' icons are displayed out of the field. (110a and 110b)

As clicking the player's icon out of the field, the clicked player is moved into the field and displayed with color-edged. (110c) Then, after the user pressed playback button, only selected player(s) is(are) displayed on the actual formation analysis screen.

For resetting the operation, the user can reset by clicking the tool box again after the user cancel the operation by clicking the tool button.

1-5. Positional Relationship Display Tool (Triangle Mode)

<Function>

Figure 111:
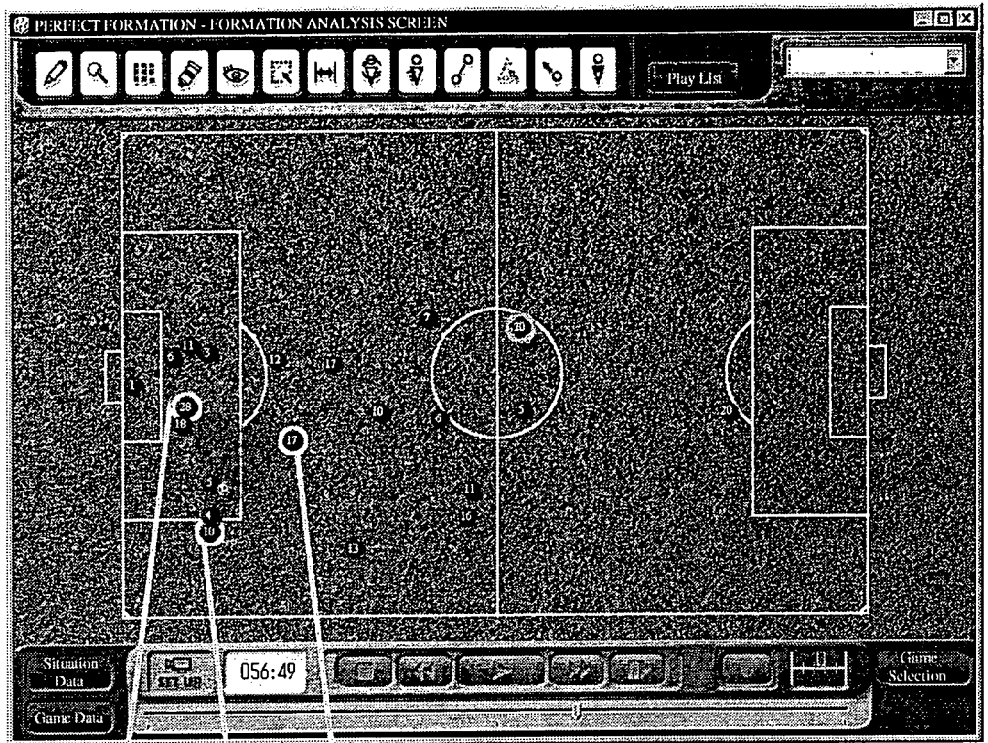
FIG. 111 is a diagram for illustrating a function of the positional relationship display tool in another embodiment of the present invention.

As shown in FIG. 111, the user can recognizes the space and movement between three players through drawing a figure connecting three players (111a~111c) by using this positional relationship display tool. Three selected players are connected by lines, the triangle is shaped, and the zone between each the players is displayed as color-coded triangle. Through this composition, the user can analyze the positioning between the players visually. The user can also connect any desired players disregarding own or opponent team.

<Set Up Window>

By pressing the tool button, the formation analysis is paused.

As clicking players' icons, the selected players become color-edged, and the selection is fixed. When the user clicks the play button, the relationship between the players is reflected in the formation analysis screen. (The selected players must be more than three players.)

For resetting the operation, the user can reset by clicking the tool box again after the user cancel the operation by clicking the tool button.

1-6. Direction Vector Display Tool

<Function>

Figure 112:
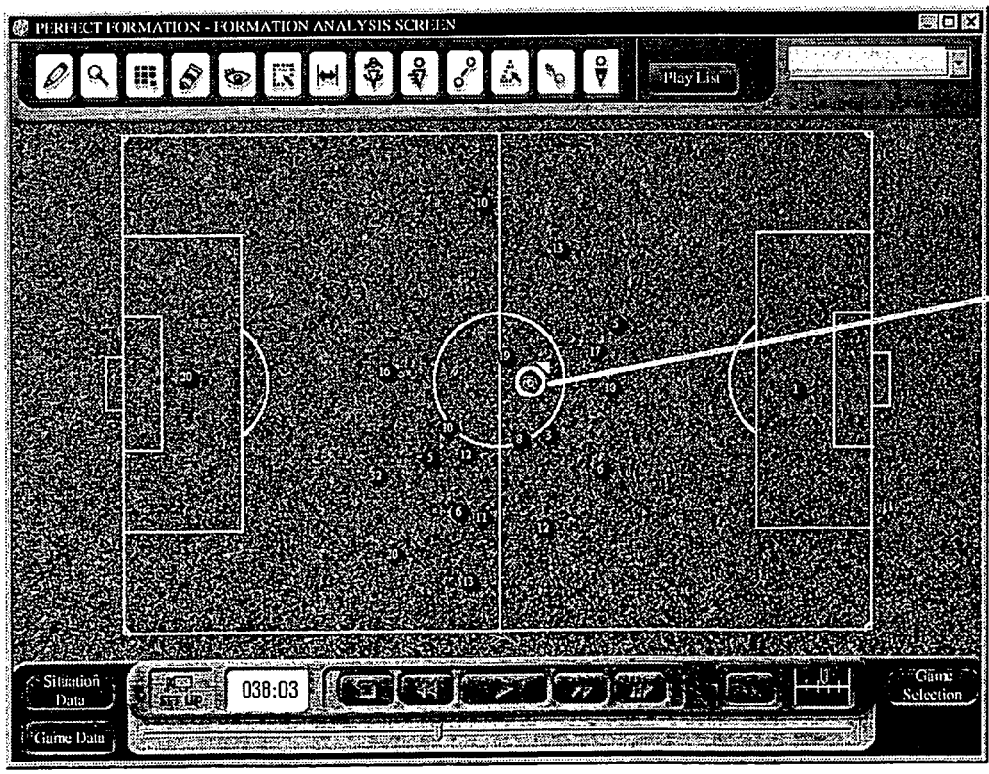
FIG. 112 is a diagram for illustrating a function of the direction vector display tool in another embodiment of the present invention.

As shown in FIG. 112, by using this advancement vector tool the player's movement direction is displayed through the determination of differences between present flame and next frame of the coordinate data obtained from the automatic following device. (112a) The display form is that triangles are added to the selected players' icons.

<Set Up Window>

The formation analysis is paused once when the user clicked the tool button.

As clicking player's icon, the selection of player is fixed by color-edged. The player's moving direction is displayed on the formation analysis screen reflecting the actual player's movement after clicking the play back button.

For resetting the operation, the user can reset by clicking the tool box again after the user cancel the operation by clicking the tool button.

1-7. Referee Tool

<Function>

Figure 113:
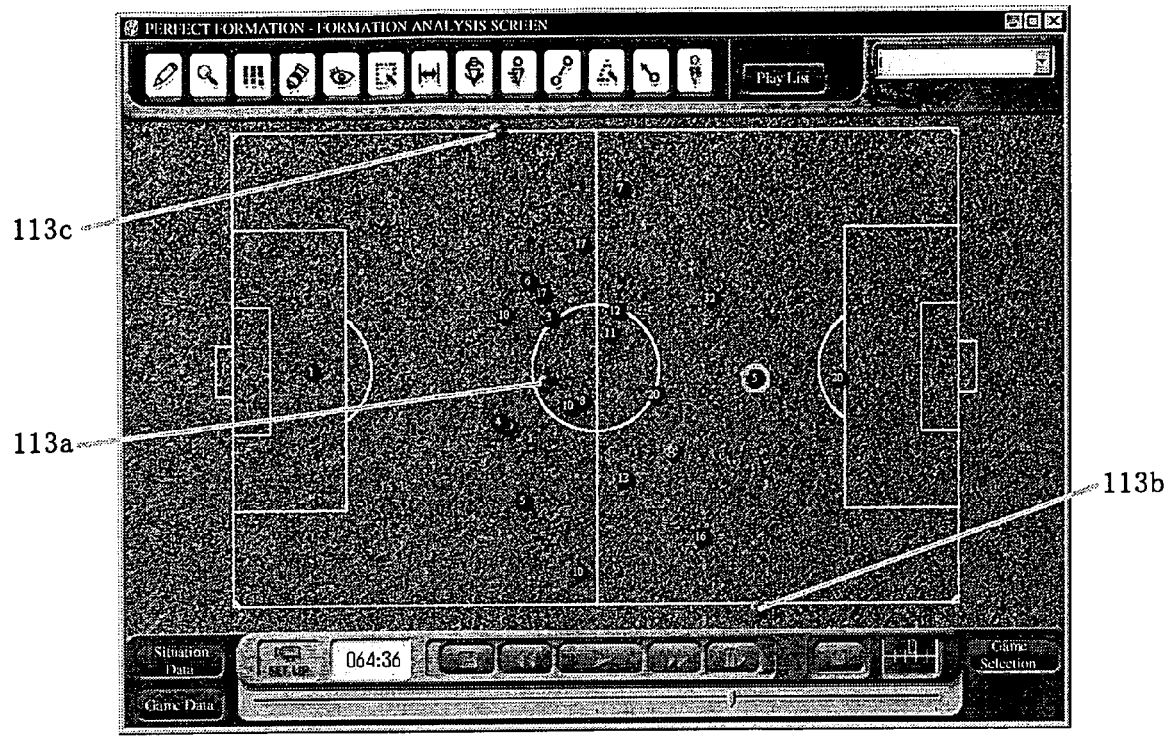
FIG. 113 is a diagram for illustrating a function of a referee tool in another embodiment of the present invention.

As shown in FIG. 113, each official's evaluation at games can be done by following the movement of referee (113a) and assistant referees (113b and 113c) during games. Also, this tool can be used for training of officials. For example, it can be analyzed whether referee is moving diagonally on the field, and whether each assistant referee is moving with offside lines.

<Set Up Window>

By clicking the tool button, the formation analysis is paused once, and the referee icon is displayed. As the play back button is clicked, the actual referees' movements reflect on the formation analysis screen.

For resetting the operation, the user can reset by clicking the tool box again after the user cancel the operation by clicking the tool button.

2. Player Data Analysis and Related Data Analysis 2-1. Pass Route Diagram

<Function>

Figure 114:
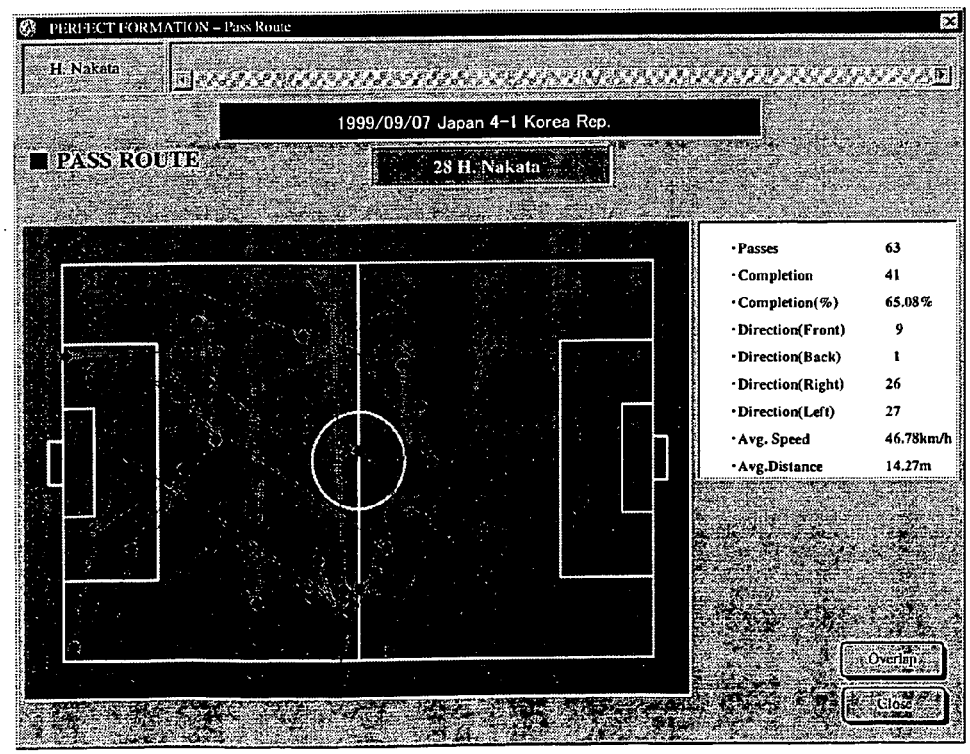
FIG. 114 is a view showing the pass route diagram, in another embodiment of the present invention.

FIG. 114 is a diagram, which shows pass routes of a player and displays where the player passed to during games. Mainly, positioning of players, pass tendency at each position, tendency of centering direction of side back or wing back, and tendency of field direction of goal keeper can be analyzed.

<Set Up Window>

The selected player's pass route diagram is displayed by clicking the return button after the user selected the subject player for analysis in the window.

3. Team Data Analysis and Related Data Analysis 3-1. Referee's Activity Diagram for each Half <Function>

Figure 115:
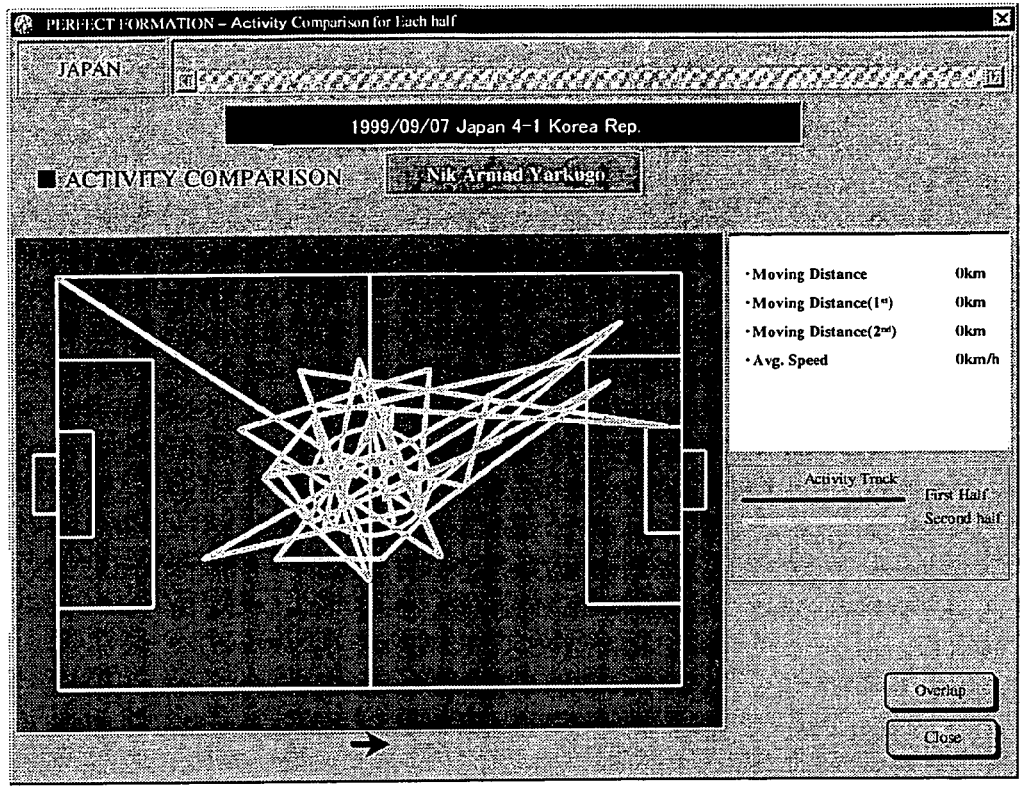
FIG. 115 is a view showing the referee activity diagram for the first half and the second half in another embodiment of the present invention.

FIG. 115 is a diagram which displays the referee's activity in each half by sampling the activity for particular fixed time (several seconds). A diagonal movement to the field is desirable for referee's activity since it covers sides where each assistant referee is not existent. By using this diagram, the desirable activity can be checked.

<Set Up Window>

By the user clicks the tool button, the formation analysis is paused, and the referee icon is displayed As the play back button is clicked, the actual referees' movements reflect on the formation analysis screen. For resetting the operation, the user can reset by clicking the tool box again after the user cancel the operation by clicking the tool button.

4. Play List

<Function>

Figure 116:
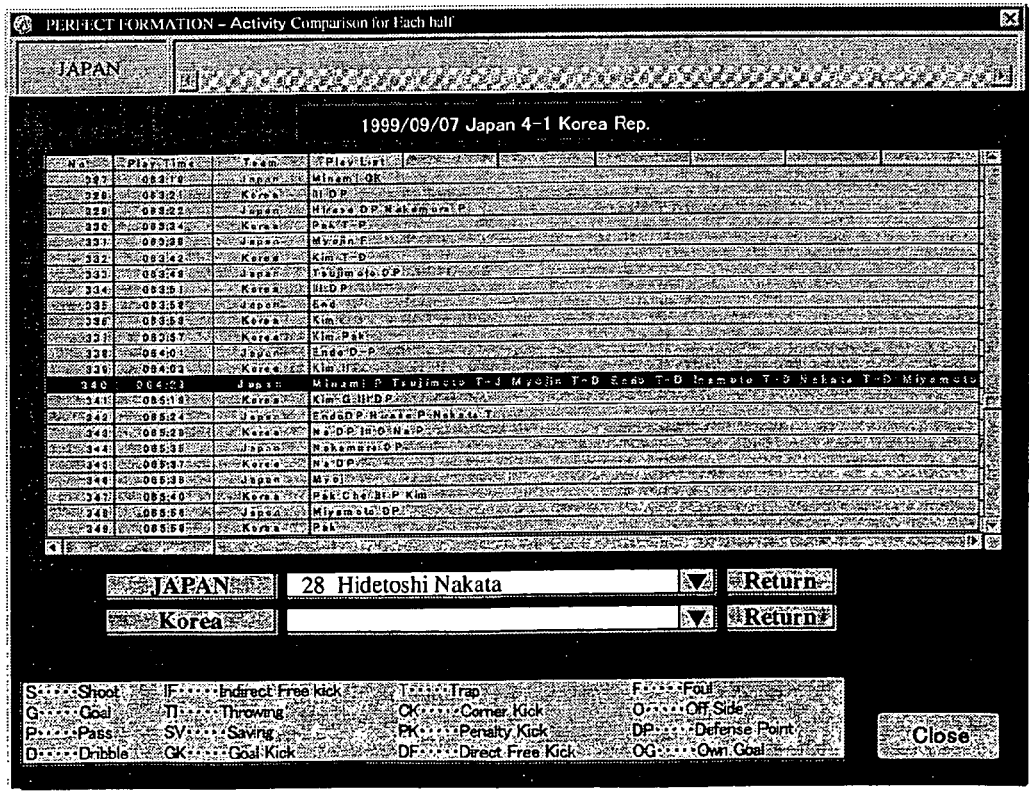
FIG. 116 is a view showing the play list diagram in another embodiment of the present invention.

As shown in FIG. 116, the play list displays all plays during a game. By clicking the play number, the user can do the formation analysis (2D animation) for the situation where the particular play occurs, the player data analysis, or the team data analysis for the game.

For example, if the user likes to watch the situation like that Nakata Hidetoshi #28 passed, Tomoyuki Hirase #17 received the pass and shot, the user just input the matters below into the items on the window.

| | |
|---|---|
| 1. Related Player 1: | Hidetoshi Nakata |
| 2. Related Player 2: | Tomoyuki Hirase |
| 3. Related Player 3: | N/A |
| 4. Point Difference: | 1 ← (input either 1, 2, or none) |
| 5. Situation: | Leading ← (input either leading, losing, or tie) |
| 6. Play: | Pass ← (input play type such as pass or shoot, etc.) |
| 7. Time: | 40 min. First Half ← (indicate desired time zone) |

By inputting the desired conditions like above, the scenes only correspond to the situations are displayed as a list from multiple games. This tool enables users to extract any desired situations voluntary from many data by inputting keywords.

<Set Up Window> a. Subject Game Display

Displays the title data of list outputted games b. Analysis Subject Team Change Button By clicking the opponent team button, the user can change analysis subject team.

c. Analysis Subject Player Change Pull Down Menu

The user can change the analysis subject player by selecting new player from the analysis subject pull down menu.

d. Play List Number Button

It manages the list from the start of the game through consecutive number. The user can search 2D animation of the formation analysis screen by clicking play list number button.

e. Play List Table Window

It displays the list of each play unit which is numbered form the start of the game. For outputted form, the display form is changed depending on which analysis the user has progressed.

| | |
|---|---|
| Formation Analysis: | All List Outputted |
| Player Data Analysis: | All List Outputted with emphasizing the subject player |
| Team Data Analysis: | All List Outputted with emphasizing the subject team | f. Close Button

It brings the user to one analysis screen before such as formation analysis, player analysis, or team data analysis.

INDUSTRIAL APPLICABILITY

The time data processing system of the present invention contains an device that creates a time related data list to display the positions and movements of the subjects over time, an image motioning device to translate the aforesaid data into motion images, and a display device to display at least either the time related data list or the motion images translated from data. This enables a visual analysis and storing the analyzed data regarding individual players and team data depending on various purposes. Further, the data, demanded by coaches of professionals like soccer team, judges, official recorders and media personnel, is able to be analyzed and extracted through the automatic following technology, which makes it possible to completely trace the movements of the players in a game from image materials that can be recorded at a relatively low cost.

The time data processing system of the present invention contains of a data processing device, command input device, interface device, and an image display device. The data processing device saves in its memory, the formatted data that is derived from the image data of the game. The input device is connected to the data processing device and multiple commands can be accepted. The interface device inputs and also produces the translated data. The image display data connected to the interface device inputs the data produced by the interface device to display it on the screen. This facilitates analysis by offering a means of visualizing data according to the various purposes, and furthermore, the analysis results can be saved. Further, the data, demanded by coaches of professionals like soccer team, judges, official recorders and media personnel, is able to be analyzed and extracted through the automatic following technology, which makes it possible to completely trace the movements of the players in a game from image materials that can be recorded at a relatively low cost.

The time data processing method of the present invention is achieved through the filming of the specified subject, the creation of the data list illustrating the position and movement over time, the creation of a motion image of the position and movement of the subjects through the data list, and displaying at least either the time related data list or the motion images. This enables a visual analysis and storing the analyzed data regarding individual players and team data depending on various purposes. Further, the data, demanded by coaches of professionals like soccer team, judges, official recorders and media personnel, is able to be analyzed and extracted through the automatic following technology, which makes it possible to completely trace the movements of the players in a game from image materials that can be recorded at a relatively low cost.

The time data processing method of the present invention is achieved through the production of the image data, the processing of the data based on the designated format, the storage of the processed data in its memory, the translation of the formatted data according to the inputted commands and, displaying the translated data. This enables a visual analysis and storing the analyzed data regarding individual players and team data depending on various purposes. Further, the data, demanded by coaches of professionals like soccer team, judges, official recorders and media personnel, is able to be analyzed and extracted through the automatic following technology, which makes it possible to completely trace the movements of the players in a game from image materials that can be recorded at a relatively low cost.

The invention claimed is:

1. A time-series data processing device, comprising:
   image-pick up means for picking up a specific object;
   data processing means for generating a data list indicating, in time series, a temporal transition of a position and a state of said object picked up by said image-pick up means, with respect to a time;
   animating means for animating said transition of said position and said state of said object in accordance with said data list; and
   display means for displaying at least one of said data list generated by said data processing means and said image animated by animating means,
   wherein the display means is operable to display said data list and said animated image.

2. A time-series data processing device according to claim 1, wherein said data processing means is configured to display synchronously on said display means each corresponding image by linking an image of said object, which is picked up by said image-pick up means, in accordance with said data list generated, when said display means display said image of said object animated by animating means.

3. A time-series data processing device according to claim 2, wherein said data processing means is configured to perform at least one kind of data analysis, by linking an image animated by said animating means, in accordance with said data list generated.

4. A time-series data processing device according to claim 1, wherein said specific object comprises a tool used by players in a sports game.

5. A time-series data processing device according to claim 4, wherein said sports game is soccer, and said tool is a soccer ball.

6. The time-series data processing device according to claim 1, wherein the time-series data processing device performs numerical analysis of said specific object picked-up by said image-pick up means, and wherein, based on the numerical analysis, results are displayed in a form of a graph or a chart, wherein said picked-up specific object is video data of at least a portion of a sports game.

7. The time-series data processing device according to claim 1, wherein the time-series data processing device performs numerical analysis of said specific picked-up object, wherein said specific picked-up object is a sports team, and wherein the time-series data processing devices perform numerical analysis of the sports team formation based on open spaces on a game field.

8. The time-series data processing device according to claim 1, wherein the time-series data processing device performs numerical analysis of said specific picked-up object, and wherein, based on said numerical analysis, formation and positioning of a team as a whole during a sports game is determined.

9. The time-series data processing device according to claim 1, wherein the time-series data processing device performs numerical analysis of said specific picked-up object, and wherein, based on said numerical analysis, formation and positioning, during a sports game, of said specific picked-up object is determined.

10. A time-series data processing device, comprising:
    data processing means for generating image data by picking up an image of a sports game, for processing said picked-up image data generated in accordance with a predetermined format, and for storing said processed image data in said predetermined format;
    interface means connected to said data processing means comprising an instruction entering means for entering a plurality of instructions, said interface means also receives said processed image data in said predetermined format from said data processing means, converts said processed image data into one of predetermined forms based on an entered instruction which is a selection of one of the predetermined forms, and outputs said converted data; and
    image displaying means connected to said interface means for displaying on a screen said outputted data from said interface means,
    wherein said predetermined forms comprise a chart, a numerical list, an image, and a video, and wherein said interface means is operable to convert said processed image data into each of a chart, a numerical list, an image, and a video.

11. A time-series data processing device according to claim 10, wherein said interface means is configured to enable said image displaying means to display a play list or a graph that is indicative of a desired analytical result in response to a kind of said instruction.

12. A time-series data processing device, comprising:
data processing means for generating image data by picking up an image of a sports game, for processing said image data generated in accordance with a predetermined format, and for storing said processed data in said predetermined format;
interface means connected to said data processing means comprising an instruction entering means for entering a plurality of instructions, said interface means receives said processed data in said predetermined format, converts said processed data into a predetermined form in accordance with an entered instruction, and outputs said converted data in accordance with said entered instruction; and
image displaying means connected to said interface means for displaying on a screen said outputted data from said interface means,
wherein said instruction entering means comprise:
a main instruction entering level for performing a plurality of different kinds of analyses; and
a common instruction entering level to be utilized commonly for said plurality of different kinds of analyses.

13. A time-series data processing device according to claim 12, wherein said common instruction entering level is configured to enter at least one related item with respect to a sports game subject to an analysis.

14. A time-series data processing device according to claim 12, wherein said main instruction entering level is configured to select an analysis of data or an analysis of formation regarding a sports game subject to an analysis, as one of said plurality of different kinds of analyses.

15. A time-series data processing device according to claim 13, wherein said related item comprises at least one of a player, a team, weather, a stadium of a game, a date of a game, a starting time of a game, and a number of spectators of a game.

16. A method of processing data in time-series, comprising:
imaging a specific object;
generating a data list indicating, in time series, a temporal transition of a position and a state of said object, with respect to a time;
animating said transition of said position and said state of said object in accordance with said data list; and
displaying at least one of said generated data list and said animated image,
wherein the display means is operable to display said data list and said animated image.

17. A method of processing data in time-series according to claim 16, further comprising the step of displaying synchronously each corresponding image by linking an image of said object, which is imaged in accordance with said generated data list, when displaying said animated image of said object.

18. A method of processing data in time-series according to claim 17, further comprising the step of performing at least one kind of data analysis, by linking an animated image, in accordance with said generated data list.

19. A method of processing data in time series according to claim 16, wherein said specific object comprises a tool used for players in a sports game.

20. A method of processing data in time-series according to claim 16, wherein said sports game is soccer, and said tool is a soccer ball.

21. A method of processing data in time-series, comprising:
generating image data by visually recording a sports game;
processing said generated image data in accordance with a predetermined format;
storing said processed data in said predetermined format;
entering a plurality of instructions;
converting said processed data into a predetermined form in accordance with said entered instructions; and
displaying said converted data,
wherein when said entered instruction is a first type of instruction, said processed image data that is the image data generated from visually recording the sports game, is converted into a graph, when said entered instruction is a second type of instruction, said processed image data is converted into a chart, when said entered instruction is a third type of instruction, said processed image data is converted into a list, when said entered instruction is a fourth type of instruction, said processed image data is converted into an image or a video.

22. A method of processing data in time-series according to claim 21, further comprising the step of displaying a play list or a graph that is indicative of a desired analytical result in response to the type of said instruction.

23. A method of processing data in time-series, comprising:
generating image data by visually recording a sports game;
processing said generated image data in accordance with a predetermined format;
storing said processed data in said predetermined format;
entering a plurality of instructions;
converting said processed data into a predetermined form in accordance with said entered instructions; and
displaying said converted data,
wherein said step of converting said data processed in said predetermined format into said predetermined form in accordance with said instruction comprises entering at least one related item with respect to a sports game subject to an analysis, which is utilized commonly in said plurality of different kinds of analyses by entering a common instruction,
wherein said image data, which is the image data generated from visually recording the sports game and processed in said predetermined format, is converted into numeric data for said plurality of different kinds of analyses, and wherein based on a kind of analysis, the converted data is displayed in a form of a numeric list, a chart, a graph, an image, and a video.

24. A method of processing data in time-series according to claim 23, wherein said related item includes at least one of a player, a team, weather, a stadium of a game, a date of a game, a starting time of a game, and a number of spectators of a game.

25. A method of processing data in time-series according to claim 23, wherein said step of converting said data processed in said predetermined format into said predetermined form in accordance with said instruction comprises selecting an analysis of data or an analysis of formation regarding a sports game subject to an analysis by main instruction entering.

26. A method of processing data in time-series, comprising:
  recording temporal image data of a specific object;
  generating a data list from the recorded temporal image data of the specific object, said data list comprising position coordinates of said object and flags indicating a state of said object at a plurality of points in time;
  analyzing said data list based on instruction from a user to determine desired output; and
  displaying said desired output in a desired format chosen from a plurality of formats, said plurality of formats comprise a chart, a graph, a numeric list, and a video.

27. A method of processing data in time-series, comprising:
  recording temporal image data of a specific object;
  generating from said temporal image data of the specific object a data list, said data list comprising position coordinates of said object and flags indicating a state of said object at a plurality of points in time;
  analyzing said data list based on instruction from a user to determine desired output; and
  displaying said desired output,
  wherein said position coordinates of said data list are analyzed to determine speed of said object.

28. The method of processing data in time-series according to claim 27, wherein said object is at least one of a sports game player and a ball.

29. The method of processing data in time-series according to claim 26, wherein said object is a player and said state of said object comprises at least one of a play, pass, dribble and shoot.

30. The method of processing data in time-series according to claim 26, wherein said object is a team and said state of said object comprises at least one of a team formation and ball possession.

31. The method of processing data in time-series according to claim 26, wherein said desired output comprises a numerical list having at least one numerical value for each flag indicating state of said object.

32. The method of processing data in time-series according to claim 21, wherein said converted data is displayed at an angle selected by a user.

33. A time-series data processing device, comprising:
  data processing means for generating image data by picking up an image of a sports game, for processing said generated image data in accordance with a predetermined format, and for storing said processed data in said predetermined format;
  interface means connected to said data processing means comprising, an instruction entering means for entering a plurality of instructions, said interface means inputs said processed data in said predetermined format, converts said inputted data into a predetermined form in accordance with an entered instruction, and outputs said converted data in accordance with said entered instruction; and
  image displaying means connected to said interface means for displaying on a screen said outputted data from said interface means,
  wherein said predetermined form comprises at least one of a chart, a numerical list, an image and a video,
  wherein said instruction entering means comprise:
    a main instruction entering level for performing a plurality of different kinds of analyses; and
    a common instruction entering level to be utilized commonly for said plurality of different kinds of analyses,
  wherein said common instruction entering level is configured to enter at least one related item with respect to a sports game subject to an analysis,
  wherein said related item comprises at least one of a player, a team, weather, a stadium of a game, a date of a game, a starting time of a game, and a number of spectators of a game, and
  wherein said interface means comprises functions of displaying all plays of an opponent teams at said sports game as a list in accordance with said play list, and of retrieving a desirable play seen at said sports game by designating an optional item of said play list.

34. A time-series data processing device according to claim 33, wherein said interface means further comprises a function of linking one analysis to other analysis in accordance with said play list.

35. A time-series data processing device, comprising:
  data processing means for generating image data by picking up an image of a sports game, for processing said generated image data in accordance with a predetermined format, and for storing said processed data in said predetermined format;
  interface means connected to said data processing means comprising, an instruction entering means for entering a plurality of instructions, said interface means recieves said processed data in said predetermined format, converts said received data into a predetermined form in accordance with an entered instruction, and outputs said converted data in accordance with said entered instruction; and
  image displaying means connected to said interface means for displaying on a screen said outputted data from said interface means,
  wherein said predetermined form comprises at least one of a chart, a numerical list, an image and a video,
  wherein said interface means is configured to enable said image displaying means to display a play list or a graph that is indicative of a desired analytical result in response to a kind of said instruction, and
  wherein said interface means is capable of enabling said display means to display simultaneously an animation based on said data converted into said predetermined form in accordance with said play list, and an image of a sports game based on said image data corresponding to said animation, and of editing a video of said sports game while analyzing data of said sports game.

36. A method of processing data in time-series, comprising the steps of:
  generating image data by visually recording a sports game;
  processing said generated image data in accordance with a predetermined format;
  storing said processed data in said predetermined format;
  entering a plurality of instructions;
  converting said processed data into a predetermined form in accordance with said entered instructions;
  displaying said converted data;
  displaying a play list or a graph that is indicative of a desired analytical result in response to a kind of said instruction;
  displaying all plays of an opponent teams at said sports game as a list in accordance with said play list; and retrieving a desirable play seen at said sports game by designating an optional item of said play list, wherein said converting is operable to convert said processed data, which is the image data generated from visually recording the sports game, into the predetermined form of a plurality of predetermined forms comprising a graph, a chart, a diagram, a list, an image, and a video.

37. A method of processing data in time-series according to claim 36, further comprising the step of linking one analysis to other analysis in accordance with said play list.

38. A method of processing data in time-series according to claim 37, further comprising the steps of:

displaying simultaneously an animation based on said data converted into said predetermined form in accordance with said play list, and an image of a sports game based on said image data corresponding to said animation; and editing a video of said sports game while analyzing data of said sports game.

* * * * *

UNITED STATES PATENT AND TRADEMARK OFFICE
CERTIFICATE OF CORRECTION

PATENT NO.       : 7,148,895 B2
APPLICATION NO.  : 09/919989
DATED            : December 12, 2006
INVENTOR(S)      : Chow et al.

It is certified that error appears in the above-identified patent and that said Letters Patent is hereby corrected as shown below:

On the title page (30), replace "11-023071" with --11-23071--.

Signed and Sealed this

Twentieth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,148,895 B2 | Page 1 of 1 |
| APPLICATION NO. | : 09/919989 | |
| DATED | : December 12, 2006 | |
| INVENTOR(S) | : Kentaro Konishi, Masaki Usui and Tatsuya Okahara | |

It is certified that error appears in the above-identified patent and that said Letters Patent is hereby corrected as shown below:

On The Title Page add the following (60) and col. 1 line 3:

This application is a Continuation of PCT/JP00/00481 filed January 28, 2000.

Signed and Sealed this

Ninth Day of October, 2007

JON W. DUDAS
*Director of the United States Patent and Trademark Office*